United States Patent [19]
Roberts et al.

[11] Patent Number: 4,752,877
[45] Date of Patent: Jun. 21, 1988

[54] METHOD AND APPARATUS FOR FUNDING A FUTURE LIABILITY OF UNCERTAIN COST

[75] Inventors: Peter A. Roberts; John D. Finnerty, both of New York, N.Y.

[73] Assignee: College Savings Bank, Princeton, N.J.

[21] Appl. No.: 849,779

[22] Filed: Apr. 9, 1986

Related U.S. Application Data

[63] Continuation-in-part of Ser. No. 587,568, Mar. 8, 1984, Pat. No. 4,642,768.

[51] Int. Cl.$^4$ .............................................. G06F 15/30
[52] U.S. Cl. ..................................... 364/408; 235/379
[58] Field of Search ............... 364/400, 401, 402, 406, 364/408, 200, 900, 300, 715, 716, 735; 235/379, 380, 383

[56] References Cited

U.S. PATENT DOCUMENTS

| | | | |
|---|---|---|---|
| 4,055,757 | 10/1977 | Tillman et al. ...................... | 364/715 |
| 4,232,367 | 11/1980 | Youden et al. ...................... | 364/408 |
| 4,346,442 | 8/1982 | Musmanno .......................... | 364/408 |
| 4,376,978 | 10/1980 | Musmanno .......................... | 364/400 |
| 4,412,287 | 10/1983 | Braddock, III ..................... | 364/408 |
| 4,486,849 | 12/1984 | Harigaya et al. ................... | 364/715 |
| 4,642,768 | 2/1987 | Roberts .............................. | 364/408 |
| 4,648,038 | 3/1987 | Roberts .............................. | 364/408 |
| 4,674,044 | 6/1987 | Kalmins ............................. | 364/408 |

FOREIGN PATENT DOCUMENTS

| | | |
|---|---|---|
| 0182450 | 5/1986 | European Pat. Off. . |
| 1390397 | 4/1975 | United Kingdom . |

OTHER PUBLICATIONS

Gaines et al., "Minicomputers in Security Dealing", *Computer* (vol. 9, No. 9), pp. 6–15, Sep. 1976.
Gazis, "Real Estate Investment Analysis System", *IBM Technical Disclosure Bulletin* (vol. 13, No. 11), pp. 3274–3275, Apr. 1971.
Bach et al., "A Stable Purchasing Power Bond", *American Economic Review*, vol. 31, pp. 823–825 (1941).
Fiske, "As Tuitions Rise, Colleges Adopt Banks' Role", *New York Times*, Apr. 14, 1986, pp. 1, 14.
Henderson, "Forecasting College Costs Through 1988–1989", American Council on Education Policy Brief, Jan. 1986.
Minard, "The CRIBs Age", *Forbes*, Nov. 18, 1985, pp. 38–39.
Schwartz, "Pay Now, Learn Later", *Newsweek*, Apr. 7, 1986, p. 76.

*Primary Examiner*—Michael R. Fleming
*Attorney, Agent, or Firm*—Laurence S. Rogers; Jeffrey H. Ingerman

[57] ABSTRACT

A method and apparatus are provided to fund a certain future liability of uncertain value and thereby defease fully its future cost. The method is an insurance investment plan which can be implemented using a floating rate zero coupon note obligation the interest rate on which varies automatically with the rate of inflation or the cost of some specified service or commodity which gives rise to the future liability, and the interest payments on which are automatically reinvested. The system projects the expected future cost of the liability based on a projected escalation rate associated with a certain specified index and based also on when the liability is expected to come due. It then calculates the present value sale price on the floating rate zero coupon note by discounting the expected cost at maturity at a rate that represents the insurer's projected reinvestment yield net of an insurance risk premium.

112 Claims, 24 Drawing Sheets

2

METHOD AND APPARATUS FOR FUNDING A FUTURE LIABILITY OF UNCERTAIN COST

CROSS-REFERENCE TO RELATED APPLICATION

This application is a continuation-in-part of copending U.S. patent application Ser. No. 587,568, filed Mar. 8, 1984, now U.S. Pat. No. 4,642,768.

BACKGROUND OF THE INVENTION

This invention relates to methods and apparatus for implementing and administering an insurance investment program to fund future liabilities whose present cost is known and whose future cost is unknown but can be projected with some risk factor. In particular, this invention relates to a method and apparatus for issuing a floating rate zero coupon note to fund a future liability whose projected due date and whose present cost are known but whose future cost is unknown but can be projected with some risk factor. More generally, this invention relates to a method and apparatus for issuing a financial instrument in the form of a floating rate zero coupon note the interest rate on which varies automatically with the rate of inflation or the cost of some specified service or commodity and the interest payments on which are automatically reinvested, and for funding this floating rate zero coupon note such that the funds available through the investment of the proceeds from the sale of floating rate zero coupon notes and the reinvestment of interim cash flow will be sufficient to cover in full in a timely manner the cost of redeeming any floating rate zero coupon note whether redemption occurs on the stated maturity date of the floating rate zero coupon note or prior thereto.

Generally, insurance programs are designed to protect against the uncertain need to fund a potential future liability of certain value, for example, a presently defined replacement value for a car or home, or the need to provide a source of income in case of death, or against a relatively large liability with a relatively small probability of occurrence, for example, permanent disability or personal injury liability, but are not available to fund a relatively certain future liability of uncertain cost, such as the cost of future college education or the cost in the future of purchasing a house. An individual can attempt to self-insure by acquiring a portfolio of securities, investing in a mutual fund, or making some other form of investment. Mutual funds have come into existence to lower the risk which an individual must assume in investing his assets by combining the assets of many individuals into a common fund invested in a diversity of assets. These programs are managed to maximize their yield. However, such an investment program will not truly defease the future liability because the yields available on financial and other assets are tied directly to the specific risk-return characteristics of those assets and these bear no direct relation to the rate at which the cost of some unrelated future liability, such as the cost of a future college education, may escalate. Accordingly, an individual who faces a relatively certain future liability of uncertain cost who attempts to fund this future liability on his own faces a significant risk that the future liability may be underfunded.

SUMMARY OF THE INVENTION

In view of the foregoing, it is an object of this invention to provide a method and apparatus for implementing an insurance investment program which provides an investor a future return adequate to fund an uncertain future liability whose cost can be projected on the basis of current cost data and assumptions of the rate of change of that data, and which determines the amount that must be invested in the program to provide the required future return.

It is a more particular object of this invention to provide methods and apparatus for implementing an insurance investment program which provides an investor a future return adequate to pay the cost of a college education for his beneficiary (e.g., a child, grandchild, etc.) in return for a present investment determined on the basis of current college cost data and projections of the rate of increase of college costs.

It is a further object of this invention to provide a method and apparatus for issuing a floating rate zero coupon note that will provide the purchaser a rate of return over the life of the floating rate zero coupon note that will fund the future liability fully, that is, defease the future cost of that liability in full. The floating rate zero coupon note will be issued at par, at premium, or at a discount—i.e., it may cost more or less than the current cost of covering the liability—depending on conditions and projections at the time of issue. A method and apparatus are also provided for funding the obligations that arise out of the sale of inflation-linked floating rate zero coupon notes when the cost of the uncertain future liability can be somewhat reasonably projected on the basis of the current cost of covering the liability if the liability were payable currently, and on assumptions regarding the expected rate of escalation in the cost of funding the liability in the future. As such, the invention pertains to a system and method for creating and managing a defeasance program structured around floating rate zero coupon notes that are designed to fund a relatively certain future liability of uncertain cost. Such a program involves the transfer of the cost escalation risk from the purchaser of the floating rate zero coupon note to the seller of the floating rate zero coupon note.

Consequently, included as an element of the invention are a method and apparatus for managing this risk by the seller of the floating rate zero coupon notes, which involves determining how the proceeds from the sale of the floating rate zero coupon notes and the interim cash flow should be invested so as to achieve an overall rate of return that will be sufficient to cover in full in a timely manner the cost of redeeming the floating rate zero coupon notes whether redemption occurs on the stated maturity date of the floating rate zero coupon notes or prior thereto.

It is a still more particular object of this invention to provide a method and apparatus for issuing a floating rate zero coupon note that will provide a rate of return over its life that will be adequate to pay the cost of a college education for the purchaser's beneficiary, for example, a son or daughter, in return for an initial purchase price or an initial partial payment followed by a sequence of specified payments on specified dates, and for automatically managing the investment of funds and reinvestment of interim cash flows so as to achieve an overall rate of return that will be sufficient to cover in full in a timely manner the cost of redeeming the floating rate zero coupon notes at the time the floating rate zero coupon notes mature (i.e., at the time the beneficiary's college bills come due or prior thereto if the purchaser so elects).

These and other objects of the invention are accomplished by providing a data processing system which implements an insurance investment program that combines the risk reduction advantages of a mutual fund with the projection advantages of an insurance policy, and moreover provides protection for a future liability of uncertain cost.

In one embodiment, the system provides for projection of the future cost of a liability of known present cost and discounting the escalated future cost at a discount rate which is equal to the yield on the investment of the proceeds from the sale of the units and interim cash flows minus an insurance premium, expressed as a fraction of a percentage point or as basis points, to be paid by the investor. The system also provides for the management of the fund of invested premiums so that the yield of the fund at least matches the increase in cost of the insured liability and so that the cash flow from the fund is adequate for funding the program's liabilities at their predetemined maturity dates. The system periodically processes investor transactions to update the program fund's asset positions, provides information to the program manager to help him evaluate options for the purchase and sale of assets, and provides reports to the program manager and to the investors regarding income generated by the fund.

In a second embodiment, a data processing system is provided that implements an insurance program, structured around floating rate zero coupon notes, that is designed to fund fully a future liability of uncertain cost. The system provides for the projection of the average future rate spread between the interest rate and the rate of inflation of the cost of the service or commodity that will result in the future liability, the translation of this rate spread into an adjustment factor to be applied to the current spot price of the service or commodity, and the calculation of the risk premium to reflect the volatility in this rate spread. The three components of spot price, rate spread, and risk premium determine the price to be charged investors for the floating rate zero coupon note, which might represent either a premium or a discount to the current spot price. The system also provides guidance in the management of funds consisting of the proceeds received from the sale of the floating rate zero coupon notes and interim cash flow realized upon the investment of those funds so that the average yield realized upon the investment of the proceeds of each floating rate zero coupon note at least matches the rate of return over the life of that floating rate zero coupon note. The system automatically handles the periodic processing of investor purchases and sales of floating rate zero coupon notes, updates the net asset position of the fund, monitors the rate spread, furnishes information to the program manager to enable him to set investment objectives and make investment decisions consistent with properly funding the floating rate zero coupon note liabilities, provides information to the program manager regarding the composition of the asset portfolio and the composition of the floating rate zero coupon note liability pool, and provides reports to the program manager regarding the performance of the investment management program and to investors regarding the status of their accounts.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
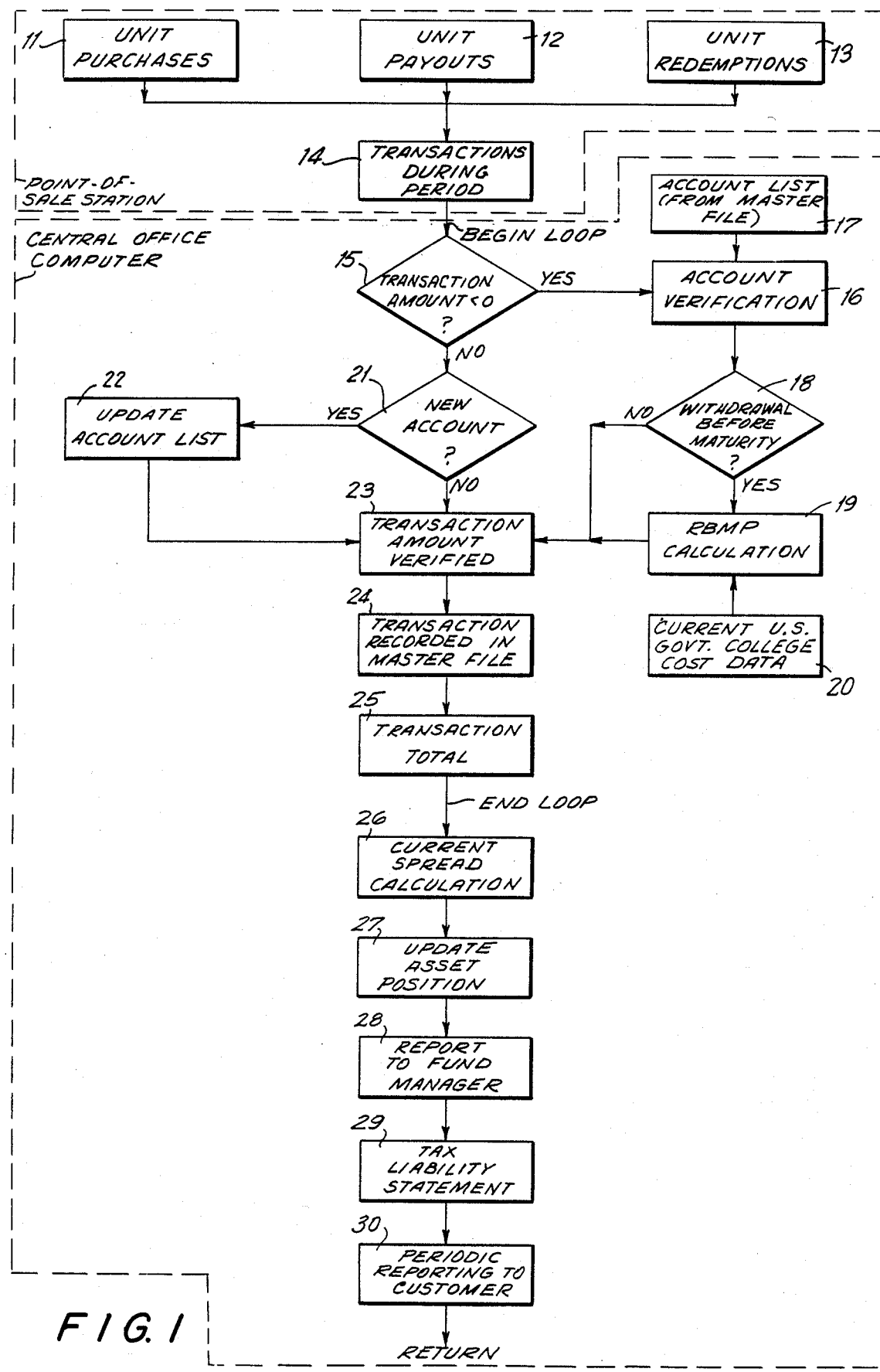
FIG. 1 is a flow chart depicting a first embodiment of the data processing methodology and structure in accordance with the principles of the invention.

The data processing system for administering the cost escalation risk insurance program comprises a central computer connected to a network of remote point-of-sale stations. In overview, the system operates as follows. The point-of-sale stations serve as the data entry points for customer transactions, including insurance unit purchases, payouts and redemptions, such as the purchase and redemption of floating rate zero coupon notes. The point-of-sale stations also serve as access points through which salespeople can refer to and retrieve data to answer a customer's questions concerning the insurance program, to determine the charge to the customer for insurance unit purchases, such as the prices at which floating rate zero coupon notes are currently being offered for sale, to determine the amount to be paid to a customer for insurance unit redemptions and payoffs, such as the amount to be paid to a floating rate zero coupon note holder who wishes to redeem the floating rate zero coupon notes in his or her account or whose floating rate zero coupon notes have matured, and to determine a rate of return on the customer's investment. In addition, the point-of-sale stations store a record of each customer's transaction, and periodically these are transmitted to the central computer.

The central computer receives and processes the customer transaction data from the point-of-sale stations. The data processing system, which operates on the central computer, updates the list of customer accounts, including opening new accounts and closing accounts whose insurance units, which may be in the form of floating rate zero coupon notes, are all redeemed, in accordance with the individual customer data received from the point-of-sale stations. This system also provides confirmations of account status to the relevant point-of-sale station when a customer requests a redemption of units—e.g., his or her floating rate zero coupon notes. The central system also furnishes information to the manager of the investment fund concerning current purchases and payouts or redemptions and projects future purchases and payouts or redemptions. The system also provides the investment manager with information regarding the performance of the investment portfolio, how the composition of the asset portfolio compares to the composition of the liability portfolio—e.g., the floating rate zero coupon note pool, and how the projected cash flow from the asset portfolio compares to the projected cash flow requirements of the fund, that is, projected payouts or redemptions.

The central system creates a daily report to the investment manager summarizing customer transactions, investment transactions, asset and liability position, and yield data, and providing an analysis of the projected cash flow obligations associated with the insurance units—e.g., the floating rate zero coupon notes—and the projected income flows from the asset portfolio. It also creates a regular end-of-period report that summarizes the investment performance of the fund during the period and indicates whether an overfunding or an underfunding condition exists. The central system also creates regular periodic reports for account holders that indicate the value of each unit—e.g., floating rate zero coupon note—in their accounts and the tax basis of each unit at the end of the period and the amount of investment income and the amount of taxable income earned on each unit during the period.

Figure 2:
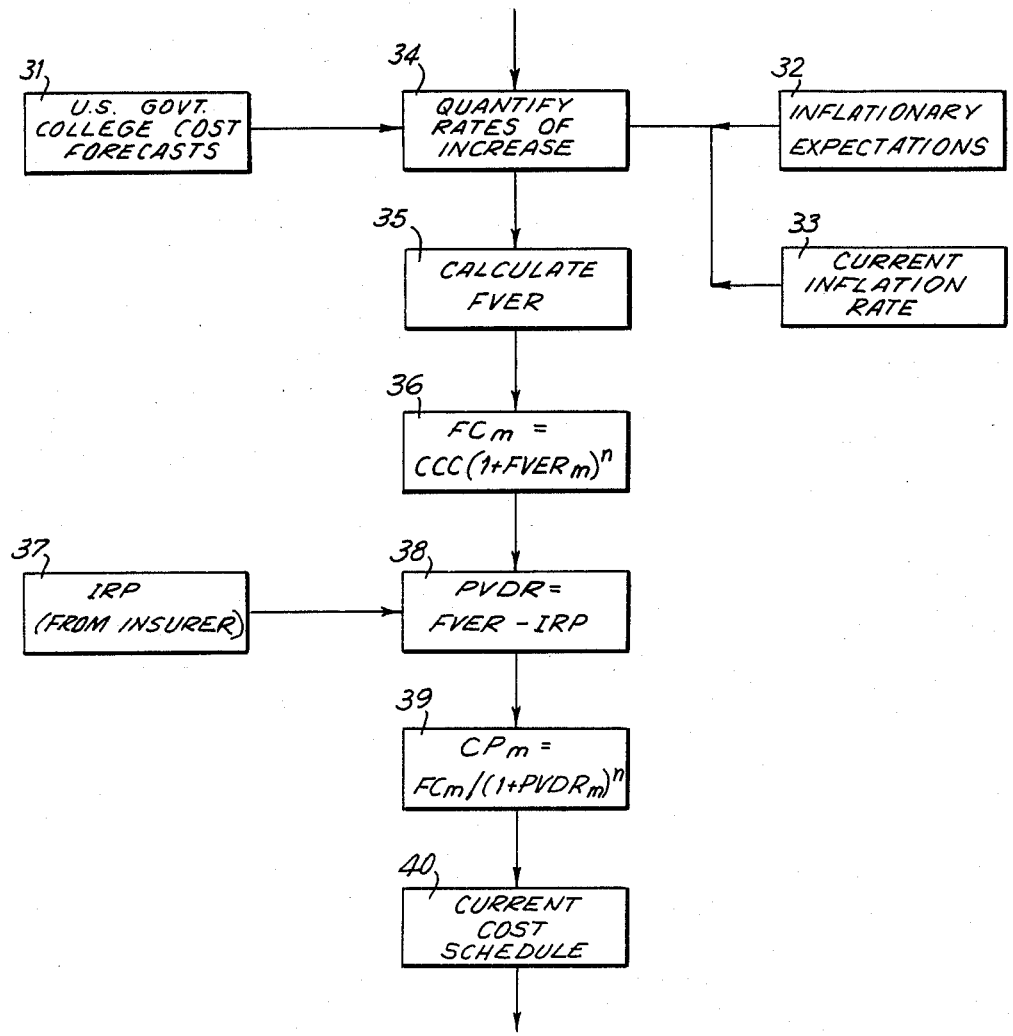
FIG. 2 is a flow chart depicting in more detail the current spread calculation operation represented by block 26 in FIG. 1.
Figure 3:
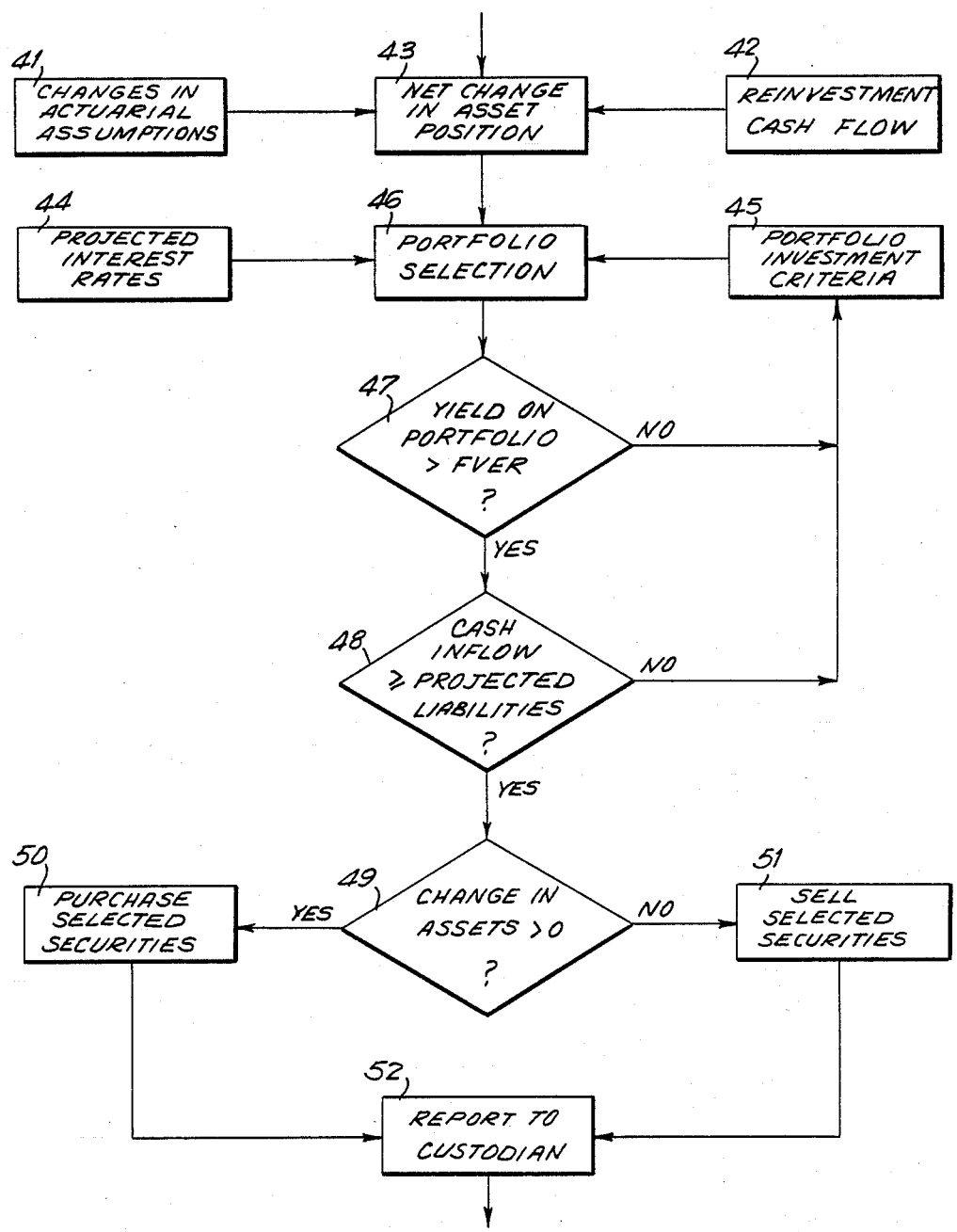
FIG. 3 is a flow chart depicting in more detail the update asset position operation represented by block 27 in FIG. 1.

With the foregoing overview in mind, the detailed operation of one preferred embodiment of the system can best be understood by referring to FIGS. 1–3 which illustrate the system in the context of an insurance investment program for funding the cost of a future college education. Although funding future college education costs is the particular embodiment shown and described herein, it will be apparent to those skilled in the art how the invention can be adapted, within the scope of the invention, to insurance investment programs for funding other future liabilities of uncertain cost.

As shown in FIG. 1, the customer transaction operations performed at the point-of-sale stations include blocks 11–14. Customer transactions can be purchases, payouts, or redemptions of fund units.

Unit purchase data is entered at block 11, unit payout data is entered at block 12, and unit redemption data is entered at block 13. Each entry includes the customer's name and account number and the transaction amount. The entered transaction data is stored at block 14 for transmission to the central processing facility.

The transaction data accumulated at the point-of-sale stations are transmitted periodically (e.g., daily) to the central processing facility. Alternatively, the data can be transmitted immediately upon entry and accumulated for processing at the central facility.

The data for each incoming transaction is processed individually in a loop beginning with block 15 and ending at block 25 where all transactions in a batch (e.g., a day) are totalled prior to further processing as a group in accordance with block 26 et seq.

The incoming transaction data is first subjected to test 15 which determines whether the transaction is a purchase (NO output) or a redemption (YES output).

If the transaction is a purchase, the system flow passes to test 21 which determines if the purchase is the first transaction in a new account or an additional transaction in an existing account. For new accounts the system flow passes to block 22 which creates a new entry in the account list based on the transaction data.

Transaction data for both new and existing accounts then pass to block 23 which checks the transaction data for possible errors in calculation at the point-of-sale station.

If the transaction is a payout or a withdrawal, data flow moves from test 15 to block 16 where the transaction data are verified to confirm that they are from a valid account. The account information necessary to verify the transaction data is supplied from the account list stored in the system's master file, shown at block 17. Thereafter, the data flow passes to test 18, which determines whether the transaction is a payout (withdrawal at maturity) or a redemption (withdrawal before maturity). Payout transaction data pass to verification block 23. For redemption transactions, the redemption before maturity penalty (RBMP) must be calculated. This is accomplished at block 19. The RBMP calculation is based on the current value of an insurance unit which is a function of the present college cost data. The college cost data is supplied from one of the system's data files shown at block 20. From the RBMP calculation, system flow for redemption transactions also passes to verification block 23 which checks for possible errors made at the point-of-sale station.

From verification block 23, system flow passes to block 24, where each transaction is recorded in the system's master file, and the customer account list data is updated. Thereafter, system flow passes to block 25, where purchase, payout, and redemption transactions are totalled.

Next, system flow passes to block 26, where the current spread calculation is carried out to create an updated schedule of the current charge to customers for insurance units based on the prevailing college cost and inflation rate data. The current spread calculation is explained in greater detail below in relation to FIG. 2. The updated schedule of current charges is transmitted to the point-of-sale stations. There, the schedule is used by the salespeople to provide cost information to customers and to set the cost for unit purchases, unit payouts, and unit redemptions.

System flow then proceeds to block 27 which carries out the update asset position operation to determine what investment transactions should be made in the fund investment portfolio based on current and projected customer transactions. The update asset position operation is explained in greater detail below in relation to FIG. 3. The data processing system advises the fund manager of its determination concerning the net amount of required investment transactions and provides a list of the investments which might be suitable for purchase or sale. Based on this information, the manager can choose the investment transactions to be made and enter the investment transaction data into the system.

After the investment transaction data is entered, system flow passes to block 28, where a report is created for the investment manager which details the changes made during the period, including the transaction totals for the period, the fund assets purchased and sold, the projection of the cash flow requirements for customer transactions, the projection of the cash flow generated from the fund assets, etc.

Next, system flow passes to block 29, where the system periodically (e.g., annually) prepares a tax liability statement for each customer and for the fund manager. Also, at block 30, the system prepares another periodic report (e.g., quarterly) to provide the customer with current account information.

Referring now to FIG. 2, there is shown a more detailed flow chart for the current spread calculation process corresponding to block 26 of FIG. 1. The current spread calculation creates a schedule of the current charge to customers for insurance units of various maturity dates. The calculation proceeds on the basis of information concerning current college costs, the current inflation rate and the projections for change of the inflation rate, and the risk premium which compensates the fund for assuming the investment risk.

The process starts at block 34 with an evaluation of several variables which contribute to the increase in college costs. Data concerning the current inflation rate (block 33) and the expected changes in the inflation rate (block 32) are entered into the system by the fund manager. Data concerning current college costs and the rate of increase of college costs (e.g., in the United States of America, U.S. Department of Education College Cost Forecasts) is entered into the system (block 31). The system quantifies and combines this data (block 34) and calculates a future value escalation rate (FVER) for each maturity offered (block 35) and to fix current college costs (CCC). Flow then passes to block 36, which calculates the future college cost at each maturity ($FC_m$) by escalating the current college cost (CCC) at the FVER rate according to the relation $FC_m = CCC(1 + FVER_m)^n$, where n is the number of years to maturity. This future value is then discounted at a rate, the present value discount rate (PVDR), which represents the estimated inflation rate (FVER) minus the insurer's risk premium (IRP). The insurer's risk premium rate is entered by the fund manager (block 37) and can be adjusted to compensate for market volatility or other factors which affect the investment risk involved. The calculation of the PVDR is accomplished at block 38. Then, at block 39, the future cost for each maturity is discounted to the present value using the PVDR to determine the current price per insurance unit for each maturity ($CP_m$) according to the relation $CP_m = FC_m(1 + PVDR_m)^{-n}$, where n is the number of years to maturity.

Finally, the $CP_m$ values are assembled into a current cost schedule at block 40 and the current cost schedule is transmitted to the point of sale stations. At this point the current spread calculation is completed and control is then transferred to the update asset function corresponding to block 27 in FIG. 1 which will now be discussed in more detail.

Referring now to FIG. 3, there is shown a more detailed schematic flow chart for the update asset position function (block 27). This operation enables the fund manager to evaluate changes in the fund investment portfolio to invest net income, to meet redemption and payout obligations, and to structure the investment portfolio to provide for funding future obligations while maximizing return on the portfolio.

First, the net change in the fund's asset position is determined at block 43. This determination is made by combining the totalled customer transaction data (generated at block 25), actuarial data (block 41), and reinvestment cash flow data (block 42). The actuarial data are entered into the system by the fund manager based on information concerning the projected rate of increase of college costs, basic economic data which affect those costs, and the redemption rate of insurance units. The reinvestment cash flow data are generated by the system and include income realized from the fund's investments, e.g., dividends or bond coupon payments, plus the principal amounts realized from securities which matured or were sold during the period.

The result of the net change in asset position data is sent to block 46 for selection of the investments to be purchased or sold. Also provided at block 46 are data concerning projected interest rate levels (block 44), investment criteria entered by the fund manager and data from the system's data base concerning the range of securities available for purchase or sale (block 45). The system selects a list of securities which meet these various criteria and displays the options to the fund manager. The fund manager enters his selection of investment transactions into the system.

Thereafter, flow passes to two tests which evaluate the changed fund portfolio. First, test 47 determines whether the yield on the new portfolio exceeds FVER, i.e., whether the rate of return on investments is enough to match the expected rate of increase in liabilities. Second, test 48 determines whether the cash inflow from the new portfolio exceeds the projected liabilities, i.e., whether the return of interest and principal from maturing securities matches the fund liabilities due to payouts on maturing insurance units and expected redemption before maturity of insurance units. Only if the fund manager's selections pass both tests are the investment transactions carried out. Otherwise, control returns to the portfolio selection step (block 46) via block 45 at which the problems with the selected transactions are displayed to the fund manager so that he can revise his criteria and make a new selection of investments. The selection/evaluation loop (46, 47, 48, 45) continues until the fund manager is satisfied that the return on the portfolio is maximized and the portfolio meets the tests imposed by the system.

Then, flow passes to test 49 to determine whether the selected transactions are purchases or sales and to blocks 50 and 51 to effect orders for purchase or sale of the selected securities. At block 52, a report of the securities purchased or sold is generated. At that point, the update asset function is completed and system flow passes to the report generating functions at blocks 28, 29, and 30 discussed earlier with reference to FIG. 1.

Data processing hardware and software which can be used to implement the system of FIGS. 1-3 are described below, after the following description of a second preferred embodiment.

The detailed operation of a second preferred embodiment of the system, which is structured around a floating rate zero coupon note, can best be understood by referring to FIGS. 4A-13B, which illustrate flow charts of the operation of the system in the context of an insurance investment program for funding the cost of a future college education. Although funding future college education costs is the particular embodiment shown and described herein, the invention could be adapted to defeasance programs for funding other future liabilities of uncertain cost, such as the cost of purchasing a home, the cost of a stream of future pension benefits, the cost of purchasing one or more pieces of equipment, the cost of purchasing a unit of gold or some other commodity or some service, etc.

Figure 4A:
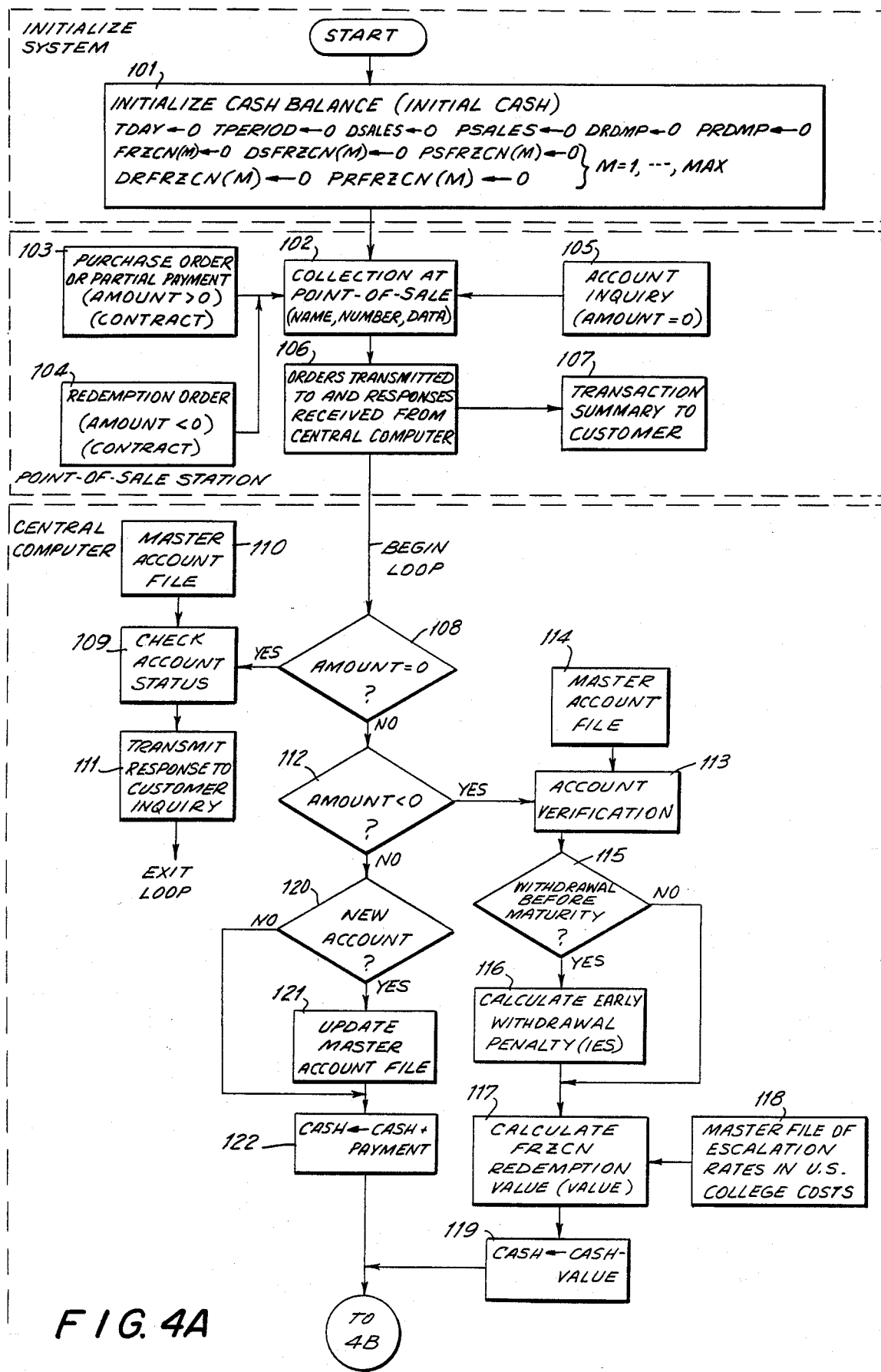
FIGS. 4A–4C are a flow chart depicting a second embodiment of the data processing methodology and structure in accordance with the principles of the invention.
Figure 4B:
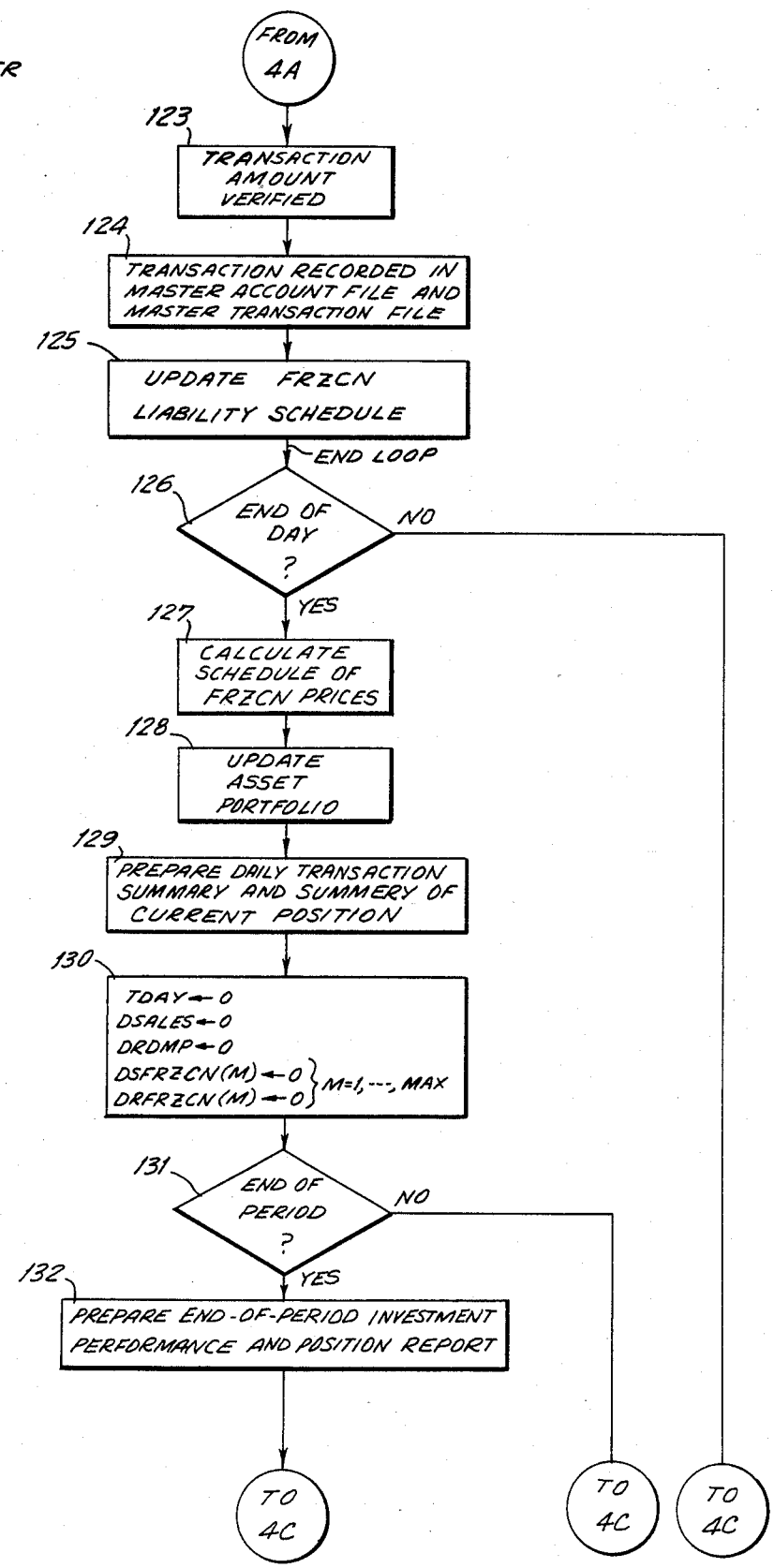
Figure 4C:
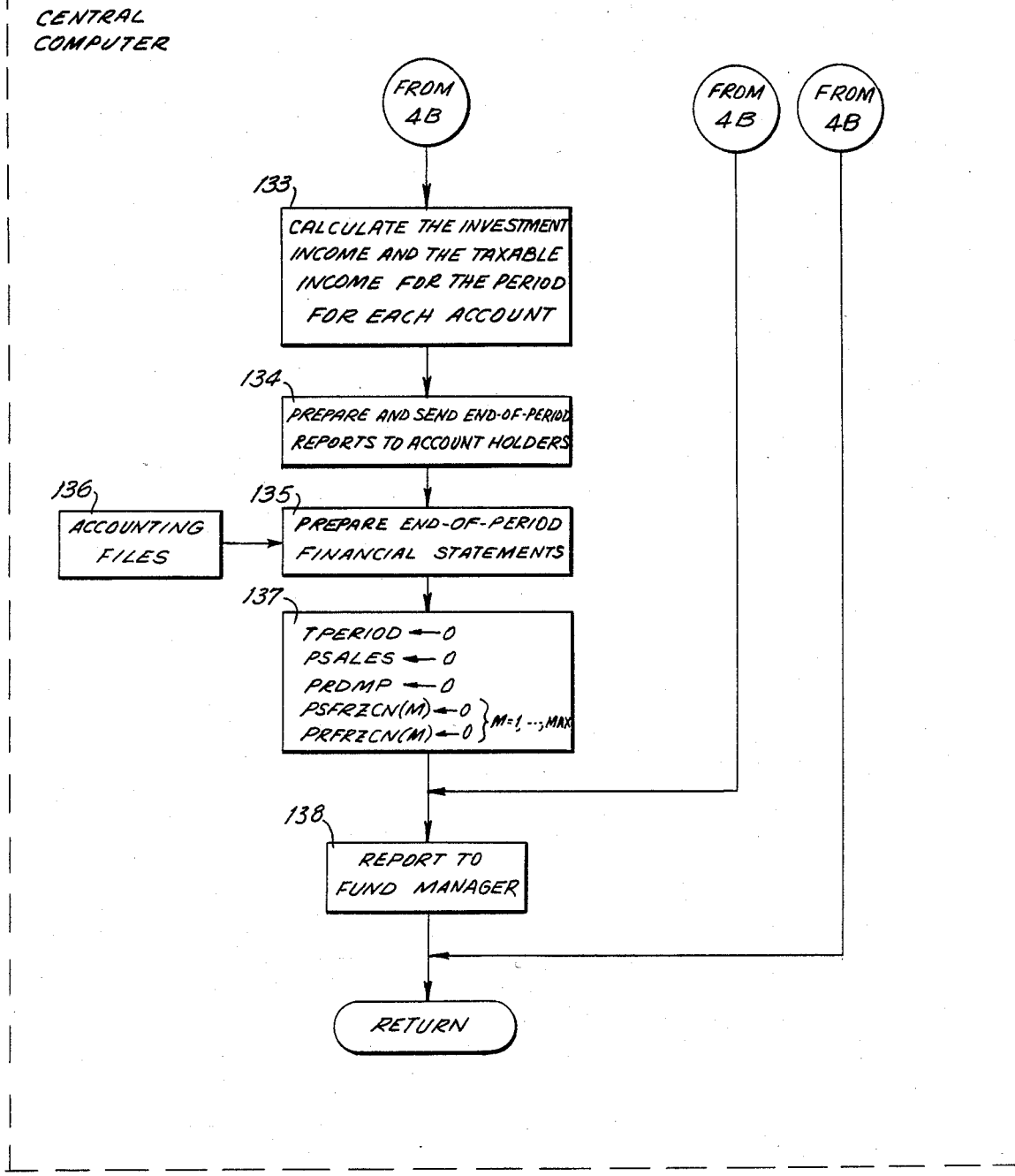

As shown in FIGS. 4A-4C, at the beginning of each period certain variables used in the data processing system must be initialized (block 101). These variables include: the number of transactions during the day (TDAY), the number of transactions during the period (TPERIOD), the number of contracts sold during the day (DSALES), the number sold during the period (PSALES), the number redeemed during the day (DRDMP), the number redeemed during the period (PRDMP), the number of floating rate zero coupon notes of each maturity M (FRZCN(M)), and the number of each maturity sold during the day (DSFRZCN(M)), sold during the period (PSFRZCN(M)), redeemed during the day (DRFRZCN(M)), and redeemed during the period (PRFRZCN(M)).

Customers interact with the system at point-of-sale stations. These can be located at remote points limited only by the ability to communicate electronically with the central computer. Orders and customer inquiries are collected at the point-of-sale stations (block 102). The customer first enters his name (NAME) and account number (NUMBER), or if he does not have an account, indicates that a new account is to be opened. The customer then enters an order or inquiry (referred to generically at block 102 as DATA). A customer may submit a purchase order (block 103) or a redemption order (block 104) or may simply inquire as to the status of his or her account (block 105). Transaction requests include an identification of the floating rate zero coupon note to be purchased or redeemed and the transaction amount (referred to generically at blocks 103 and 104 as CONTRACT). Inquiries specify the particular information items requested. These orders are transmitted to the central computer, and information regarding transactions, floating rate zero coupon note prices, and account status are received back from the central computer and displayed on a CRT terminal (block 106). Alternatively, purchase orders and redemption orders could be stored at block 106 and transmitted periodically (e.g., daily) to the central computer for processing. At the conclusion of each transaction, a customer can request a printed confirmation record of the transaction (block 107).

Each customer request is processed individually in a loop beginning with test 108 and ending at block 125. The incoming request is first subjected to test 108. If the dollar amount of the transaction (AMOUNT) is equal to zero, the request is an inquiry, which is referred to blocks 109-111 for processing. The status of the account is checked at block 109. Information the customer requested is retrieved from the master account file at block 110 and the response is transmitted to the investor in block 111. The requested information is displayed on the CRT terminal. Table 1 illustrates the type of information a customer might request and how that information might be formatted. The response to each inquiry would list the account holder's name and account number and then provide the information requested, in this case, the number of contracts in the account, the current market value of each, and their combined current market value.

TABLE 1

| | |
|---|---|
| Name: | JOHN Q. SAVER |
| Account Number: | 001-00000001 |
| Number of Contracts: | 4 |
| Current Book Value: | $50,000.00 |
| First Contract Matures: | 9/1/90 |
| Current Book Value: | $12,500.00 |
| Second Contract Matures: | 9/1/91 |
| Current Book Value: | $12,500.00 |
| Third Contract Matures: | 9/1/92 |
| Current Book Value: | $12,500.00 |
| Fourth Contract Matures: | 9/1/93 |
| Current Book Value: | $12,500.00 |

If AMOUNT is not equal to 0, the customer request passes to test 112. If AMOUNT is less than 0, the request is a redemption request, and the system flow passes to block 113. At block 113 the account information is verified by checking the master account file at block 114 to make sure that the account is valid and that it contains the floating rate zero coupon notes the customer wishes to sell. When the account information has been verified, data flow moves to test 115 where it is determined whether or not the customer is requesting early withdrawal—i.e., redemption prior to the scheduled maturity date of the floating rate zero coupon note. If so, the early withdrawal penalties are first calculated at block 116. The calculation of the early withdrawal penalties is described in FIG. 6. Otherwise control passes directly to block 117 where the redemption value for each of the floating rate zero coupon notes the account holder wishes to redeem is calculated. The calculation of the redemption value for a floating rate zero coupon note, which is described in FIGS. 7A-7B, is based on the periodic escalation rates in the cost of the service or commodity giving rise to the liability being funded—e.g., college tuition—over the life of the floating rate zero coupon note and involves a downward adjustment for any early withdrawal penalties. The current value of the floating rate zero coupon note is calculated by escalating the base value of the floating rate zero coupon note at the date of purchase at the rates of escalation in the cost of college between the date of purchase and the date of redemption and adding the unamortized premium or subtracting the unaccreted discount, as appropriate. These escalation rates are taken from the master file of escalation rates in U.S. college costs at block 118. After the redemption value has been calculated, the amount of cash that willl have to be paid to the account holder is subtracted from the amount of cash in the system at block 119. Control then passes to block 123.

If instead AMOUNT is greater than 0, the request is either a purchase request or an installment payment relating to an earlier purchase. In that case, control passes from test 112 to test 120, which determines whether the request pertains to a new account. If so, a new account is opened at block 121. Otherwise control passes to block 122 where the amount of the cash payment is added to the amount of cash in the system.

Transaction data for both redemptions and purchases then pass to block 123 which checks the transaction data for possible errors in calculation at the point-of-sale station. From verification block 123, system flow passes to block 124 where each transaction is recorded in the system's master account file and master transaction file. Thereafter, system flow passes to block 125, where the floating rate zero coupon note liability schedule is updated to reflect purchases or redemptions.

Figure 8:
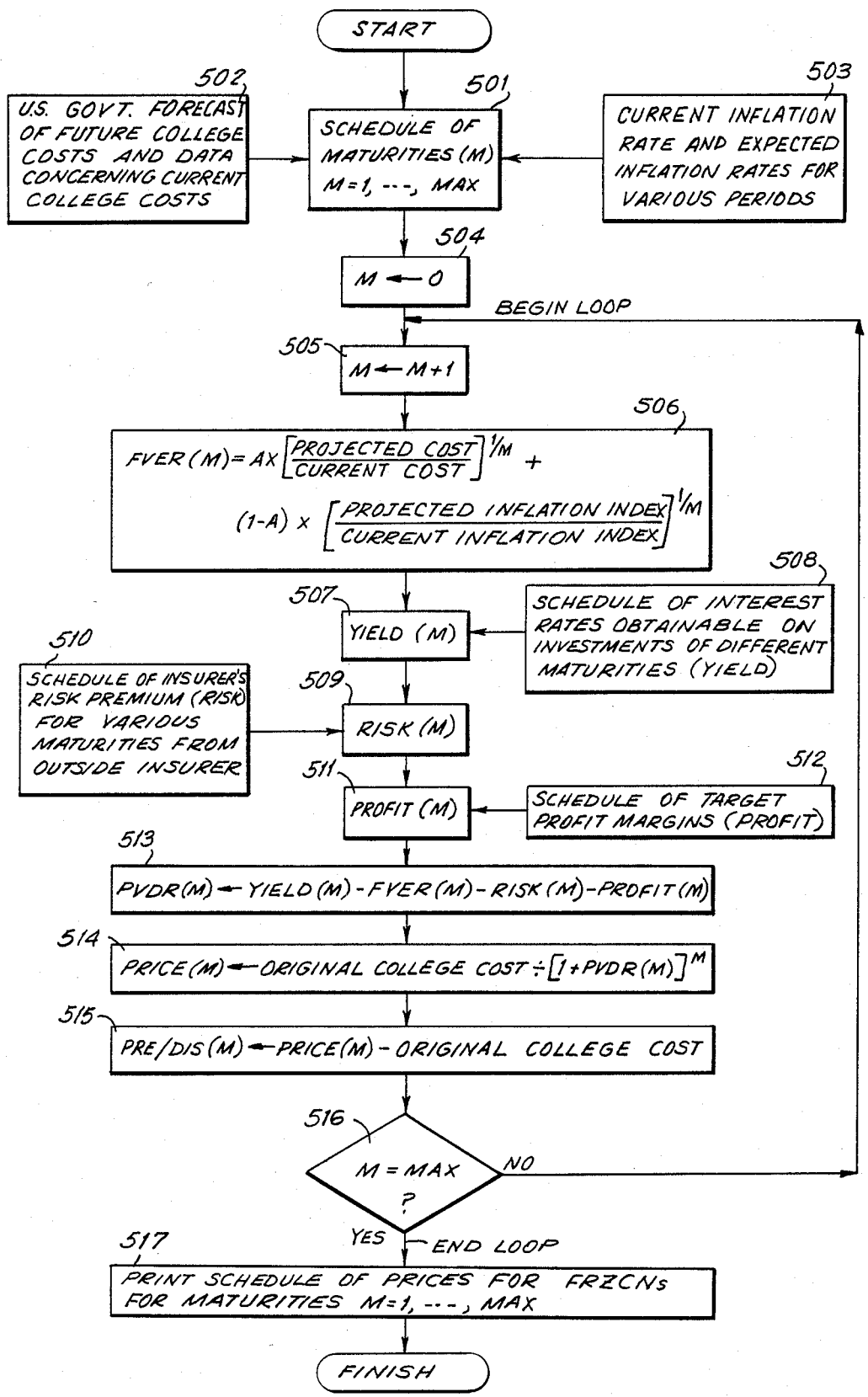
FIG. 8 is a flow chart depicting in more detail the method and apparatus for establishing the schedule of prices to be charged for the floating rate zero coupon notes represented by block 127 in FIG. 4B.

Next, system flow passes to test 126, which determines whether all the transactions for the particular day in question have been processed. If not, system flow passes back to the beginning of the loop to receive the next customer request. If it is the end of the day and all transactions for the day have been processed, control passes to block 127, which prepares the next day's schedule of floating rate zero coupon note prices. Alternatively, in certain applications, it may be necessary to update the floating rate zero coupon note price list with greater frequency. FIG. 8 describes the process used for updating the schedule of floating rate zero coupon note prices, which is based on the current and expected inflation rates in the cost of college, the interest rate available to fund the floating rate zero coupon note, the maturity of the floating rate zero coupon note, and the insurer's risk premium required to compensate for the cost escalation risk assumed by the issuer of the floating rate zero coupon note. The updated price schedule is transmitted to the point-of-sale stations. There the schedule is used by the salespeople to provide cost information to customers and to set the unit cost for floating rate zero coupon note purchases.

Figure 9A:
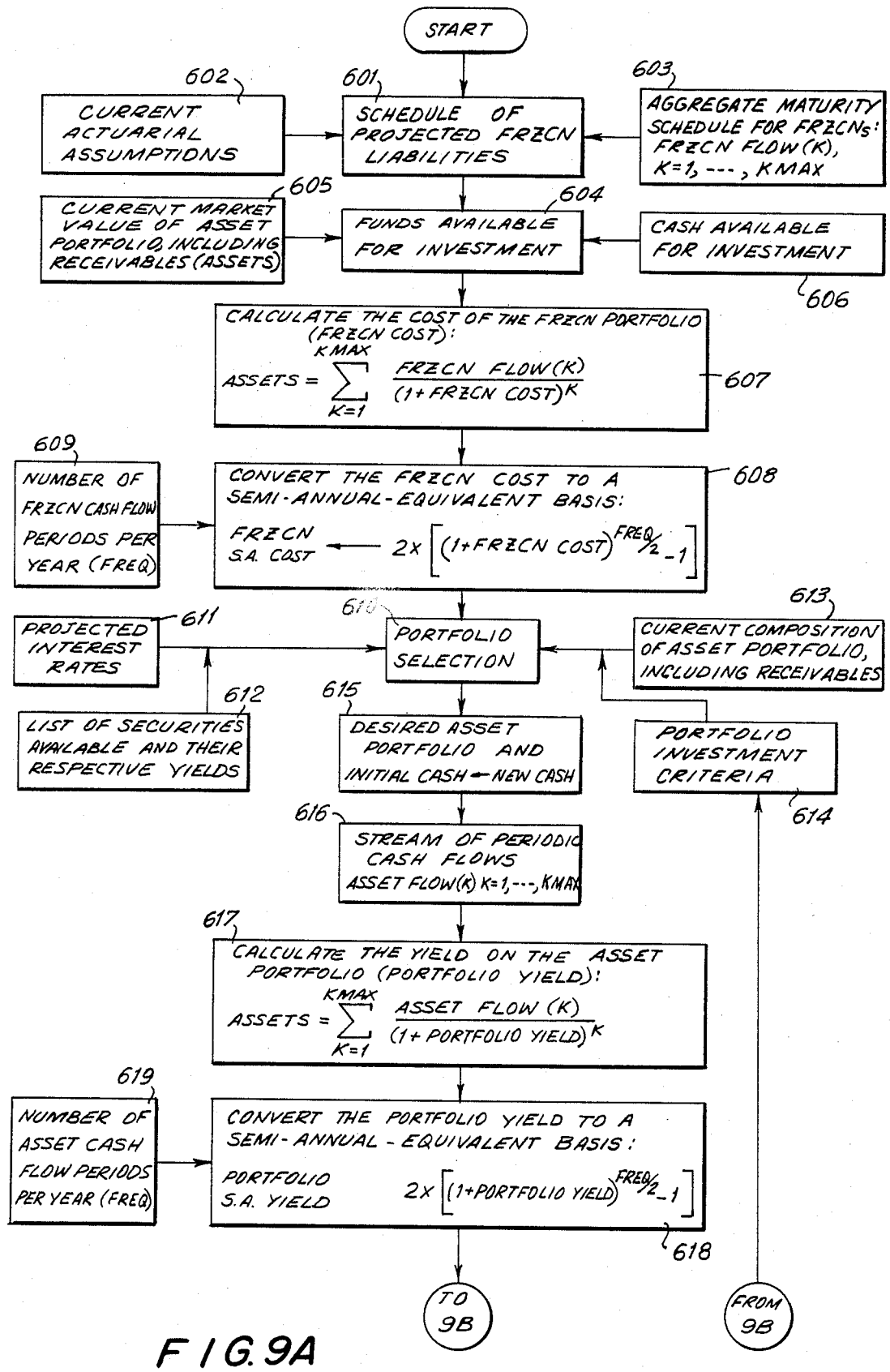
FIGS. 9A–9B are a flow chart depicting in more detail the investment portfolio update operation represented by block 128 in FIG. 4B.
Figure 9B:
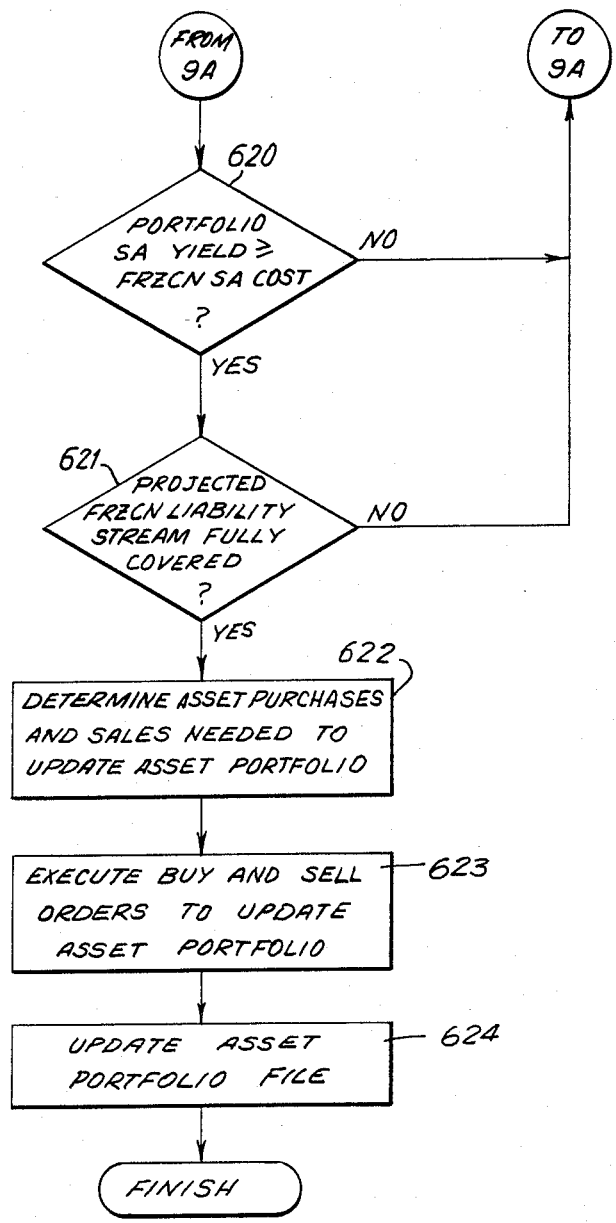

System flow then proceeds to block 128, which carries out the update asset portfolio operation to determine the updated investment portfolio based on current and projected customer transactions, the aggregate maturity schedule for the floating rate zero coupon notes, the amount of cash available for investment, projected interest rates, the current composition of the asset portfolio, and the portfolio investment criteria supplied by the fund manager. FIGS. 9A-9B describe the update asset portfolio operation in greater detail. The data processing system advises the fund manager of its determination concerning the net amount of required investment transactions and provides a list of suitable investment alternatives and their respective yields. Based on this information, the manager can choose the investment transactions to be made and enter the investment transaction data into the system.

Figure 10A:
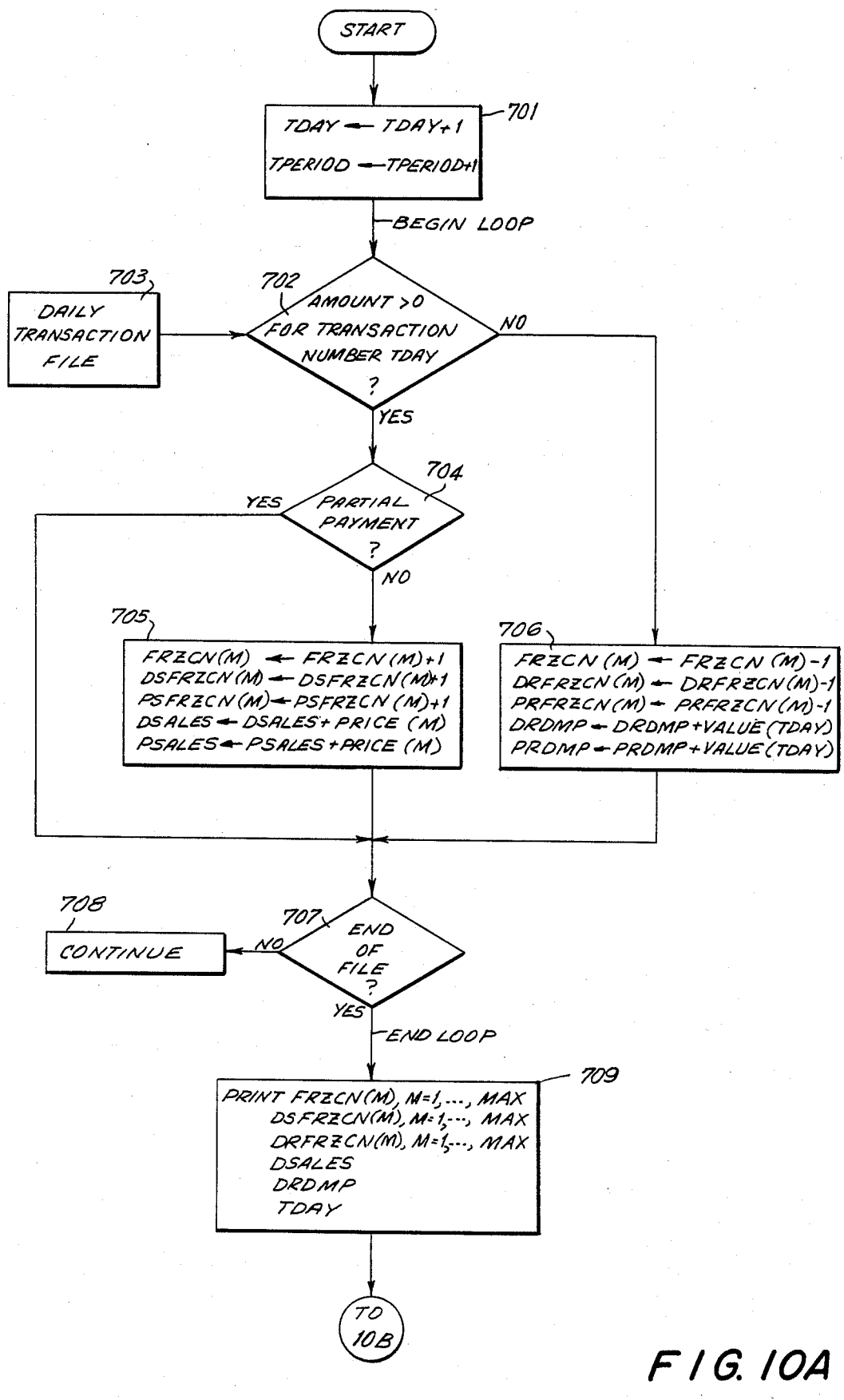
FIGS. 10A–10B are a flow chart depicting in more detail the management information system represented by block 129 in FIG. 4B.
Figure 10B:
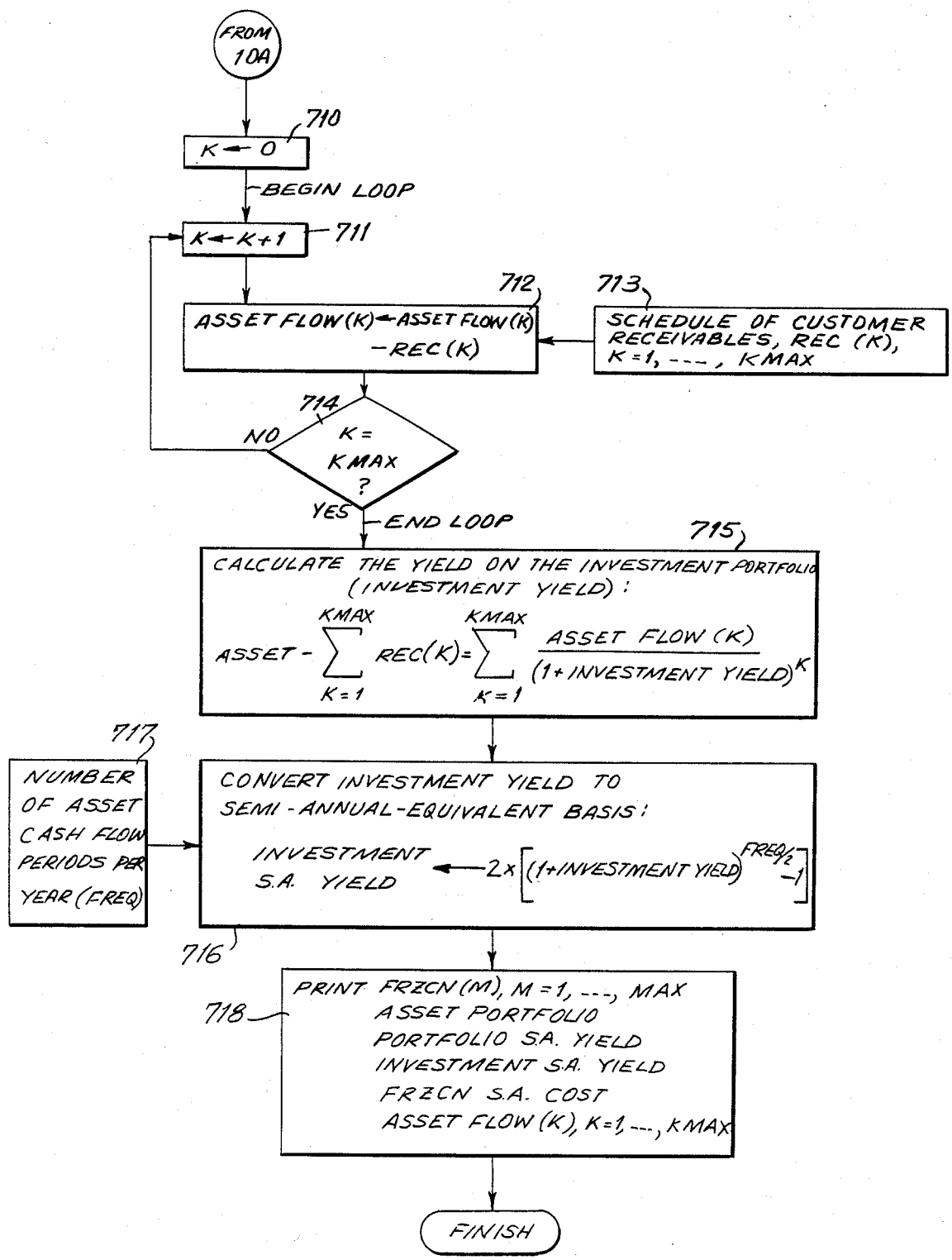

After the investment transaction data are entered, system flow passes to block 129 where a daily transaction report is prepared for the investment manager. This report, the preparation of which is described in greater detail in FIGS. 10A-10B, summarizes the transactions that took place during the day; provides the end-of-day asset and liability position; furnishes the portfolio yield, investment yield, and composite cost of the floating rate zero coupon note liabilities, all on a semi-annual-equivalent-yield basis; and indicates the projected income flows from the updated asset portfolio and the projected stream of floating rate zero coupon note liabilities. Then at block 130 the variables that measure each day's acitivity are reinitialized for the beginning of the next day.

Figure 11A:
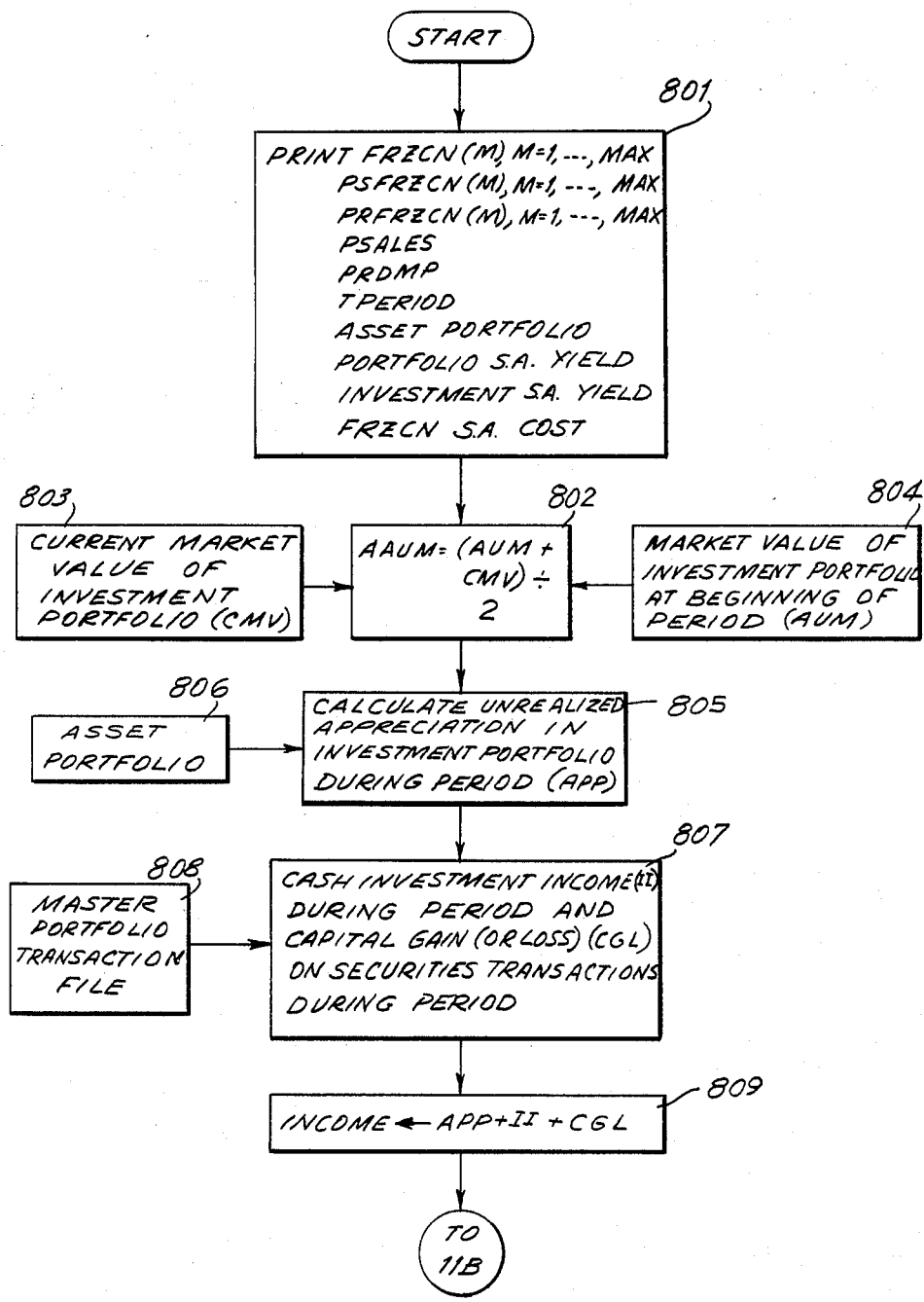
FIGS. 11A–11B are a flow chart depicting in more detail the period-by-period investment performance monitoring operation represented by block 132 in FIG. 4B.
Figure 11B:
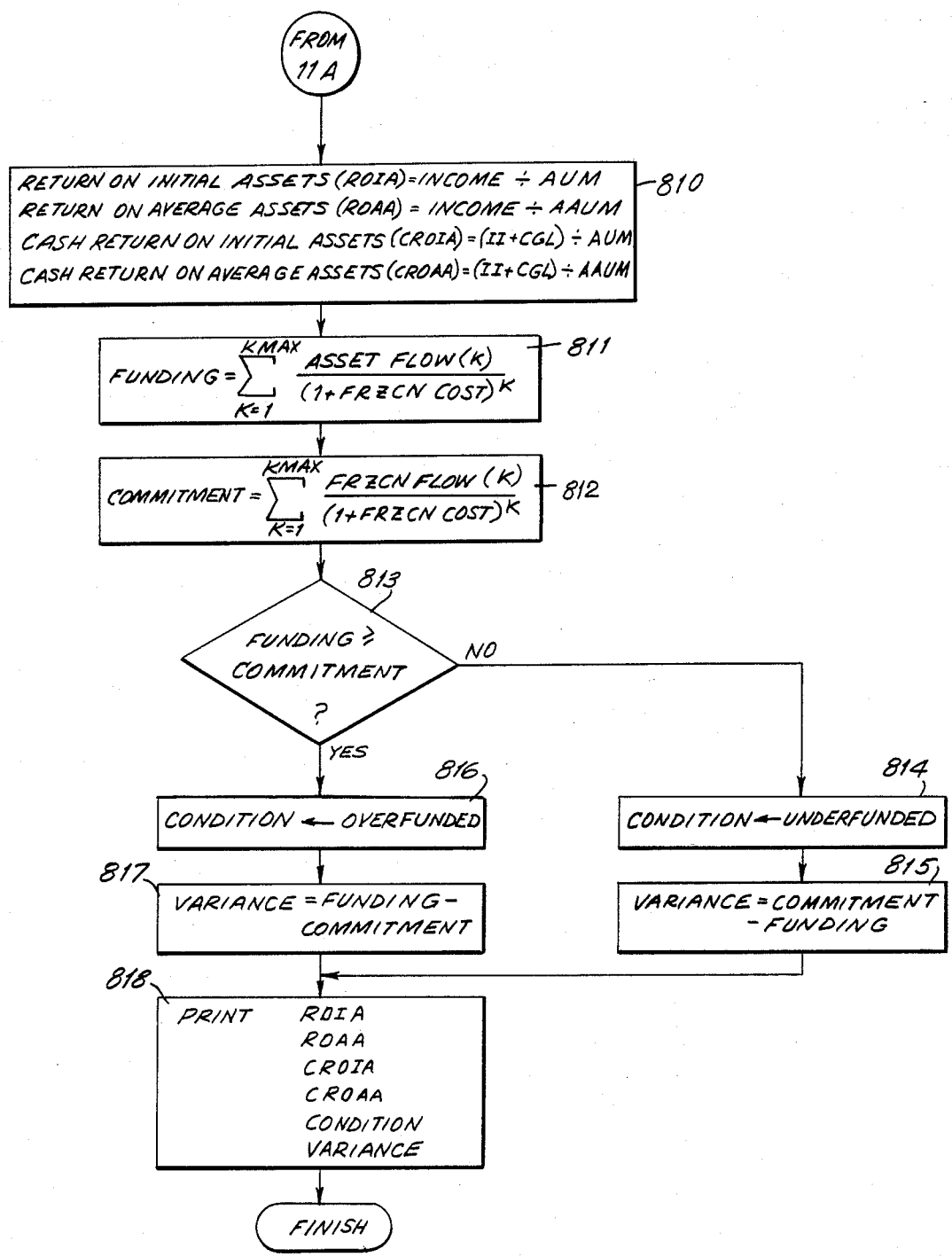

Next system flow passes to test 131 where it is determined whether the day in question is the last day of the current period. If not, system flow passes to block 138. If it is the last day of the period, system flow passes to block 132 where the end-of-period investment performance report is prepared. This report, the preparation of which is described in greater detail in FIGS. 11A-11B, provides various measures of investment performance which the fund manager can use to monitor the profitability of the investment program adopted during the period. In addition, it is calculated in block 132 whether the fund is overfunded or underfunded and the amount of any overfunding or underfunding. A significant underfunding would signal to the fund manager the need to find higher yielding investments in the asset portfolio in order to avoid the danger of failing at some point to have sufficient cash to meet maturing floating rate zero coupon note liabilities.

Figure 12A:
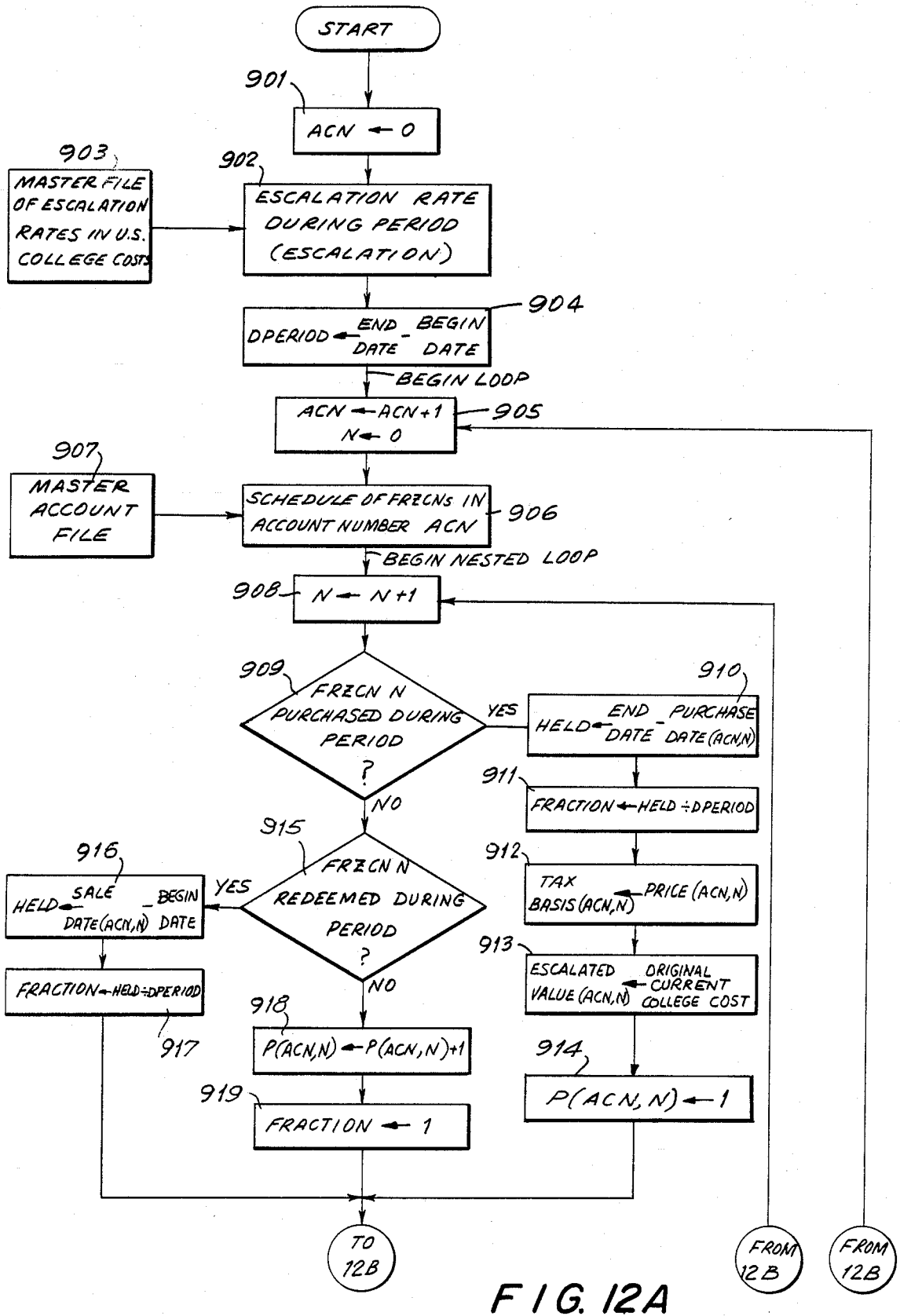
FIGS. 12A–12B are a flow chart depicting in more detail the calculation of each investor's investment income and taxable income represented by block 133 in FIG. 4C.
Figure 12B:
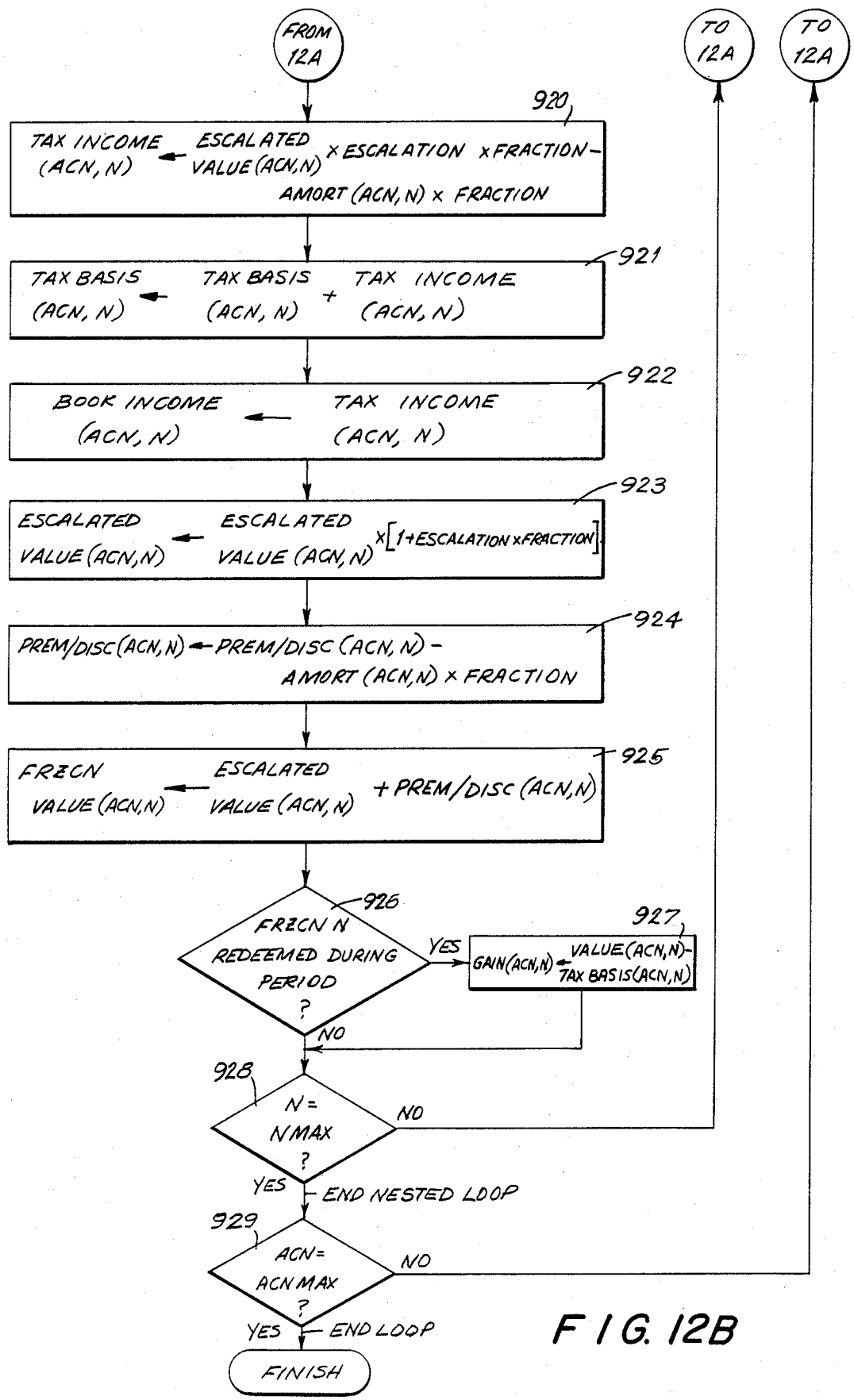

Next system flow passes to block 133 where the system periodically (e.g., quarterly) calculates for each account holder the amount of investment income and the amount of taxable income earned during the period on the floating rate zero coupon notes in his or her account. FIGS. 12A-12B describe these calculations in greater detail. At block 134 the system prepares end-of-period reports for mailing to account holders. FIGS. 13-13B describe the individual investor record-keeping and reporting system in greater detail. System flow then passes to block 135 where the end-of-period financial statements are prepared drawing on information that has been recorded in the accounting files at block 136 during the period. System flow then moves to block 137 where the variables that measure each period's activity are reinitialized for the beginning of the next period.

Next system flow passes to block 138 where at the end of each day the daily transaction summary and summary of current position are transmitted to the fund manager and at the end of each period the investment performance and position report and the end-of-period financial statements are transmitted to the fund manager.

Figure 5A:
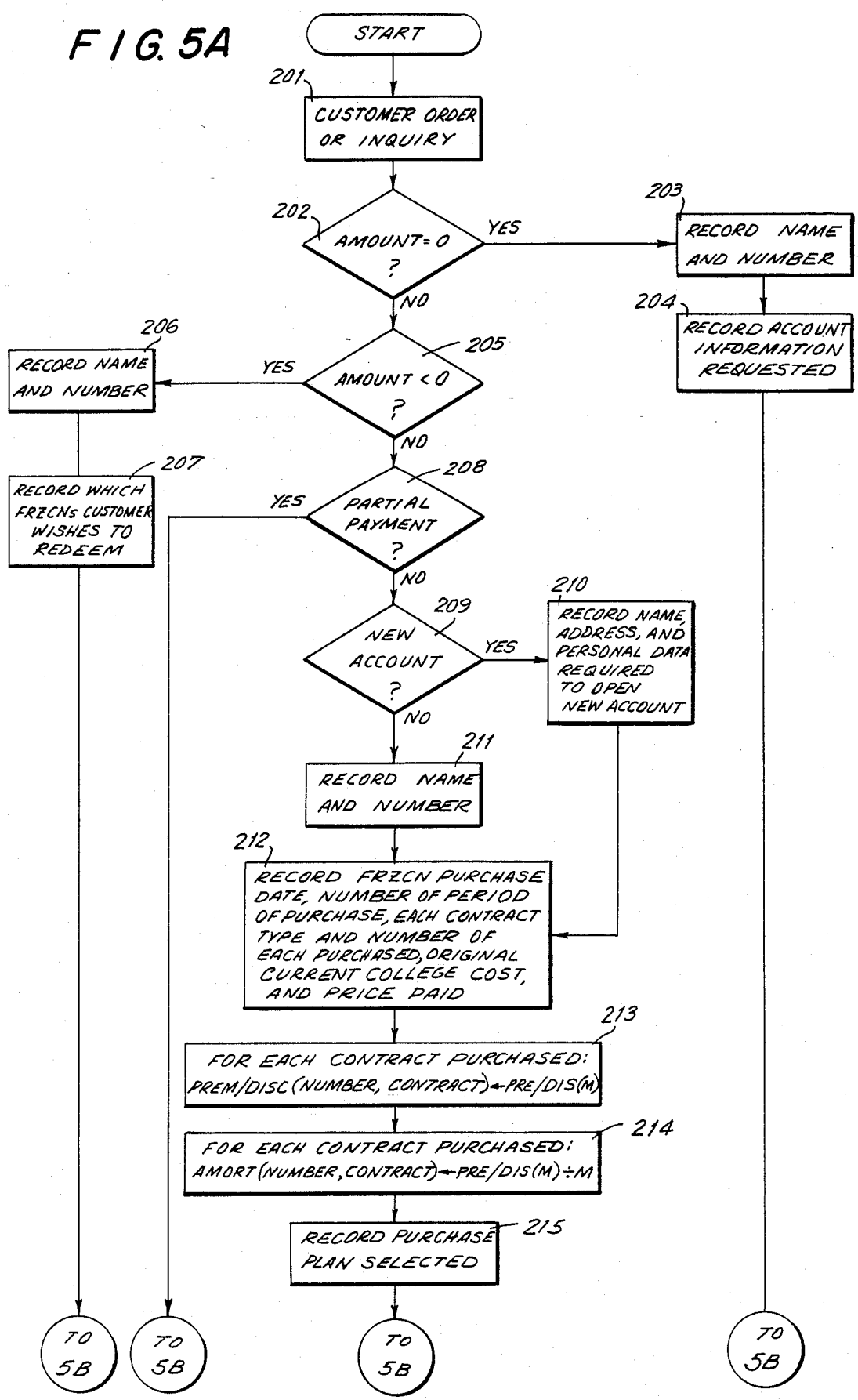
FIGS. 5A–5B are a flow chart depicting in more detail the point-of-sale station to central computer interface represented by block 106 in FIG. 4A.
Figure 5B:
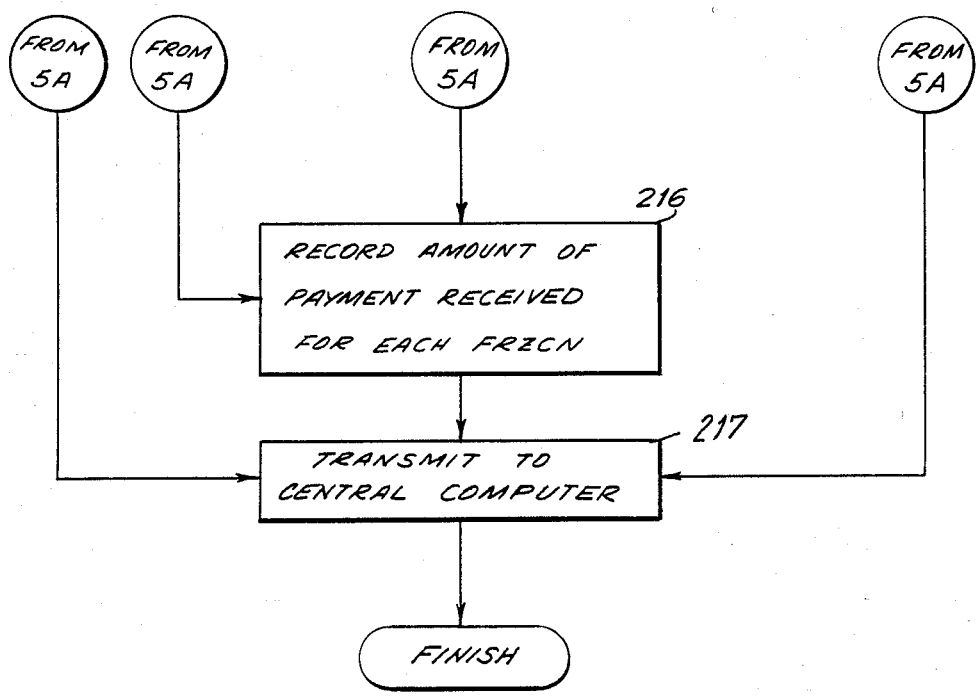

Referring now to FIGS. 5A-5B, there is shown a more detailed flow chart depicting the point-of-sale-station-to-central-computer interface corresponding to block 106 in FIG. 4A. Information is collected at the point-of-sale station and transmitted to the central computer, and information is received back from the central computer. The process diagrammed in FIGS. 5A-5B involves the transmission of information from the point-of-sale stations to the central computer.

The process starts at block 201 where a salesperson who is serving a customer at a point-of-sale station logs on to the system. This transmits a signal to the central computer indicating that a customer order or inquiry is about to be received at the point-of-sale station. The central computer prompts the point-of-sale station at test 202 by asking whether the customer has an inquiry, which is signified by AMOUNT=0, or whether the customer wishes to effect a transaction, which is signified by AMOUNT is not equal to 0.

If AMOUNT=0, the central computer prompts the point-of-sale station at block 203 for the account holder's name (NAME) and account number (NUMBER) and at block 204 for the items of information requested, such as the current schedule of floating rate zero coupon note prices or the status of his or her account. This information is transmitted to the central computer at block 217 for processing.

If AMOUNT is not equal to 0, then a transaction or a payment will take place. System flow passes to test 205 where AMOUNT is tested in order to determine the nature of the transaction. If AMOUNT is less than 0, the transaction involves a redemption. The central computer prompts the point-of-sale station at block 206 to record the account holder's name and account number and at block 207 to record the floating rate zero coupon notes that the account holder wishes to redeem. This information is transmitted to the central computer at block 217 for processing.

If AMOUNT is greater than 0, the transaction involves either a purchase of a floating rate zero coupon note or a partial payment for a floating rate zero coupon note the account holder purchased previously. Test 208 tests for a partial payment. If the transaction is a partial payment, system flow passes to block 216 where the central computer prompts the point-of-sale station to record the amount of the payment received for each floating rate zero coupon note. If the payment is not a partial payment, it represents a purchase. System flow passes to test 209 to determine whether a new account needs to be opened. If so, the central computer prompts the point-of-sale station to record the person's name and address and certain personal data that can be used later if necessary to verify the account holder's identity at block 210. Otherwise, system flow passes to block 211, where the central computer prompts the point-of-sale station to record the account holder's name (NAME) and account number (NUMBER) and then to block 212 where the central computer asks for the list of floating rate zero coupon notes and number of each the account holder wishes to purchase and records the purchase date, the sequential number of the period, the contracts purchased (i.e., types of contracts and number of each), the cost of college at time of purchase (ORIGINAL CURRENT COLLEGE COST), and the price paid (PRICE) for each contract purchased. Over time, the current cost of college represents the adjusted par value of the floating rate zero coupon note, and ORIGINAL CURRENT COLLEGE COST represents the par value of the floating rate zero coupon note at the time of puchase. System flow then passes to block 213 where the central computer records the amount of premium (if PRE/DIS is positive) or discount (if PRE/DIS is negative) for each contract purchased. The amount of premium or discount is simply transferred from the floating rate zero coupon note price file prepared in the process shown in FIG. 8. Next, at block 214, the amortization rate per period is calculated by dividing the total amount of premium or discount (PRE/DIS) by the number of periods (M) until the floating rate zero coupon note is scheduled to mature.

Customers may be offered a variety of purchase plans that permit purchase on a partial payment basis. For example, customers might be able to spread payment over a period of 5 years or over a period of 10 years rather than having to pay the entire purchase price in cash at the time of purchase. At block 215 the central computer prompts the point-of-sale station for the purchase plan the customer selects, and at block 216 it asks for the amount of the purchase price received in cash for each floating rate zero coupon note purchased. This information is transmitted to the central computer at block 217 for processing. At this point the input operation has been completed and control is transferred to block 108 where the central computer begins the processing operation.

Figure 6:
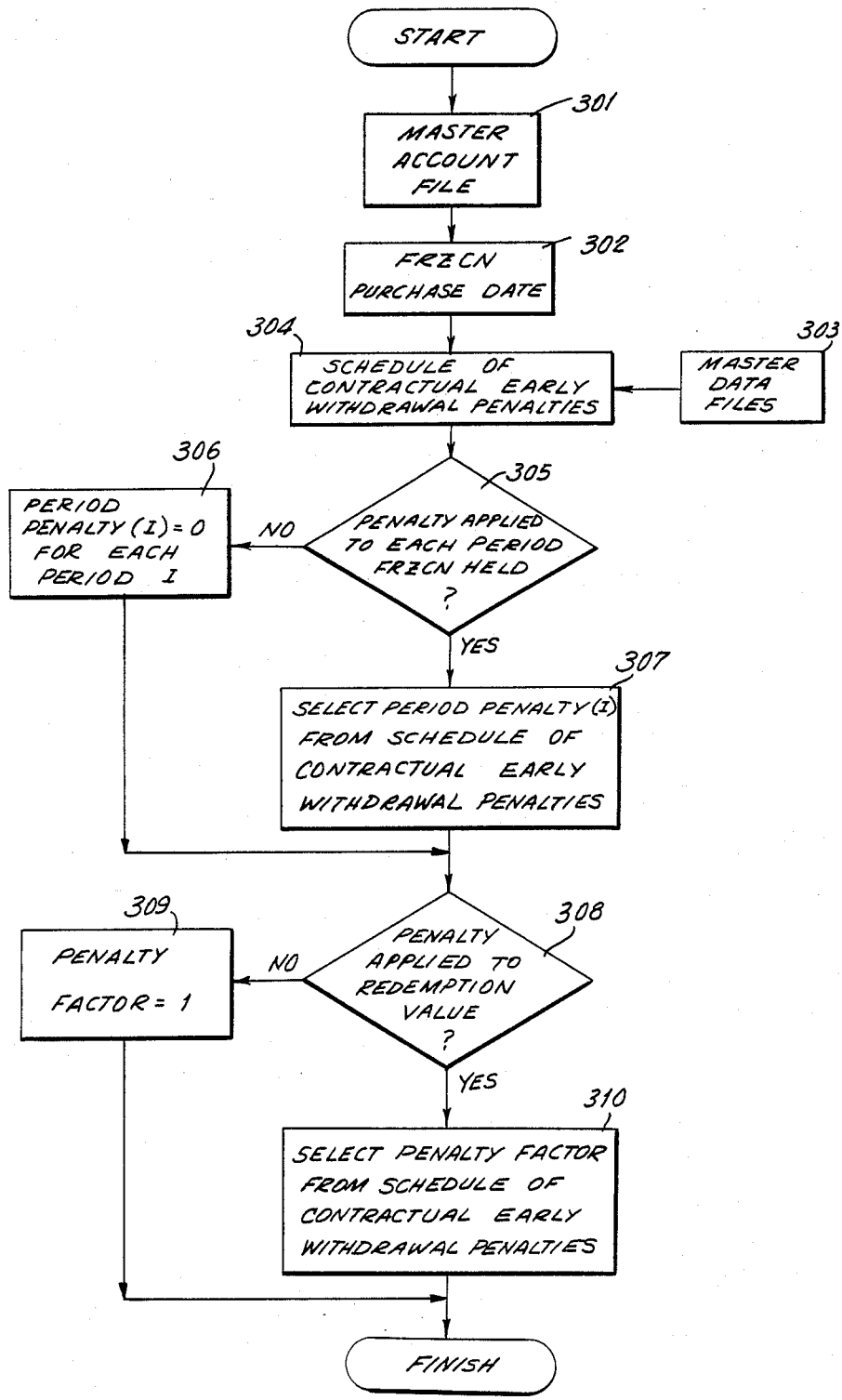
FIG. 6 is a flow chart depicting in more detail the calculation of the early withdrawal penalty represented by block 116 in FIG. 4A.
Figure 7A:
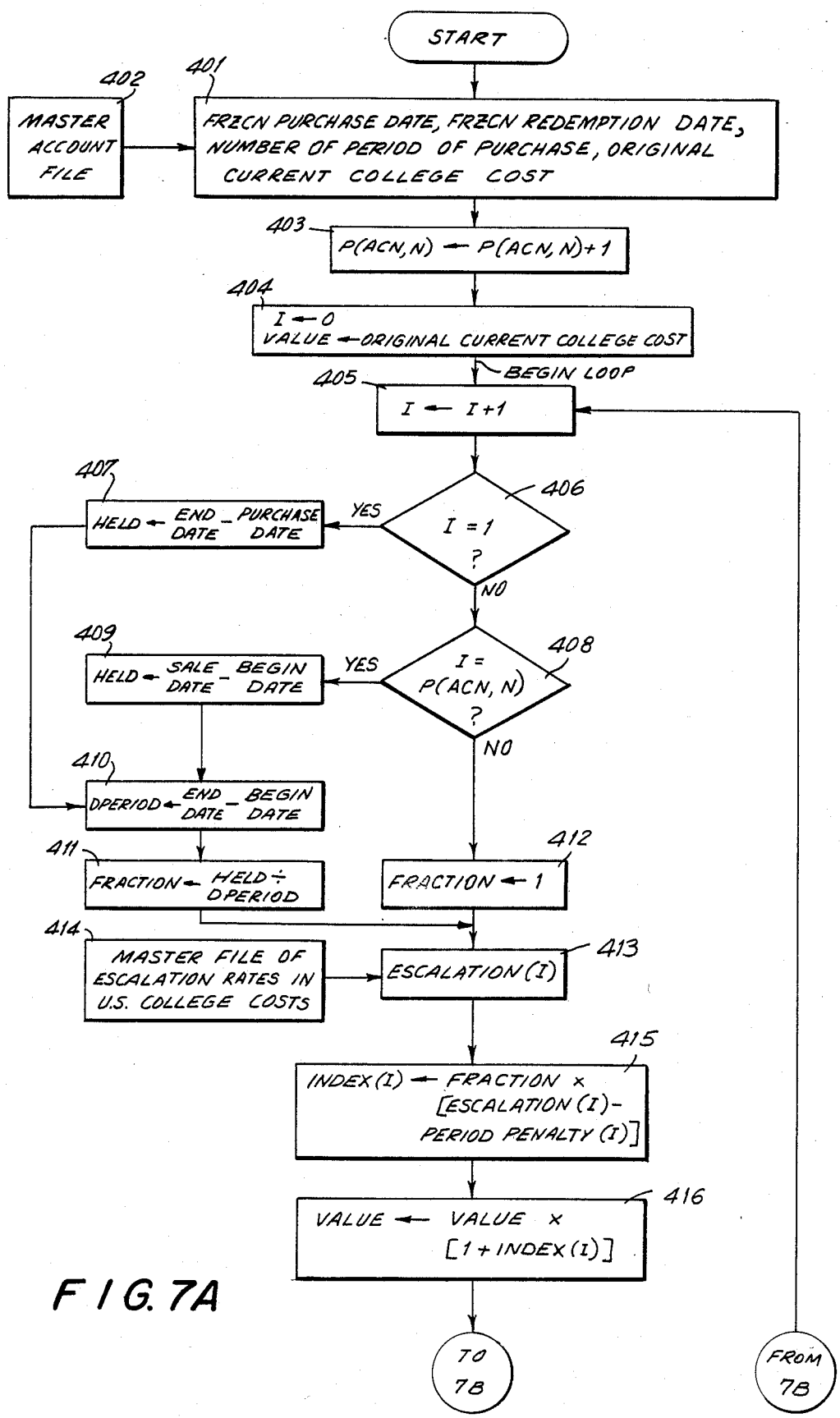
FIGS. 7A–7B are a flow chart depicting in more detail the calculation of the redemption value of a floating rate zero coupon note represented by block 117 in FIG. 4A.
Figure 7B:
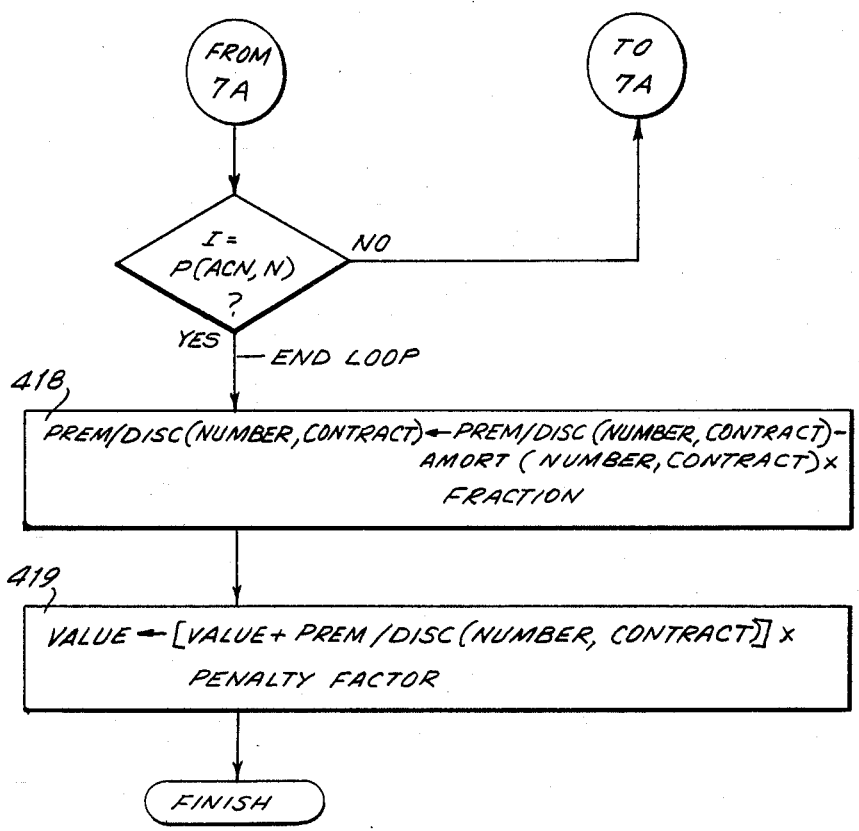

Referring now to FIG. 6, there is shown a more detailed flow chart depicting the calculation of the early withdrawal penalty represented by block 116 in FIG. 4A. Customers who request to have their floating rate zero coupon notes redeemed prior to maturity will be required to pay a penalty for early redemption. FIG. 6 reflects two possible methods of calculating the early withdrawal penalty. The early withdrawal penalty can be assessed on a period-by-period basis by adjusting downward the respective period-by-period escalation rates. Alternatively, there can be a single downward adjustment of the gross redemption value of the floating rate zero coupon note. The method of calculation illustrated below in FIGS. 7A–7B allows for both possibilities.

The process starts at block 301 where the master account file is consulted for the floating rate zero coupon note purchase date, which is retrieved at block 302. Based on the purchase date, the master data files are consulted at block 303 to determine the schedule of early withdrawal penalties that applied on the purchase date and that are consequently embodied in the floating rate zero coupon note contract. The applicable schedule is retrieved at block 304.

Test 305 tests whether the early withdrawal penalties are applied on a period-by-period basis. If so, the variables PERIOD PENALTY(I) for each period I during the life of the floating rate zero coupon note in question are loaded with the penalty data at block 307. If not, the entire array PERIOD PENALTY(I) is loaded with zeroes at block 306.

Next, system flow passes to test 308 where the system tests whether there is an early withdrawal penalty that applies to the gross redemption value. If not, the variable PENALTY FACTOR is set equal to 1 at block 309. If there is an overall penalty factor, that value is loaded into the variable PENALTY FACTOR at block 310. At this point the calculation of the early withdrawal penalties is completed and control is transferred to block 117 where the floating rate zero coupon note's redemption value is calculated.

Referring now to FIGS. 7A–7B, there is shown a more detailed flow chart depicting the calculation of the redemption value of the floating rate zero coupon note (VALUE) represented by block 117 in FIG. 4A. In order to allow for the possibility that the early withdrawl penalties may be applied on a period-by-period basis, it is necessary to escalate the cost of college at the time the floating rate zero coupon note was purchased at the period-by-period escalation rates for the periods between the purchase date and the redemption date and amortize the premium or accrete the discount. The cost of college at the time the floating rate zero coupon note was purchased appears as ORIGINAL CURRENT COLLEGE COST, the original par value of the floating rate zero coupon note, in FIGS. 7A–7B. The escalated ORIGINAL CURRENT COLLEGE COST is equal to the current college cost, which in turn is equal to the adjusted par value of the floating rate zero coupon rate.

The process starts at block 401 where the floating rate zero coupon note purchase date, the number of the period in which the floating rate zero coupon note was purchased (which is used to retrieve historical data from the master data files), college cost at the time of purchase (ORIGINAL CURRENT COLLEGE COST), and the redemption date are obtained from the master account file (block 402). At block 403 the system increments the period counter P(ACN,N) by 1. Immediately thereafter, the value in P(ACN,N) represents the number of periods during which the floating rate zero coupon note was held. System flow passes to block 404 where the variable I, which keeps track of the periods processed in calculating VALUE, is initialized to zero and where the variable VALUE, which will eventually contain the redemption value of the floating rate zero coupon note, is initialized to ORIGINAL CURRENT COLLEGE COST.

An iterative process begins at block 405, the purpose of which is to build up to the redemption value of the floating rate zero coupon note (VALUE) by proceeding one period at a time. At block 405 I is increased by 1. System control then passes to test 406 where the system tests whether period I is the period in which the floating rate zero coupon note was purchased (I=1). If so, control passes to block 407. The system calculates the number of days the floating rate zero coupon note was held (HELD) between the purchase date (PURCHASE DATE) and the end of the period (END DATE) at block 407. Control then passes to block 410. Otherwise, control passes to test 408 where the system tests whether period I is the period in which the floating rate zero coupon note is to be redeemed (I=P(ACN,N)). If so, control passes to block 409 where the system calculates the number of days the floating rate zero coupon note was held (HELD) between the redemption date (SALE DATE) and the date that marks the beginning of the period (BEGIN DATE). Control then passes to block 410 where the system calculates the total number of days in the period (DPERIOD). Next at block 411 the system calculates the fraction of the period the floating rate zero coupon note was held (FRACTION) as the ratio of the number of days it was held (HELD) to the number of days in the period (DPERIOD). System flow then moves to block 413. If 1 is less than I is less than P(ACN,N), the period in question is one of the intermediate periods, determined at test 408. The floating rate zero coupon note was held throughout each of these periods so that FRACTION=1 (block 412).

Next system flow passes to block 413 where the system retrieves the escalation factor for period I from the master file of escalation rates in U.S. college costs at block 414. This value is loaded into the variable ESCALATION(I) at block 413. System flow passes to block 415 where the adjusted escalation factor for each period is calculated. The value in PERIOD PENALTY(I) is subtracted from ESCALATION(I) and the difference is multiplied by FRACTION. The resulting value is stored in INDEX(I) and represents the adjusted escalation factor. For example, suppose the escalation factor for period 1 is 0.10, which indicates a 10% rate of escalation in the cost of college during period 1; the penalty for period 1 is 0.005, which represents $\frac{1}{2}$ of 1%; and the floating rate zero coupon note was held for one-half the initial period, that is, the floating rate zero coupon note was purchased on a date that represents the midpoint of one of the escalation periods (e.g., the 45th day in a quarter). In that case,

ESCALATION (1)=0.10
PERIOD PENALTY (1)=0.005
INDEX (1)=0.5×[0.10−0.005]=0.0475.

Next system flow passes to block 416 where the system builds up to the redemption value of the floating rate zero coupon note. The previous value of the variable VALUE is multiplied by the sum of 1 and the value just calculated for INDEX (I), the adjusted escalation rate, and the new value replaces the old value of the variable VALUE at block 416. To continue the previous example, if ORIGINAL CURRENT COLLEGE COST=$10,000, then

VALUE=10,000×1.0475=$10,475.

System flow then passes to test 417 where the system tests whether the loop is completed. If I is less than P(ACN,N), the iterative process continues because all periods spanning the purchase date and the redemption date have not been covered. If I=P(ACN,N), all periods spanning the purchase date and the redemption date have been considered, and system flow passes to block 418 where the system calculates the amount of unamortized premium or discount (PREM/DISC) as the balance at the begining of the period minus the product of the amortization rate per period (AMORT) times the fraction of the period the floating rate zero coupon note was held (FRACTION). Next, system flow passes to block 419 where the redemption value is adjusted for the amount of unamortized premium or discount and for any overall redemption penalty. For example, suppose VALUE=$25,000 when I=P(ACN,N), the amount of unamortized premium or discount at the beginning of the period was 1000, the amortization rate per period is 100, FRACTION=0.5, and PENALTY FACTOR=0.95, that is, there is an early withdrawal penalty equal to 5% of the gross redemption value. Then at block 418,

PREM/DISC=1000−100×0.5=950 and at block 419,

VALUE=[25,000+950]×0.95=$24,652.50.

At this point the calculation of the redemption value of the floating rate zero coupon note has been completed and control is transferred to block 119 in FIG. 4A.

Referring now to FIG. 8, there is shown a more detailed flow chart depicting the method and apparatus for establishing the schedule of prices to be charged for the floating rate zero coupon notes represented by block 127 in FIG. 4B. The price calculation creates a schedule of prizes for floating rate zero coupon notes of various maturities, for example, floating rate zero coupon notes maturing in 1 year, 2 years, 2½ years, 5 years, and so on. The calculation proceeds on the basis of information concerning current college costs, projected future college costs, the current interest rates, projected future interest rates, the risk premium that compensates the fund for assuming the cost escalation risk, and the target profit margins supplied by the fund manager. In addition, the calculation may proceed, if desired, on the basis of current and projected general inflation rates. The price schedule calculation is repeatedly at regular intervals, for example, daily, as FIG. 4B assumes.

The process begins at block 501 where the fund manager enters the schedule of maturities M for which floating rate zero coupon notes will be created and offered for sale. The fund manager will be able to specify a range of maturities from 1 up to some larger value MAX. For example, the fund manager might specify maturities of between 1 and 40 semi-annual periods in increments of 1 semi-annual period, in which case MAX=40. The routine illustrated in FIG. 8 assumes that the fund manager wishes to create a floating rate zero coupon note for each integer value between 1 and MAX. It should be understood, however, that the routine can be adapted, within the scope of the invention, to permit some other pattern of maturities. Also at block 501, data concerning the current college cost and projected future college costs are entered into the system from block 502 and data concerning the current general inflation rate and projected future inflation rates (if these data are used) are entered into the system from block 503 by the fund manager. Data concerning current and future college costs can be obtained from the U.S. Department of Education (U.S. Department of Education College Cost Forecasts), and data concerning current and projected inflation rates are available from a variety of commercial sources.

Next system flow passes to block 504 where the system initializes the variable M to zero. The routine illustrated in FIG. 8 proceeds iteratively, calculating the floating rate zero coupon note price that corresponds to each maturity, one maturity at a time. System flow then passes to block 505, in which M is updated by 1. Block 505 marks the beginning of the loop for calculating the floating rate zero coupon note prices for a single maturity at a time.

Control then passes to block 506 where the system utilizes the current college cost, current inflation rate, the college cost projected for M periods in the future, and the inflation rate projected for M periods in the future to calculate a future value escalation rate (FVER) for maturity M. The ratio of the projected future college cost for M to the current college cost when raised to the power 1/M, $$[\text{PROJECTED COST/CURRENT COST}]^{1/M}$$

measures the average projected escalation rate in college costs over the period extending M periods into the future. The ratio of the projected inflation index for M to the current inflation index when raised to the power 1/M, $$[\text{PROJECTED INFLATION INDEX/CURRENT INFLATION INDEX}]^{1/M}$$

measures the average projected inflation rate over the period extending M periods into the future. FVER is then calculated as a weighted average of the average projected escalation rate in college costs and the average projected inflation rate. The weights A and $1-A$, where A is a number between 0 and 1, are based on a historical regression analysis of prior year forecasts to determine the value of A that leads to values for FVER that most closely track actual escalation rates in college costs. Commercially available regression analysis packages are available for this purpose. It should be understood that the routine can be adapted, within the scope of the invention, so as to have a different value of A for each maturity M.

Next system flow passes to block 507 where the system obtains the yield available on investments that mature in M periods (YIELD(M)) from the schedule of interest rates obtainable on investments of different maturities, which is stored in the master data files. The value of RISK(M), the insurer's risk premium that compensates for the cost escalation risk the fund bears over the period extending M periods into the future, is entered by the fund manager at block 509 from the schedule of said premiums at block 510. The magnitude of the risk premium can be adjusted to compensate for market volatility or other factors which can affect the amount of investment risk involved. Next, the fund manager enters the desired profit margin (PROFIT(M)) at block 511 from the schedule of target profit margins at block 512. This profit margin represents the target rate of profit on the sale of a floating rate zero coupon note that matures after M periods. The calculation of the present value discount rate (PVDR) is accomplished at block 513. PVDR is equal to the projected yield on investments (YIELD(M)) minus FVER(M) minus the risk premium (RISK(M)) minus the desired profit margin (PROFIT(M)). Then, at block 514, the current college cost (ORIGINAL COLLEGE COST) is discounted to its present value using the PVDR according to the relation $$\text{PRICE(M)}=\text{ORIGINAL COLLEGE COST}/[1+\text{PVDR(M)}]^M.$$

The resulting value is the price to be charged a customer for a floating rate zero coupon note that matures in M periods.

System control then passes to block 515 where the system calculates the total premium (if positive) or discount (if negative) implicit in the price to be charged for the floating rate zero coupon note. This premium or discount equals the price of the contract (PRICE) minus the current cost of college (ORIGINAL COLLEGE COST). Next, at test 516, the system tests whether additional floating rate zero coupon note prices need to be calculated. When the pricing has been completed (M=MAX), control passes to block 517 where the individual floating rate zero coupon note prices are compiled into a schedule showing the price for each maturity. Table 2 illustrates how this schedule of floating rate zero coupon note prices might be formatted. This schedule would be transmitted to the point-of-sale stations. At this point the floating rate zero coupon note pricing calculation has been completed and control is transferred to the update asset portfolio operation at block 128 of FIG. 4B.

TABLE 2

| Contract | Maturity | Price |
| --- | --- | --- |
| College Cost | 9/1/90 | $10,000.00 |
| College Cost | 9/1/91 | 10,500.00 |
| College Cost | 9/1/92 | 11,000.00 |
| College Cost | 9/1/93 | 11,500.00 |

Referring now to FIGS. 9A-9B, there is shown a more detailed schematic flow chart for the investment portfolio update operation represented by block 128 in FIG. 4B. This operation enables the fund manager to evaluate changes in the fund investment portfolio, to invest net income, to meet floating rate zero coupon note redemption obligations, and to structure the investment portfolio so as to provide for funding future obligations while maximizing the rate of return realized on the asset portfolio.

The process begins at block 601 where the schedule of projected floating rate zero coupon note liabilities is prepared. The aggregate maturity schedule for all the outstanding floating rate zero coupon notes is retrieved from data storage at block 603 (FRZCN FLOW(K), K=1, ..., KMAX) and that schedule is taken together with actuarial assumptions regarding the likelihood of early redemptions, which are supplied by the fund manager at block 602 and are based on information concerning the projected rate of increase of college costs, basic economic data that affect these costs, and the prior history of redemption rates. The steps performed at block 601 result in a schedule of expected period-by-period future cash flow obligations, which must be covered by the stream of cash flow from the asset portfolio.

Next system flow passes to block 604 where the system calculates the amount of funds that are available for investment. The critical inputs to this calculation are the current market value of the asset portfolio (ASSETS), including customer receivables, at block 605, and the amount of cash on hand, at block 606, which includes cash generated from existing investments in the form of dividends, coupon payments and principal repayments when debt investments mature. The steps performed at block 604 thus determine the amount of funds that are to be allocated among the available investment alternatives.

The results of the funds availability calculation at block 604 are sent along with the schedule of projected liabilities prepared at block 601 to block 607 for the calculation of the cost of the floating rate zero coupon note portfolio. The cash flow stream (FRZCN FLOW(K), K=1, ..., KMAX) is used together with the market value of the assets portfolio (ASSETS) calculated at block 605 to obtain the cost of the floating rate zero coupon note portfolio (FRZCN COST). FRZCN COST is calculated as the internal rate of return of the floating rate zero coupon note cash liability stream, and a number of commercially available data processing packages can be used for this purpose. Next, system flow passes to block 608 where the system re-expresses FRZCN COST on a semi-annual-equivalent basis by applying the equation $$\text{FRZCN SA COST} = 2 \times [(1 + \text{FRZCN COST})^{FREQ/2} - 1]$$

using the number of floating rate zero coupon note cash flows per period (FREQ) from block 609, where FRZCN SA COST denotes the semi-annual-equivalent floating rate zero coupon note cost. Next, system flow passes to block 610 for the selection of the new asset portfolio. Provided to block 610 are data concerning projected interest rate levels (block 611), a schedule of securities that are available for investment, the yields currently obtainable through those investments and commissions and other transaction costs associated with purchasing or selling any of these securities (block 612), and the current composition of the asset portfolio (block 613). The range of securities that are available for investment would include, but would not be limited to, U.S. Treasury securities, U.S. agency debt securities, adjustable rate mortgages, domestic and Euro corporate bonds, debt securities issued by supranational bodies such as the world bank, commercial paper and other money market instruments, repurchase agreements, municipal debt, and various forms of corporate equity securities. In addition, the fund manager might wish to include financial instruments such as financial futures contracts or forward contracts or to engage in interest rate swaps in order to hedge interest rate risk. The fund manager supplies the portfolio investment criteria to be applied in portfolio selection at block 614. These criteria might include, for example, the following types of restrictions:

No more than 25% nor fewer than 10% of the assets in U.S. Treasury securities;

No more than 5% of the assets in debt securities rated lower than single-A by both principal rating agencies (Moody's and Standard & Poor's);

At least 25% of the assets in debt securities maturing within 5 years and at least 50% in debt securities maturing within 10 years; and No more than 10% of the assets in debt securities whose interest rate floats.

At block 610, the system selects a list of securities that meet the investment criteria from among the candidate securites in light of the available yields, cost of effecting transactions, the current portfolio, and the portfolio investment criteria. The system displays the options to the fund manager, who enters his selection of investments into the system at block 615. In addition, the system determines as part of the asset selection process how much cash to have on hand the next day to cover both scheduled and possible early redemptions.

System flow then passes to block 616 where the system calculates the stream of cash flows the asset portfolio will produce over time (ASSET FLOW (K), K=1, ..., KMAX) and on to block 617 where the system calculates the yield on the asset portfolio (PORTFOLIO YIELD). The stream of cash flows calculated at block 616 is used together with the market value of the asset portfolio calculated at block 605 to calculate this yield at block 617. The PORTFOLIO YIELD is calculated as the internal rate of return of the stream of periodic cash flows in the same manner as the calculation of FRZCN COST at block 607. Next, at block 618, the system converts PORTFOLIO YIELD to a semi-annual-equivalent basis by applying the equation $$\text{PORTFOLIO SA YIELD} = 2 \times [(1 + \text{PORTFOLIO YIELD})^{FREQ/2} - 1] \ .$$

where PORTFOLIO SA YIELD denotes the semi-annual-equivalent yield on the asset portfolio.

Next system flow passes to two tests which evaluate the new asset portfolio. First, test 620 determines whether the yield on the new portfolio (PORTFOLIO SA YIELD) exceeds FRZCN SA COST, that is, whether the rate of return from the asset portfolio is equal to or greater than the cost of the outstanding liabilities (FRZCN SA COST). Second, test 621 determines whether the cash inflow from the new asset portfolio would exceed the projected obligations period-by-period, that is, whether the receipt of interest payments and principal repayments from maturing securities is sufficient in each period to meet the fund liabilities due to both scheduled redemptions and expected early redemptions. Only if the fund manager's selections pass both tests are the transactions required to update the asset portfolio carried out. Otherwise, control returns to the portfolio selection step (block 610) via block 614 at which the problems with the selected investments are displayed to the fund manager so that he can revise his criteria and make a new selection of investments. The selection and evaluation loop (blocks 610, 614, 615, 620, and 621) continues until the fund manager is satisfied that the rate of return on the asset portfolio is maximized subject to meeting his investment criteria and to meeting the two tests imposed by the system.

The routine can be adapted, within the scope of the invention, to consolidate the loop comprising blocks 610, 614, 615, 620, and 621 in those situations where each of the investment criteria can be expressed in the form of one or more equations and the objective of the fund manager can be expressed in the form of either a single objective function or a single objective function plus one or more additional constraint equations.

The tests 620 and 621 can be re-expressed in equivalent mathematical form as inequalities that must be satisfied. In such cases, the portfolio selection problem can be expressed as what is referred to in the art as a mathematical programming problem, which takes the following general form:

| maximize (choice of investments) | objective function |
|---|---|
| subject to | constraint set. |

Depending on the precise mathematical form of the mathematical programming problem, a computer can be programmed to "solve" the problem by making the choice of investments (e.g., amounts of bonds of specific types and specific maturities) that maximize the stated objective (e.g., maximize yield) subject to the specified contraints (i.e., the portfolio selected must pass tests 620 and 621).

After the new asset portfolio has passed tests 620 and 621, control passes to block 622 where the new asset portfolio is compared to the old asset portfolio, and the asset purchases and sales required to update the asset portfolio are determined. System flow then passes to block 623 where the purchase and sale transactions are executed. Then the asset portfolio data file is updated at block 624 to reflect the new composition of the asset portfolio. At this point the investment portfolio update operation has been completed and control passes to block 129 in FIG. 4B.

Referring now to FIGS. 10A-10B, there is shown a more detailed schematic flow chart for the management information system represented by block 129 in FIG. 4B. The management information system generates a daily transaction summary, which includes sales and redemption data and yield and cost information, and a summary of current position, which reports the composition of the asset portfolio after the asset update operation and the composition of the floating rate zero coupon note liability schedule.

The process begins at block 701 where the counters TDAY, which keeps track of the aggregate number of daily purchase and redemption transactions, and TPERIOD, which keeps track of the aggregate number of purchase and redemption transactions during the period, are each incremented by 1. System flow then passes to test 702, which marks the beginning of a loop. At test 702 the system retrieves the transaction record for transaction number TDAY from the daily transaction file at block 703 and checks whether the transaction is a purchase or involves a partial payment (in both cases AMOUNT is greater than 0). If it is a purchase or a partial payment, system flow is transferred to test 704, which tests whether it is a partial payment. If it is a partial payment, system flow passes to test 707, bypassing the sales counters. If it is not a partial payment, it is a purchase, and control passes to block 705, where the sales data are recorded. M denotes the maturity of the floating rate zero coupon note involved in the transaction. First, the number of outstanding floating rate zero coupon notes of maturity M is increased by 1

FRZCN(M) becomes FRZCN(M)+1 to reflect the sale. Next, the number of floating rate zero coupon notes of that maturity sold during the day and during the period are each incremented by 1, DSFRZCN(M) becomes DSFRZCN(M)+1

PSFRZCN(M) becomes PSFRZCN(M)+1.

Then the dollar sales for the day and for the period are each incremented by the dollar amount of the sales price of the floating rate zero coupon note, DSALES becomes DSALES+PRICE(M)

PSALES becomes PSALES+PRICE(M).

Control then passes to test 707.

If the transaction is instead a redemption (AMOUNT is less than 0), control passes to block 706 from test 702. At block 706, the redemption data are recorded in a manner analagous to the recording of sales data at block 705. The number of outstanding floating rate zero coupon notes of maturity M is decreased by 1, FRZCN(M) becomes FRZCN(M)−1, the number of floating rate zero coupon notes of maturity M redeemed during the day and period are each increased by 1, DRFRZCN becomes DRFRZCN+1

PRFRZCN becomes PRFRZCN+1, and the dollar volume of redemptions for the day and period are each increased by the redemption value of the floating rate zero coupon note, DRDMP becomes DRDMP+VALUE(TDAY)

PRDMP becomes PRDMP+VALUE(TDAY).

Control then passes to test 707.

At test 707 the system tests whether all the transactions for the day have been processed. If not, processing continues (block 708). Otherwise, the loop terminates and system flow passes to block 709, where the number of floating rate zero coupon notes of each maturity outstanding at the end of the day (FRZCN(M)), the number of each maturity sold during the day (DSFRZCN(M)), the number of each maturity redeemed during the day (DRFRZCN(M)), the dollar volume of sales during the day (DSALES), the dollar volume of redemptions during the day (DRDMP), and the number of transactions during the day (TDAY) are printed.

System flow then passes to block 710 where the cash flow stream expected from the investment portfolio, i.e., exclusive of receivables, is calculated. This is accomplished by retrieving from the schedule of customer receivables at block 713 the expected receivables cash flows (REC(K)) for period K) and subtracting them from the respective asset cash flows calculated at block 616. The counter variable is initialized to zero at block 710 and incremented by one at block 711. Then the asset flows (ASSET FLOW (K)) from block 616 are adjusted one at a time to obtain the respective period-by-period investment cash flows. The investment cash flows are denoted (ASSET FLOW(K)−REC(K)). The loop ends at test 714 when all the ASSET FLOW values have been adjusted. At block 715, this stream of cash flows is used together with the current market value of the updated asset portfolio net of the amount of receivables (ASSETS−ΣREC(K)) to calculate the yield on the investment portfolio (INVESTMENT YIELD). The INVESTMENT YIELD is calculated as the internal rate of return of the investment cash flows utilizing the same mathematical procedure as in the calculation of PORTFOLIO YIELD at block 617.

Next, system flow passes to block 716 where the investment yield is re-expressed on a semi-annual-equivalent basis by applying the equation:

$$\text{INVESTMENT SA YIELD} = 2 \times [(1 + \text{INVESTMENT YIELD})^{FREQ/2} - 1]$$

where INVESTMENT SA YIELD denotes the semi-annual-equivalent investment yield and where FREQ denotes the number of cash flow periods per year (block 717). At the final step (block 718), the system prints out for the fund manager the aggregate maturity schedule for the floating rate zero coupon notes (FRZCN(M), M=1,..., MAX), the composition of the updated asset portfolio (ASSET PORTFOLIO), PORTFOLIO SA YIELD, INVESTMENT SA YIELD, FRZCN SA COST, and the stream of periodic cash flows expected from the investment portfolio (ASSET FLOW(K)). At this point the daily management information reporting operation has been completed and control passes to block 130 in FIG. 4B.

Referring now to FIGS. 11A–11B, there is shown a more detailed schematic flow chart for the period-by-period investment performance monitoring operation represented by block 132 in FIG. 4B. This operation prepares a report to the fund manager at the end of each period showing the profit performance of the asset portfolio during the period and indicating whether the fund is in an overfunded or underfunded position as of the end of the period.

The process begins at block 801 where the system prints out the maturity schedule of floating rate zero coupon note liabilities (FRZCN(M), M=1,..., MAX), the sales during the period of floating rate zero coupon notes of each maturity (PSFRZCN(M), M=1,..., MAX); the redemptions of floating rate zero coupon notes of each maturity during the period (PRFRZCN(M), M=1,..., MAX); total dollar sales (PSALES) and redemptions (PRDMP) of floating rate zero coupon notes during the period; the number of transactions during the period (TPERIOD); the composition of the asset portfolio as of the end of the period (ASSET PORTFOLIO); and the semi-annual equivalent portfolio yield (PORTFOLIO SA YIELD), investment yield (INVESTMENT SA YIELD), and floating rate zero coupon note cost (FRZCN SA COST).

Next, system flow passes to block 802 where the system calculates the average assets under management during the period (AAUM) as the simple arithmetic average of the market value of the investment portfolio at the end-of-the period (CMV) from block 803 and the market value of the investment portfolio at the beginning of the period (AUM) from block 804. Next, at block 805 the system calculates the amount of unrealized appreciation in the value of the investment portfolio during the period (APP) utilizing information concerning the asset portfolio contained in the master data files (block 806). Next, at block 807 the system calculates the amount of investment income realized in cash during the period (II) and the amount of the aggregate capital gain or loss on securities transactions during the period (CGL) utilizing information from the master portfolio transaction file contained in the master files (block 808).

System flow then moves to block 809 where total investment income (INCOME) generated during the period is calculated as the sum of unrealized appreciated (APP), cash investment income (II), and capital gain or loss during the period (CGL):

$$\text{INCOME} = \text{APP} + \text{II} + \text{CGL}.$$

Next at block 810 the system calculates four measures of investment performance: the rate of return on beginning-of-period assets (ROIA), the rate of return on average assets (ROAA), the cash rate of return on beginning-of-period assets (CROIA), and the cash rate of return on average assets (CROAA). All four are conventionally used as measures of the profitability of a securities investment program. In each case, a measure of income or "profit" is divided by a measure of assets.

Next, system flow moves to block 811 for the beginning of the overfunding/underfunding calculation. First, the system calculates the level of funding (FUNDING) at block 811 as the present value of the investment cash flow stream; FUNDING thus represents the amount of funds available from the investment portfolio, expressed in terms of current dollars, that will be available to meet present and future floating rate zero coupon note liabilities. Next, at block 812 the system calculates the present value of those liabilities (COMMITMENT), that is, the value of the liability stream expressed in current dollars. For the sake of comparability, the same discount rate, FRZCN COST, is used in both calculations.

Then system flow moves to test 813 where the explicit test for an overfunding or an underfunding condition takes place. If FUNDING is less than COMMITMENT, the present value of future liabilites exceeds the present value of future investment flows, and so the insurance program is underfunded. Control is transferred to block 814 where the variable CONDITION is set to show an UNDERFUNDED condition at at block 815 the amount of underfunding is calculated as the amount by which COMMITMENT exceeds FUNDING, with this difference loaded into the variable VARIANCE. Otherwise, the insurance program is overfunded, and control is transferred to block 816 where the variable CONDITION is set to show an OVERFUNDED condition. The amount of overfunding is calculated at block 817 as the difference between FUNDING and COMMITMENT with the difference loaded into VARIANCE.

Control then proceeds to block 818 where the four performance measures (ROIA, ROAA, CROIA, and CROAA), the nature of the overfunding/underfunding condition (CONDITION), and the extent of the overfunding or underfunding (VARIANCE) are printed out for the fund manager. At this point the period-by-period investment performance monitoring operation has been completed and control passes to block 133 of FIG. 4C.

Referring now to FIGS. 12A-12B, there is shown a more detailed schematic flow chart for the calculation of each investor's investment income and taxable income during the period. The tax calculation illustrated in FIGS. 12A-12B is based on the assumption that the tax liability associated with the accretion in the value of the floating rate zero coupon note is levied on a straight-line basis, that is, the tax owing during any period is allocated in equal amounts to each day in the period. At the date of this application, the precise tax treatment that should be accorded floating rate zero coupon notes is subject to interpretation because there are no specific rulings or guidelines that apply unambiguously. It is to be understood that tax provisions change from time to time and such changes may require modification of the routine illustrated in FIGS. 12A-12B, to reflect the tax treatment of floating rate zero coupon notes then in effect.

The process starts at block 901 where the system initializes to zero the variable ACN, which serves as the account counter. The routine will proceed through all the customer accounts in the system beginning with the first. System flow passes to block 902 where the amount of escalation in college costs during the period (ESCALATION) is retrieved from the master file of escalation rates in U.S. college costs contained in the master data files (block 903). Next, at block 904 the system computes the number of days contained in the period (DPERIOD). At block 905 the account loop begins with the counter ACN being incremented by 1. The next account is selected, and the counter N for floating rate zero coupon notes in the new account is initialized to zero. System flow passes to block 906 where the schedule of floating rate zero coupon notes in account number ACN is retrieved from the master account file (block 907). Next begins a nested loop at block 908. The floating rate zero coupon notes in account number ACN will be evaluated sequentially for investment income and taxable income realized during the period. N is incremented by 1. Floating rate zero coupon note number N in account number ACN will now be evaluated.

Next, at test 909, the purchase date of floating rate zero coupon note number N is checked to determine whether it was purchased during the period. If so, control passes to block 910. First, the number of days the floating rate zero coupon note was held during the period (HELD) is calculated at block 910 as the difference between the end-of-period date (END DATE) and the purchase date (PURCHASE DATE) using a numerical calendar. Next, the fraction of the period the floating rate zero coupon note was held (FRACTION) is calculated at block 911 by dividing the number of days the floating rate zero coupon note was held during the period by the number of days in the period. Next, at block 912 the value of the TAX BASIS variable is initialized to the price the investor paid for the contract (PRICE) and at block 913 the ESCALATED VALUE variable is initialized to the cost of college at the time the contract was purchased (ORIGINAL CURRENT COLLEGE COST). Then, at block 914, the counter for the number of periods the floating rate zero coupon note was held (P(ACN,N)) is initialized to 1. System flow then passes to block 920 for the income, tax basis, and value calculations.

If instead it is determined at test 909 that the floating rate zero coupon note was not purchased during the period, system flow passes to test 915 where the system tests whether the floating rate zero coupon note was redeemed during the period. If so, control passes to block 916 where the system calculates the number of days the floating rate zero coupon note was held (HELD), which equals the number of days elapsed between the redemption date (SALE DATE) and the date that marks the beginning of the period (BEGIN DATE). Next, at block 917 the system calculates the fraction of the period the contract was held (FRACTION), which is identical to the calculation for the period of purchase at block 911. System flow then passes to block 920.

If it is determined at test 915 that the floating rate zero coupon note was not redeemed during the period, it must have been held for the entire period. At block 918 the system updates the period counter P(ACN,N) for floating rate zero coupon note number N in account number ACN by 1. System flow then passes to block 919 where the system sets the fraction of the period the contract was held (FRACTION) equal to 1. System flow then passes to block 920.

Next, at block 920, the system calculates the amount of taxable income (TAX INCOME) floating rate zero coupon note N in account number ACN generated during the period. This amount is calculated by subtracting from the amount of accretion for the fraction of the period the contract was held (ESCALATED VALUE×ESCALATION×FRACTION), the amount of amortization for the fraction of the period the contract was held (AMORT×FRACTION). This calculation reflects the fact that the floating rate zero coupon note accrues interest on a compounded basis but the premium or discount is amortized on a straight-line basis over the life of the contract. Next, at block 921, the tax basis of the floating rate zero coupon note (TAX BASIS) is augmented by the amount of income for tax purposes earned during the period. Then at block 922 the system calculates the amount of income the contract earned for financial reporting purposes (BOOK INCOME). The routine illustrated in FIGS. 12A-12B assumes that a floating rate zero coupon note accrues interest and amortizes the premium or discount in both cases at the same rate for both tax purposes and financial reporting purposes. Next, at block 923, the ESCALATED VALUE of the floating rate zero coupon note is augmented by the amount of college cost escalation during the fraction of the period the contract was held (ESCALATED VALUE×(1+ESCALATION×FRACTION)). Then at block 924 the system adjusts the amount of unamortized premium or discount (PREM/DISC) for the amount of amortization during the fraction of the period the contract was held, which equals the amortization rate per period (AMORT) multiplied by the fraction of the period the contract was held (FRACTION). System flow then passes to block 925 where the system computes the value of the floating rate zero coupon note (FRZCN VALUE) as the sum of the accreted base value (ESCALATED VALUE) and the amount of unamortized premium or discount (PREM/DISC).

System flow then passes to test 926 where the system tests whether the floating rate zero coupon note was redeemed during the period. If not, control passes to test 928. If so, control passes to block 927 to calculate the amount of the gain as the difference between the redemption value (VALUE) and the tax basis at the time of sale (TAX BASIS).

System flow then passes to test 928 because the processing of floating rate zero coupon note number N has been completed. At test 928 the system tests whether all the floating rate zero coupon notes (NMAX in total) in account number ACN have been processed. If not, system flow passes to block 908 to begin processing the next floating rate zero coupon note in the account. Otherwise, the nested loop ends and system flow passes to test 929 where the system tests whether all the accounts (ACNMAX in total) have been processed. If not, system flow passes to block 905 to begin processing the next account. Otherwise, the routine for calculating each investor's investment income and taxable income during the period has been completed and control passes to block 134 in FIG. 4C to prepare the reports to account holders.

Figure 13A:
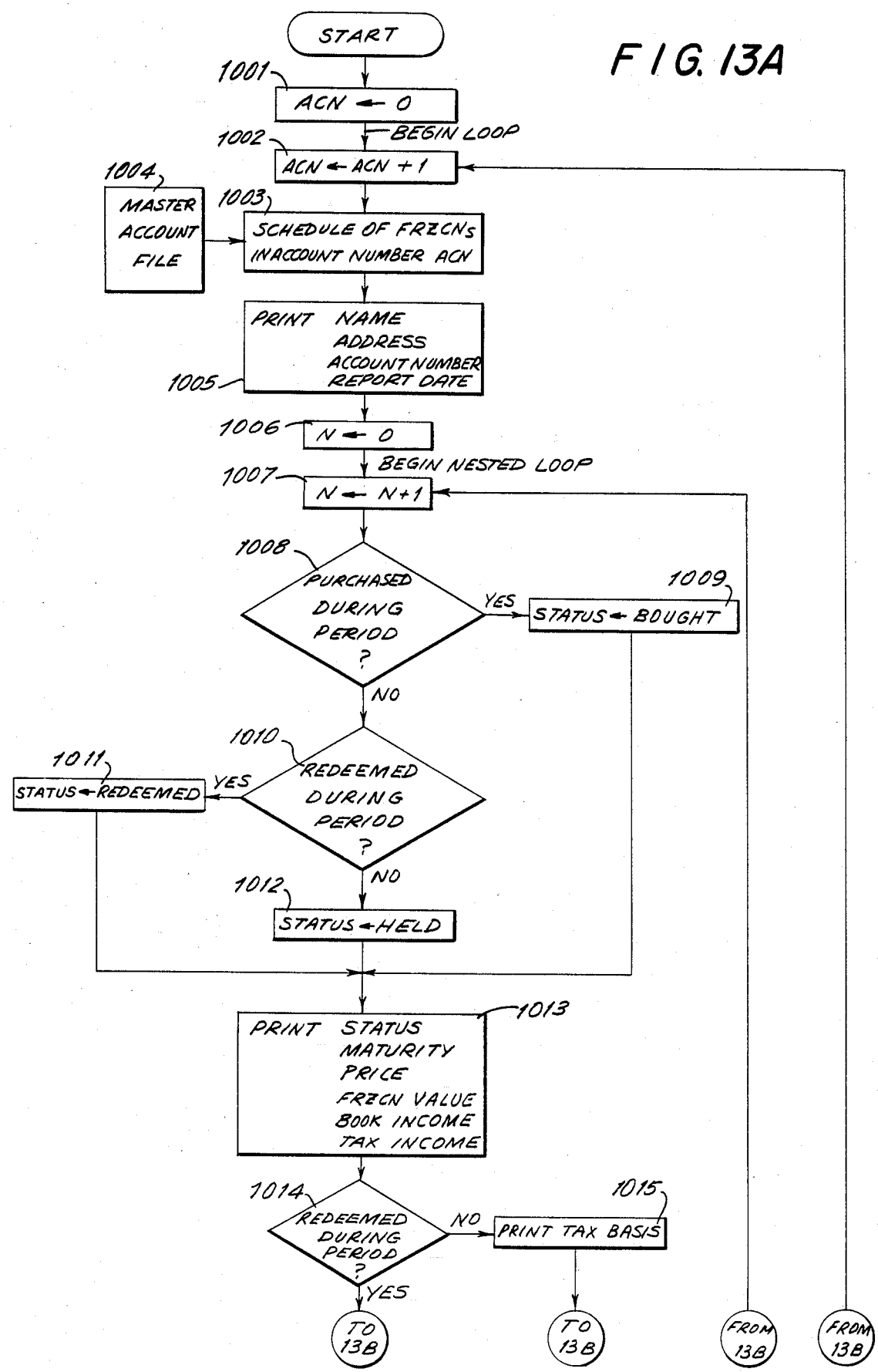
FIGS. 13A–13B are a flow chart depicting in more detail the individual investor record-keeping and reporting operation represented by block 134 in FIG. 4C.
Figure 13B:
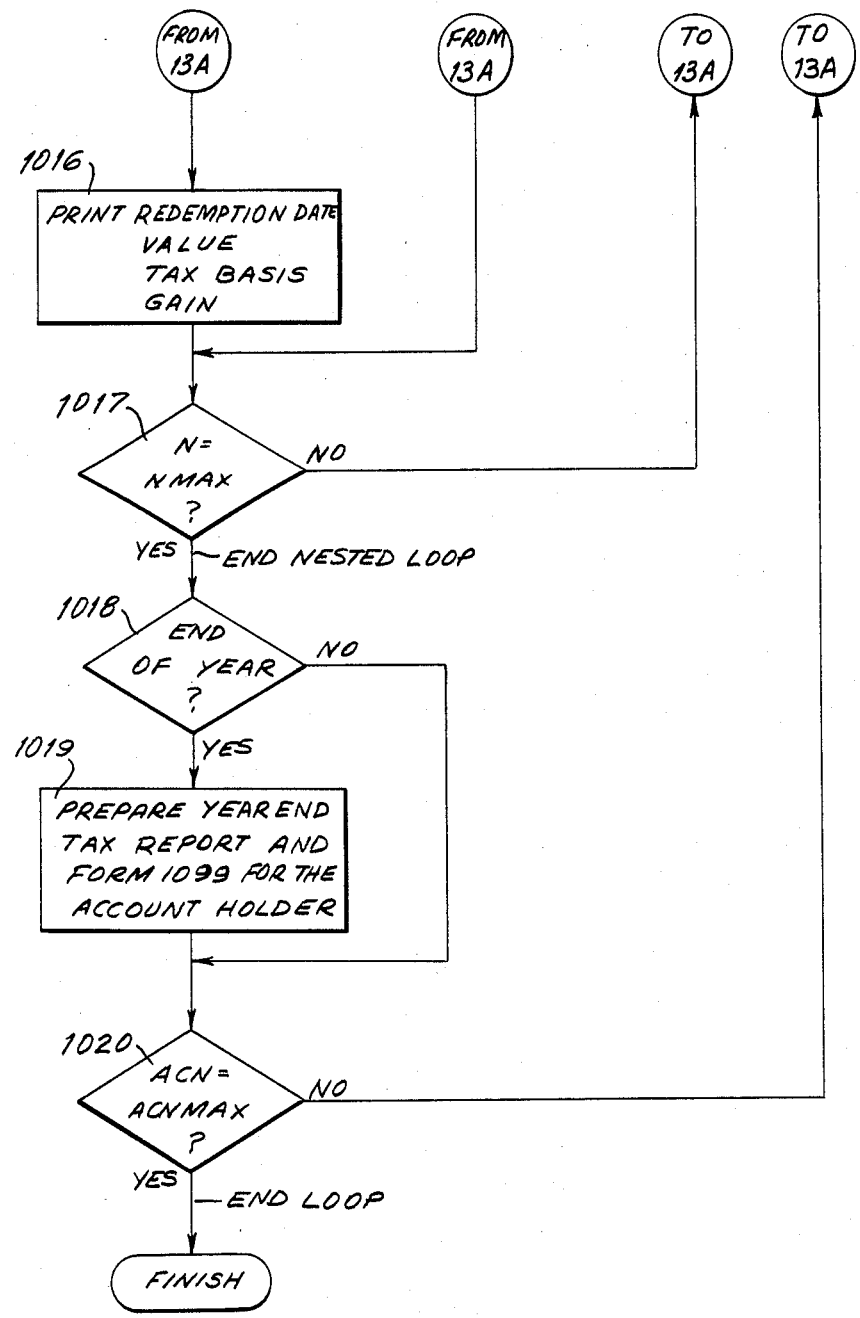

Referring now to FIGS. 13A–13B, there is shown a more detailed schematic flow chart for conducting the individual investor record-keeping and reporting operation represented by block 134 in FIG. 4C. That operation involves producing regular end-of-period (e.g., quarterly) reports to account holders itemizing the floating rate zero coupon notes in the account, summarizing account activity (e.g., purchases and redemptions) during the period, and reporting investment income and tax income generated by each floating rate zero coupon note in the account during the period.

The process begins at block 1001 where the system initializes the account number counter ACN to zero. The accounts are processed sequentially from the first to the last. The loop begins at block 1002 where the system increments the account number counter by 1. At block 1003 the system retrieves the updated information regarding the floating rate zero coupon notes in account number ACN from the master account file (block 1004). At block 1005 the system prints out the account holder's name, address, and account number at the top of the report form.

The information concerning the floating rate zero coupon notes in account number ACN will be printed out for the floating rate zero coupon notes in the account in sequential order from first to last. At block 1006 the floating rate zero coupon note counter is initialized to zero, and the nested loop for floating rate zero coupon note processing begins at block 1007 where the floating rate zero coupon note counter is incremented by 1. Next the system determines whether the floating rate zero coupon note was bought or redeemed during the period. At test 1008 the system tests whether the floating rate zero coupon note was purchased during the period. If so, control passes to block 1009 where the variable STATUS is set so as to indicate that the floating rate zero coupon note was bought during the period (BOUGHT). Control then passes to block 1013. Otherwise, control passes to test 1010 where the system tests whether the floating rate zero coupon note was redeemed during the period. If so, control passes to block 1011 where the variable STATUS is set so as to indicate that the floating rate zero coupon note was redeemed during the period (REDEEMED), and control thereafter passes to block 1013. Otherwise, the variable STATUS is set so as to indicate that the floating rate zero coupon note was held throughout the period (HELD), and thereafter control passes to block 1013.

At block 1013 the system prints out the status of floating rate zero coupon note number N (STATUS), the maturity of the floating rate zero coupon note (MATURITY), the original purchase price (PRICE), the contract value at the end of the period (FRZCN VALUE), the amount of investment income (BOOK INCOME) and the amount of taxable income (TAX INCOME) it generated during the period. System flow then passes to test 1014 which tests whether or not the floating rate zero coupon note was redeemed during the period. If the floating rate zero coupon note was not redeemed during the period, control passes to block 1015 where the sytem prints out the end-of-period tax basis (TAX BASIS) for the floating rate zero coupon note. Otherwise, control passes to block 1016 where the system prints out the redemption date (REDEMPTION DATE), redemption value (VALUE), tax basis at the time of redemption (TAX BASIS), and the amount of any capital gain or, if negative, loss (GAIN). Table 3 illustrates a format for the end-of-period report to an account holder.

TABLE 3

Name: JOHN Q. SAVER
Address: 1 SOME STREET
SOME CITY, SOME STATE ZIP
Account Number: 001-00000001
Period Ending: December 31, 1985

| During the Period You: | REDEEMED | HELD | HELD | HELD | BOUGHT |
|---|---|---|---|---|---|
| Contract Maturity: | 9/1/89 | 9/1/90 | 9/1/91 | 9/1/92 | 9/1/93 |
| Purchase Price: | $9,500 | $10,000 | $10,500 | $11,500 | $12,000 |
| Value: | 12,500 | 12,500 | 12,500 | 12,500 | 12,500 |
| Income: | 500 | 750 | 750 | 750 | 500 |
| Taxable Income: | 500 | 750 | 750 | 750 | 500 |
| Current Tax Basis: | — | 12,500 | 12,500 | 12,500 | 12,500 |
| For Redeemed Contracts | | | | | |
| Redemption Date: | 11/15/85 | | | | |
| Redemption Value: | $12,500 | | | | |
| Tax Basis: | $12,250 | | | | |
| Taxable Gain: | $250 | | | | |

Next, system control passes to test 1017 where the system tests whether all the floating rate zero coupon notes (NMAX in total) in account number ACN have been processed. If not, system flow passes to block 1007 to begin processing the next floating rate zero coupon note in the account. Otherwise, the nested loop ends and system flow passes to test 1018 where the system tests whether it is the end of the year. If so, flow passes to block 1019 where the system prepares a year-end tax report and also prepares a form 1099 report for the account holder. Otherwise, the tax report step is bypassed. System flow then passes to test 1020 to determine whether all the accounts (ACNMAX in total) have been processed. If not, system flow passes to block 1002 to begin processing the next account. Otherwise, the routine for individual investor record-keeping and reporting has been completed and control passes to block 135 in FIG. 4C to prepare the end-of-period financial statements and report to the fund manager that were discussed earlier with reference to FIGS. 4A-4C.

HARDWARE DESCRIPTION

Figure 14:
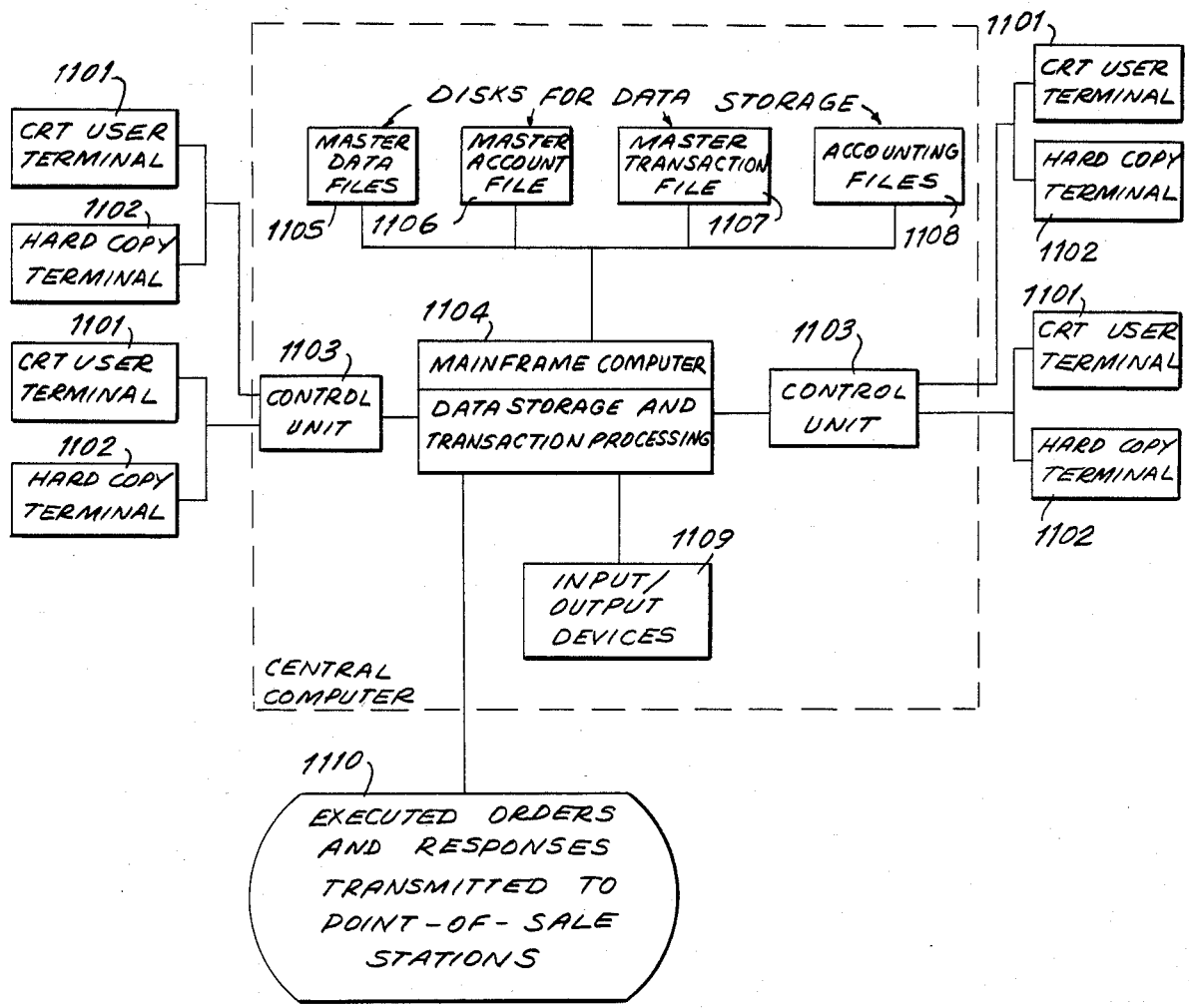
FIG. 14 is a block diagram of a computer system suitable for implementing the invention.

The various conventional elements making up the hardware system for implementing the invention and their interrelationships are shown in FIG. 14.

At each point-of-sale station, such as the office of a savings bank or the offfice of a securities broker, there is a CRT user teminal (block 1101) and associated hard copy terminal (block 1102). The hardware system would include a plurality of these terminals. Each terminal communicates with a central computer (block 1104) through a control unit (block 1103), which controls the point-of-sale terminals, receives purchase orders, redemption orders, and account inquiries from the point-of-sale stations and transmits them to the central computer and receives account verifications, transaction verifications, floating rate zero coupon note prices, and responses to customer inquiries regarding account status from the central computer (block 1104) and transmits them to the appropriate point-of-sale stations. Each control unit could serve up to approximately 20 point-of-sale stations. The account verifications, transaction verifications, floating rate zero coupon note prices, and responses to customer inquiries are transmitted first to the CRT user terminal (block 1101). If the investor requests a written transaction record or a written account status report, the hard copy terminal (block 1102) provides it upon command.

The central computer (block 1104) contains storage space for data relating to transactions that are in process; processes all purchase and redemption transactions in the manner diagrammed in FIGS. 1, 2 and 4A-8; performs the investment portfolio update operation in the manner diagrammed in FIGS. 3 and 9A-9B; conducts the management information reporting operation in the manner diagrammed in FIGS. 10A-10B and the period-by-period investment performance monitoring operation in the manner diagrammed in FIGS. 11A-11B; calculates the investment income and taxable income generated periodically in each account in the manner diagrammed in FIGS. 12A-12B; and performs the individual investor record-keeping and reporting operation in the manner diagrammed in FIGS. 13A-13B.

The central computer (block 1104) transmits information to and receives information from the master data files (block 1105) as required in order to retrieve the schedule of contractual early withdrawal penalties (blocks 303 and 304 of FIG. 6), calculate escalation index values (blocks 413 and 414 of FIG. 7A), retrieve current and projected college cost data (block 502 of FIG. 8) and current and projected inflation rates (block 503 of FIG. 8), perform the investment portfolio update operation in the manner diagrammed in FIGS. 9A-9B, conduct the management information reporting operation in the manner diagrammed in FIGS. 10A-10B and the period-by-period investment performance monitoring operation in the manner diagrammed in FIGS. 11A-11B, and retrieve the escalation rates needed to calculate an investor's taxable income (block 920 of FIG. 12B).

The central computer (block 1104) also transmits information to and receives information from the master account file (block 1106) as indicated in blocks 110, 114, 121 and 124 of FIGS. 4A-4B; block 402 of FIG. 7A; block 907 of FIG. 12A and block 1004 of FIG. 13A. The central computer (block 1104) also transmits information to and receives information from the master transaction file (block 1107) in connection with purchase and redemption transactions (block 124 of FIG. 4B) and in connection with management information reporting operation (block 703 of FIG. 10A). The central computer (block 1104) also transmits end-of-period financial statements to the accounting files (block 1108) for storage and retrieves these statements from the accounting files (block 1108) when prompted by the input/output devices of the central computer (block 1109).

The system manager has a complement of input/output devices (block 1109). Into the input devices are entered requests for the daily and periodic reports to the fund manager (block 138 of FIG. 4C), the management information reports (block 718 of FIG. 10B), the period-by-period investment performance reports (block 818 of FIG. 11A), and the individual investor reports (blocks 1013, 1015, 1016 and 1019 of FIGS. 13A-13B) and instructions for managing and controlling the hardware system and its software. The output devices are used to obtain the daily and periodic reports to the fund manager (block 138 of FIG. 4C), the management information reports (block 718 of FIG. 10B), the period-by-period investment performance reports (block 818 of FIG. 11B), and the individual investor reports (blocks 1013, 1015, 1016 and 1019 of FIGS. 13A-13B).

Figure 15:
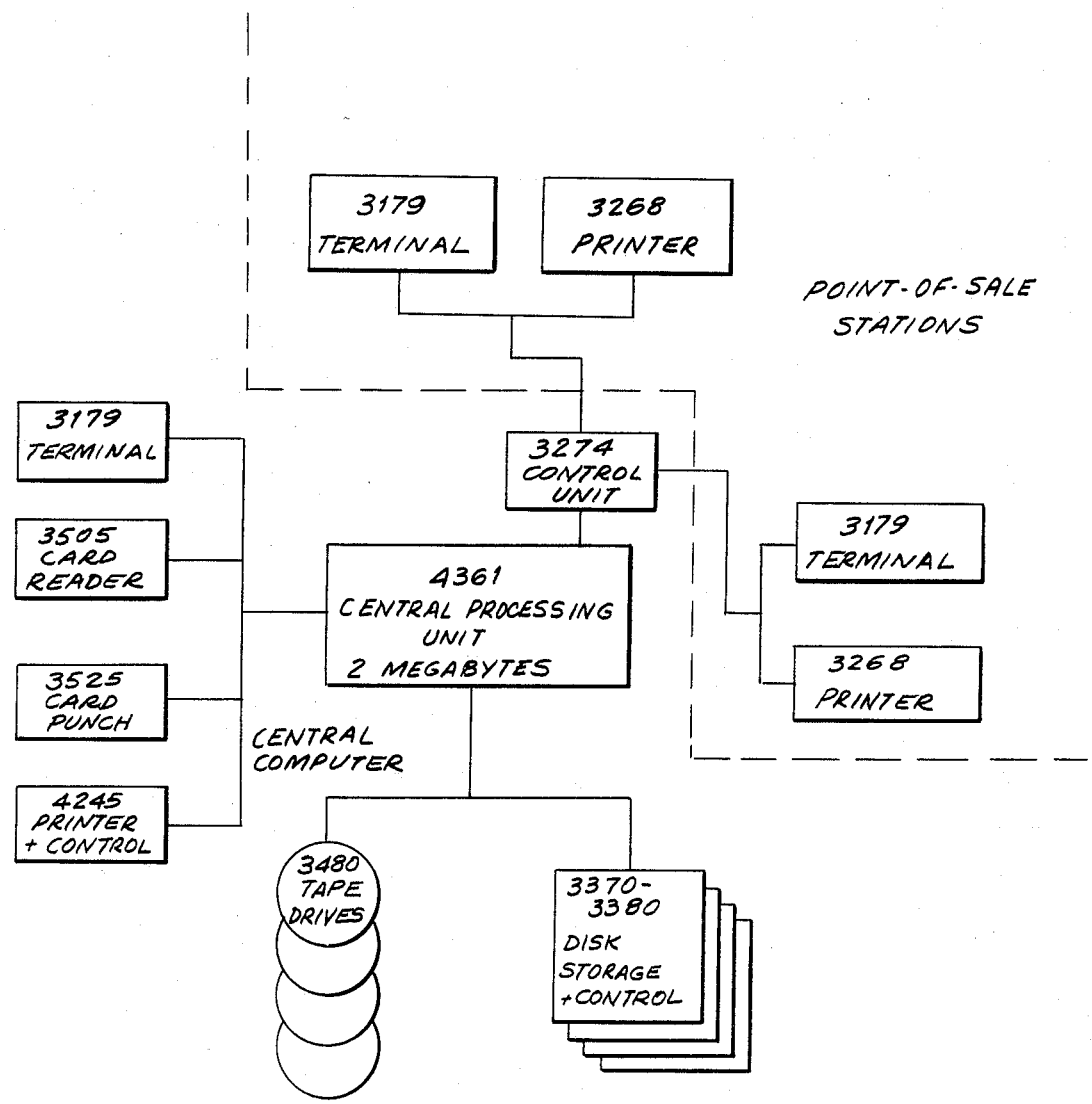
FIG. 15 is a block diagram showing a portion of the computer system of FIG. 14 in more detail.

FIG. 15 provides a schematic diagram of a small-scale version of the basic hardware system of FIG. 14. The exemplary system includes the following types and numbers of devices:

| No. | Make | Model | Item in FIG. 14 | |
|---|---|---|---|---|
| 2 | IBM | 3278 or 3279 or 3179 | CRT user terminal 1101 | |
| 2 | IBM | 3268 | Hard copy terminal 1102 | |
| 1 | IBM | 3274 | Control unit 1103 | |
| 1 | IBM | 4361 | central computer 1104 | |
| 4 | IBM | 3370-3380 | disks | 1105-1108 |
| 4 | IBM | 3420 or 3480 | tape drives | |
| 1 | IBM | 3179 | CRT terminal | 1109 |
| 1 | IBM | 3505 | card reader | |
| 1 | IBM | 3525 | card punch | |
| 1 | IBM | 4245 | printer | |

It is to be understood that there are a large number of commercially available substitutes for each item of hardware which could be combined into fully compatible systems. Accordingly, the scope of the invention is not limited by the particularity of the hardware system in FIGS. 14 and 15.

SOFTWARE DESCRIPTION

The methods which are diagrammed in FIGS. 1-13B, are implemented on the hardware system diagrammed in FIG. 14 by embodying the flow-charted routines into a series of software packages that follow exactly the sequence of steps diagrammed in FIGS. 1-13B. There are conventional software packages that are commercially available that can be adapted to perform certain of the steps diagrammed in FIGS. 1-13B. Accordingly, as described below, it would not be necessary in order to implement the invention to write separate software for each step from scratch.

THe Point-of Sale software package marketed by International Business Machines (IBM) is a general interactive data package for point-of-sale applications that can be formatted to provide the precise means of receiving customer orders and inquiries indicated in blocks 11, 12 and 13 of FIG. 1 and in blocks 103, 104 and 105 of FIG. 4A and transmitting the responses to customer inquiries called for in block 111 of FIG. 4A and the transaction reports called for in block 107 of FIG. 4A.

The Interactive Financial Systems (IFS) library of software packages marketed by IBM contains a set of general financial and accounting packages that can be adapted and formatted to provide the data base management, accounting, and financial reporting operations required to implement the invention. Part I of IFS contains data base management routines, which can be used to manage the master data files at block 1105 of FIG. 14, the master account file at block 1106 of FIG. 14, the master transaction file at block 1107 of FIG. 14, and the accounting files at block 1108 of FIG. 14. It also contains routines that can be adapted to handle the account management functions described in FIGS. 5A-5B and in FIGS. 12A-12B. Part II of IFS contains general routines that cover general ledger maintenance and the preparation of financial statements and related schedules. It can be adapted and formatted to provide the precise means of preparing the daily transaction summary and summary of current position called for in block 129 of FIG. 4B; the end-of-period investment performance and position report called for in block 132 of FIG. 4B; the end-of-period reports to account holders called for in block 134 of FIG. 4C and described in greater detail in blocks 1005, 1013, 1015, 1016 and 1019 of FIGS. 13A-13B; the end-of-period financial statements called for in block 135 of FIG. 4C; and the report to the fund manager called for in block 138 of FIG. 4C. Part III of IFS can be adapted to monitor accounts receivable as called for in blocks 215 and 216 of FIG. 5A.

As an alternative to the IFS software package, the MSA software package produced by Management Science of America can be used.

The VSE/SP software package marketed by IBM contains a complete software package for operating the hardware system diagrammed in FIG. 14.

It is possible to write the software needed to implement each of the other routines that are diagrammed in FIGS. 1-13B in one of the available user languages, such as FORTRAN, by following the sequence of steps diagrammed in FIGS. 1-13B. Table 4 contains a set of instructions written in FORTRAN that would implement the sequence of steps diagrammed in FIGS. 7A-7B for calculating the redemption value of a floating rate zero coupon note. Table 5 contains a set of instructions written in FORTRAN that would implement the sequence of steps diagrammed in FIG. 8 for establishing the schedule of prices to be charged for the floating rate zero coupon notes.

TABLE 4

| Step | Address | Instruction | Flow Chart Block Number |
|---|---|---|---|
|  | * | CALCULATE THE REDEMPTION VALUE FOR THE FRZCN |  |
|  | * | DEFINE THE FOLLOWING VARIABLES, ALL OF WHICH CAN BE RETRIEVED FROM THE MASTER DATA FILES OR THE MASTER ACCOUNT FILE: |  |
|  | * | DPUR=DATE OF PURCHASE (NUMERICALLY FROM 1/1/86) | 401 |
|  | * | KPUR=NUMBER OF THE PERIOD IN WHICH THE FRZCN WAS PURCHASED (NUMBERED SEQUENTIALLY FROM THE PERIOD BEGINNING 1/1/86) | 401 |
|  | * | DSAL=DATE OF REDEMPTION (NUMERICALLY FROM 1/1/86) | 401 |
|  | * | BASE=ORIGINAL CURRENT COLLEGE COST | 401 |
|  | * | DEND(I)=DATE AT END OF PERIOD I (NUMERICALLY FROM 1/1/86) | 407 |
|  | * | DBEG(I)=DATE AT BEGINNING OF PERIOD I (NUMERICALLY FROM 1/1/86) | 409 |
|  | ° | ESC(I)=ESCALATION RATE DURING PERIOD I | 414 |
|  | * | PEN(I)=PERIOD PENALTY(I) FOR PERIOD I | 401 |
|  | * | PENFAC=OVERALL WITHDRAWAL PENALTY FACTOR | 401 |
|  | * | P=NUMBER OF PERIODS THE FRZCN WAS HELD | 403 |
|  | * | PREDIS=UNAMORTIZED PREMIUM OR DISCOUNT | 402 |
|  | * | ACN=NUMBER OF THE ACCOUNT THAT CONTAINS THE FRZCN TO BE REDEEMED | 403 |
|  | * | N=NUMBER OF THE FRZCN IN ACCOUNT NUMBER ACN THAT IS TO BE REDEEMED | 403 |

TABLE 4-continued

| Step | Address | Instruction | Flow Chart Block Number |
|---|---|---|---|
| 1 | 10 | P(ACN,N) = P(ACN,N) + 1 | 403 |
| 2 | 20 | I = 0 | 404 |
| 3 | 30 | VALUE = BASE(ACN,N) | 404 |
| 4 | 40 | I = I + 1 | 405 |
| 5 | 50 | IF (I. EQ. 1) THEN | 406 |
| 6 | 60 | HELD = DEND(KPUR) − DPUR | 407 |
| 7 | 70 | DAYS = DEND(KPUR) − DBEG(KPUR) | 410 |
| 8 | 80 | ELSE | |
| 9 | 90 | GO TO 120 | |
| 10 | 100 | END IF | |
| 11 | 110 | GO TO 190 | |
| 12 | 120 | IF (I. EQ. P(ACN,N)) THEN | 408 |
| 13 | 130 | HELD = DSAL − DBEG(KPUR + P(ACN,N) −1) | 409 |
| 14 | 140 | DAYS = DEND(KPUR + P(ACN,N) − 1) − DBEG(KPUR + P(ACN,N) − 1) | 410 |
| 15 | 150 | ELSE | |
| 16 | 160 | FRAC = 1 | 412 |
| 17 | 170 | GO TO 200 | |
| 18 | 180 | END IF | |
| 19 | 190 | FRAC = HELD/DAYS | 411 |
| 20 | 200 | DINDEX(I) = FRAC * (ESC(I) − PEN(I)) | 415 |
| 21 | 210 | VALUE = VALUE * (1 + DINDEX(I)) | 416 |
| 22 | 220 | IF (I. EQ. P(ACN,N)) THEN | 417 |
| 23 | 230 | PREDIS(ACN,N) = PREDIS(ACN,N) − AMORT(ACN,N) * FRAC | 418 |
| 24 | 240 | VALUE = (VALUE + PREDIS(ACN,N)) * PENFAC | 419 |
| 25 | 250 | ELSE | |
| 26 | 260 | GO TO 40 | |

TABLE 5

| Step | Address | Instruction | Flow Chart Block Number |
|---|---|---|---|
| | * | CALCULATE THE FRZCN PRICES | |
| | * | DEFINE THE FOLLOWING VARIABLES, ALL OF WHICH CAN BE RETRIEVED FROM THE MASTER DATA FILES OR ARE ENTERED BY THE FUND MANAGER: | |
| | * | MAX = MAXIMUM MATURITY OF FRZCN TO BE OFFERED FOR SALE (EXPRESSED IN NUMBER OF PERIODS) | 501 |
| | * | COLCOS(M) = PROJECTED COLLEGE COST FOR PERIOD M IN THE FUTURE | 502 |
| | * | CURCOS = CURRENT COLLEGE COST | 502 |
| | * | PROINF(M) = PROJECTED INFLATION INDEX FOR PERIOD M (RELATIVE TO SOME BASE YEAR) | 503 |
| | * | CURINF = CURRENT VALUE OF INFLATION INDEX (RELATIVE TO THE SAME BASE YEAR AS PROINF) | 503 |
| | * | YIELD(M) = THE YIELD OBTAINABLE THROUGH THE PURCHASE OF A SECURITY, OR OF A PACKAGE OF SECURITIES, THAT MATURES M PERIODS IN THE FUTURE | 507 |
| | * | RISK(M) = RISK PREMIUM CORRESPONDING TO AN OVERALL PERIOD THAT EXTENDS M PERIODS INTO THE FUTURE | 509 |
| | * | PROFIT(M) = MARGIN OF PROFIT | 511 |
| | * | A = WEIGHTING FACTOR | 506 |
| 1 | 10 | M = 0 | 504 |
| 2 | 20 | M = M + 1 | 505 |
| 3 | 30 | FVER(M) = A * (COLCOS(M)/CURCOS) ** (1./M) + (1 − A) * (PROINF(M)/CURINF) ** (1./M) | 506 |
| 4 | 40 | PVDR(M) = YIELD(M) − FVER(M) − RISK(M) − PROFIT(M) | 513 |
| 5 | 50 | PRICE(M) = CURCOS/(1 + PVDR(M)) ** M | 514 |
| 6 | 60 | PREDIS(M) = PRICE(M) − CURCOS | 515 |
| 7 | 70 | IF (M. EQ. MAX) THEN | |
| 8 | 80 | GO TO 120 | |
| 9 | 90 | ELSE | |
| 10 | 100 | GO TO 20 | |
| 11 | 110 | END IF | |

TABLE 5-continued

| Step | Address | Instruction | Flow Chart Block Number |
|---|---|---|---|
| 12 | 120 | DO 150 M=1, MAX | |
| 13 | 130 | WRITE (6,140) M, PRICE(M) | |
| 14 | 140 | FORMAT (' ',I4,5X,F9.2) | |
| 15 | 150 | CONTINUE | |

One skilled in the art will appreciate that the present invention can be practiced by other than the embodiments described, which are presented for purposes of illustration and not of limitation, and the present invention is limited only by the claims that follow.

What is claimed is:

1. A data processing system for administering a program to substantially reduce the uncertainty regarding the cost of a future liability whose projected due date and whose present cost are known but whose future cost is unknown but can be projected with some risk factor, said liability arising from the need to purchase a service or commodity, and thereby for defeasing said liability, said system comprising:

means for determining the price to be charged to defease said liability based on the present cost of said service or commodity, data concerning the average future spread between the inflation rate for that service or commodity and investment yields, a risk premium linked to volatility of said spread, and the time period to said due date;

means responsive to the determined price for issuing at said price a floating rate zero coupon note for defeasing said liability, said floating rate zero coupon note having a scheduled maturity date and being redeemable; and means for determining a redemption value of said floating rate zero coupon note based on the cost of the service of commodity at the time of purchase, escalation in cost of the service of commodity since that time as measured by a specific index, the unamortized discount or premium balance, and, when redemption occurs prior to maturity, a specified schedule of penalties for early withdrawal.

2. The data processing system of claim 1, wherein said means for determining the price to be charged to defease said liability comprises:

means for calculating a future value escalation rate based on information concerning at least the projected rate of change of the cost of said service or commodity;

means responsive to said calculated future value escalation rate for determining a present value discount rate by subtracting the future value escalation rate and an insurer's risk premium rate from the investment yield obtainable upon the investment of funds received from sale of said floating rate zero coupon note and reinvestment of any interim cash flows;

means responsive to said determined present value discount rate for discounting the current cost of said service of commodity at the present value discount rate to determine the price to be charged for said floating rate zero coupon note; and means responsive to said discounted current cost for determining an aggregate premium or discount as the difference between the price to be charged for the floating rate zero coupon note and the current cost of the service or commodity.

3. The data processing system of claim 1, wherein said means for determining a redemption value of a floating rate zero coupon note comprises:

early redemption determining means for determining whether redemption is being requested prior to the scheduled maturity date for said floating rate zero coupon note;

means responsive to an early redemption determination for determining the early withdrawal penalties that apply, based on the floating rate zero coupon note purchase date and the schedule of contractural early withdrawal penalties, when redemption occurs prior to maturity;

means for calculating the fraction of the period the floating rate zero coupon note was held in the period it was purchased and the fraction of the period it was held in the period it was redeemed;

means responsive to said early redemption determination, to said penalty determining means and to said fraction calculating means for calculating an adjusted escalation rate corresponding to each period the floating rate zero coupon note was held based on the fraction of that period it was held, the rate of escalation in the cost of the service or commodity during that period and, in the event of redemption prior to maturity, the early withdrawal penalty factor to be applied to that period; and means responsive to said early redemption determination and to said calculated adjusted escalation rate for escalating the cost of the service or commodity at the floating rate zero coupon note purchase date by the sequence of adjusted escalation rates that correspond to each period the floating rate zero coupon note was held, adding the unamortized premium or discount balance, if any, and in the event redemption occurs prior to maturity, multiplying by a penalty factor fraction not greater than one, to determine the redemption value.

4. The data processing system of claim 1 further comprising:

account list means for storing current information for each floating rate zero coupon note account;

means for entering floating rate zero coupon note purchase and redemption data and account holder inquiries;

means for processing periodically said floating rate zero coupon note purchase and redemption transaction data to update said account list and to determine the net amount of transactions for the period;

asset position list means for storing current information concerning a portfolio of investments purchased with funds received from sale of said floating rate zero coupon note and interim investment cash flows;

portfolio management means for selecting a portfolio of securities and updating said asset position list periodically;

means for entering the selected security purchase and sale transaction data to update the asset position list;

monitoring means for periodically monitoring the investment performance of the system;

management reporting means for periodically reporting a summary of purchase and redemption transactions from said purchase and redemption processing means, asset position from said asset position list, liability position, and investment performance from said monitoring means;

means for calculating the investment income and taxable income accruing to the holder of a floating rate zero coupon note each period;

investor reporting means responsive to said investment income calculating means for periodically reporting to account holders the status of their accounts and investment income and taxable income earned in their accounts during the period; and transaction and inquiry reporting means responsive to said investor reporting means for confirming individual transactions and responding to inquiries from account holders.

5. The data processing system of claim 4, wherein said portfolio management means for selecting a portfolio of securities and updating said asset position list periodically comprises:

means for determining the schedule of projected floating rate zero coupon note liabilities based on the aggregate maturity schedule for the floating rate zero coupon notes and actuarial data regarding the likelihood of redemptions prior to maturity;

means for determining the amount of funds available for investment based on the amount of cash on hand and the current market value of the investment portfolio; and means responsive to the schedule of projected floating rate zero coupon note liabilities, the projected cash need for the following period, amount of funds available for investment, projected interest rates, schedule of yields currently available for investment, the current composition of the investment portfolio, and predefined portfolio selection criteria, for selecting securities to be purchased or sold.

6. The data processing system of claim 5, wherein said portfolio management means further comprises means for evaluating the effect of the selected purchases or sales on the portfolio for rejecting any selection that would result in a yield on the portfolio that is less than a composite cost of the floating rate zero coupon note liabilities, and for rejecting also any selection that would result in a projected income stream for which the income projected for any period is less than the projected floating rate zero coupon note liability for said period.

7. The data processing system of claim 4, wherein said management reporting means for periodically reporting a summary of purchase and redemption transactions, asset and liability positions, and investment performance comprises means for keeping running totals of the numbers of floating rate zero coupon notes of each maturity that are outstanding at each point in time, that were purchased to date during the period, that were redeemed to date during the period, that were purchased during the day, and that were redeemed during the day and running totals of the dollar volume of floating rate zero coupon note redemptions and floating rate zero coupon note purchases for the day and for the period.

8. The data processing system of claim 7, wherein said management reporting means further comprises:

means for calculating the yield on the investment portfolio by determining the internal rate of return of the cash flow stream expected from the investment portfolio; and means for calculating the cost of said floating rate zero coupon notes by determining the internal rate of return of the cash flow stream corresponding to the aggregate maturity schedule for the floating rate zero coupon notes.

9. The data processing system of claim 8 wherein said management reporting means further comprises means for converting the yield on the investment portfolio and the cost of the floating rate zero coupon notes to a common basis.

10. The data processing system of claim 9 wherein said common basis is a semi-annular equivalent basis.

11. The data processing system of claim 10 wherein said monitoring means further comprises:

means for calculating the average assets under management during the period based on the market value of the investment portfolio at the end of the period and the market value of the investment portfolio at the beginning of the period; and means for calculating the return on initial assets, the return on average assets, the cash return on initial assets, and the cash return on average assets.

12. The data processing system of claim 11 wherein said monitoring means further comprises means for determining whether the system is overfunded or underfunded and the amount of any overfunding or underfunding.

13. The data processing system of claim 4, wherein said monitoring means for periodically monitoring investment performance of the system comprises means for calculating the income from the investment portfolio during the period by summing the amount of unrealized appreciation in the value of the investment portfolio during the period, the amount of investment income realized in cash during the period, and the capital gain or loss on securities transactions during the period.

14. The data processing system of claim 4, wherein said means for calculating the amount of investment income and taxable income generated for each floating rate zero coupon note during a period comprises:

means for calculating the accretion during the period, whether the floating rate zero coupon note was held for the entire period or only for part of it;

means responsive to said accretion calculating means for determining the amount of taxable income for the period; and means for calculating the amount of investment income based on the rate of escalation in the cost of the service or commodity during the period and the amount of amortization of the discount or premium during the period.

15. The data processing system of claim 1, wherein said means for determining the price to be charged to defease said liability comprises:

means for calculating a future value escalation rate based on information concerning at least the current cost of said service or commodity and the projected rate of change of the cost of said service or commodity;

means responsive to said calculated future value escalation rate for calculating the face value of the floating rate zero coupon note by compounding the current cost of the service or commodity over the life of the floating rate zero coupon note at the future value escalation rate;

means for determining a present value discount rate by subtracting an insurer's risk premium rate from the investment yield obtainable upon the investment of funds received from sale of said floating rate zero coupon note and reinvestment of any interim cash flows;

means responsive to said calculated face value and to said determined present value discount rate for discounting the face value of said floating rate zero coupon note at the present value discount rate to determine the price to be charged for said floating rate zero coupon note; and means responsive to said discounted face value for determining an aggregate premium or discount as the difference between the price to be charged for the floating rate zero coupon note and the current cost of the service or commodity.

16. The data processing system of claim 1, wherein said means for determining a redemption value of a floating rate zero coupon note comprises:

early redemption determining means for determining whether redemption is being requested prior to the scheduled maturity date for said floating rate zero coupon note;

means responsive to an early redemption determination for determining the early withdrawal penalties that apply, based on the floating rate zero coupon note purchase date and the schedule of contractual early withdrawal penalties, when redemption occurs prior to maturity;

means for calculating the fraction of the period the floating rate zero coupon note was held in the period it was purchased and the fraction of the period it was held in the period it was redeemed;

means responsive to said early redemption determination to said penalty determining means and to said fraction calculating means for calculating an adjusted escalation rate corresponding to each period the floating rate zero coupon note was held based on the fraction of that period it was held, the rate of escalation of the cost of the service or commodity during that period and, in the event of redemption prior to maturity, the early withdrawal penalty factor to be applied to that period; and means responsive to said early redemption determination and to said calculated adjusted escalation rate for escalating the cost of the service or commodity at the floating rate zero coupon note purchase date by the sequence of adjusted escalation rates that correspond to each period the floating rate zero coupon note was held, adding the unamortized premium or discount balance, if any, and in the event redemption occurs prior to maturity, multiplying by a penalty factor fraction not greater than one, to determine the redemption value.

17. The data processing system of claim 1 further comprising:

account list means for storing current information for each floating rate zero coupon note account;

means for entering floating rate zero coupon note purchase and redemption data and account holder inquiries;

means for processing periodically said floating rate zero coupon note purchase and redemption transaction data to update said account list and to determine the net amount of transactions for the period;

asset position list means for storing current information concerning a portfolio of investments purchased with funds received from sale of said floating rate zero coupon note and interim investment cash flows;

portfolio management means for selecting a portfolio of securities and updating said asset position list periodically, based on the amount of cash that is available for investment, the current composition of the investment portfolio, the projected cash need for the following period, the projected aggregate floating rate zero coupon note liablility schedule, and predefined portfolio selection criteria, for generating a stream of cash flows from the portfolio that will be sufficient to cover in full in a timely manner the cost of redeeming the floating rate zero coupon notes;

means for entering the selected security purchase and sale transaction data to update the asset position list;

monitoring means for periodically monitoring the investment performance of the system;

management reporting means for periodically reporting a summary of purchase and redemption transactions from said purchase and redemption processing means, asset position from said asset position list, liability position, and investment performance from said monitoring means;

means for calculating the investment income and taxable income accruing to the holder of a floating rate zero coupon note each period;

investor reporting means responsive to said investment income calculating means for periodically reporting to account holders the status of their accounts and investment income and taxable income earned in their accounts during the period; and transaction and inquiry reporting means responsive to said investor reporting means for confirming individual transactions and responding to inquiries from account holders.

18. The data processing system of claim 17, wherein said portfolio management means for selecting a portfolio of securities and updating said asset position list periodically comprises:

means for determining the schedule of projected floating rate zero coupon note liabilities based on the aggregate maturity schedule for the floating rate zero coupon notes and actuarial data regarding the likelihood of redemptions prior to maturity;

means for determining the amount of funds available for investment based on the amount of cash on hand and the current market value of the investment portfolio; and means responsive to the schedule of projected floating rate zero coupon note liabilities, the projected cash need for the following period, the amount of funds available for investment, projected interest rates, schedule of yields currently available for investment, the current composition of the investment portfolio, and predefined portfolio selection criteria, for selecting securities to be purchased or sold.

19. The data processing system of claim 18, wherein said portfolio management means further comprises means for evaluating the effect of the selected purchases or sales on the portfolio for rejecting any selection that would result in a yield on the portfolio that is less than a composite cost of the floating rate zero coupon note liabilities, and for rejecting also any selection that would result in a projected income stream for which the income projected for any period is less than the projected floating rate zero coupon note liability for said period.

20. The data processing system of claim 17, wherein said management reporting means for periodically reporting a summary of purchase and redemption transactions, asset and liability positions, and investment performance comprises means for keeping running totals of the numbers of floating rate zero coupon notes of each maturity that are outstanding at each point in time, that were purchased to date during the period, that were redeemed to date during the period, that were purchased during the day, and that were redeemed during the day and running totals of the dollar volume of floating rate zero coupon note redemptions and floating rate zero coupon note purchases for the day and for the period.

21. The data processing system of claim 20, wherein said management reporting means further comprises:
means for calculating the yield on the investment portfolio by determining the internal rate of return of the cash flow stream expected from the investment portfolio; and
means for calculating the cost of said floating rate zero coupon notes by determining the internal rate of return of the cash flow stream corresponding to the aggregate maturity schedule for the floating rate zero coupon notes.

22. The data processing system of claim 21, wherein said management reporting means further comprises means for converting the yield on the investment portfolio and the cost of the floating rate zero coupon notes to a common basis.

23. The data processing system of claim 22 wherein said common basis is a semi-annual equivalent basis.

24. The data processing system of claim 17, wherein said monitoring means for periodically monitoring investment performance of the system comprises means for calculating the income from the investment portfolio during the period by summing the amount of unrealized appreciation in the value of the investment portfolio during the period, the amount of investment income realized in cash during the period, and the capital gain or loss on securities transactions during the period.

25. The data processing system of claim 24, wherein said monitoring means further comprises:
means for calculating the average assets under management during the period based on the market value of the investment portfolio at the end of the period and the market value of the investment portfolio at the beginning of the period; and
means for calculating the return on initial assets, the return on average assets, the cash return on initial assets, and the cash return on average assets.

26. The data processing system of claim 25, wherein said monitoring means further comprises means for determining whether the system is overfunded or underfunded and the amount of any overfunding or underfunding.

27. The data processing system of claim 17, wherein said means for calculating the amount of investment income and taxable income generated for each floating rate zero coupon note during a period comprises:
means for calculating the accretion during the period, whether the floating rate zero coupon note was held for the entire period or only for part of it;
means responsive to said accretion calculating means for determining the amount of taxable income for the period; and
means for calculating the amount of investment income based on the rate of excalation in the cost of the service or commodity during the period and the amount of amortization of the discount or premium during the period.

28. A data processing method for administering a program to substantially reduce the uncertainty regarding the cost of a future liability whose projected due date and whose present cost are known but whose future cost is unknown but can be projected with some risk factor, said liability arising from the need to purchase a service or commodity, and thereby to defease said liability, said method comprising the steps of:
determining the price to be charged to defease said liability based on the present cost of said service or commodity, data concerning the average future spread between the inflation rate for that service or commodity and investment yields, a risk premium linked to volatility of said spread, and the time period to said due date;
responsive to the determined price, issuing at said price a floating rate zero coupon note for defeasing said liability, said floating rate zero coupon note having a scheduled maturity date and being redeemable; and
determining a redemption value of said floating rate zero coupon note based on the cost of the service or commodity at the time of purchase, escalation in cost of the service or commodity since that time as measured by a specified index, the unamortized discount or premium balance, and when redemption occurs prior to maturity, a specified schedule of penalties for early withdrawal.

29. The data processing method of claim 28, wherein said step of determining the price to be charged to defease said liability comprises:
calculating a future value escalation rate based on information concerning at least the projected rate of change of the cost of said service or commodity;
determining, responsive to said calculated future value escalation rate, a present value discount rate by subtracting the future value escalation rate and an insurer's risk premium rate from the investment yield obtainable upon the investment of funds received from sale of said floating rate zero coupon note and reinvestment of any interim cash flows;
discounting, responsive to said determined present value discount rate, the current cost of said service or commodity at the present value discount rate to determine the price to be charged for said floating rate zero coupon note; and
determining, responsive to said discounted current cost, and aggregate premium or discount as the difference between the price to be charged for the floating rate zero coupon note and the current cost of the service or commodity.

30. The data processing method of claim 28, wherein said step of determining a redemption value of a floating rate zero coupon note comprises:
- determining whether redemption is being requested prior to the scheduled maturity date for said floating rate zero coupon note;
- determining, when redemption is being requested prior to maturity, the early withdrawal penalties that apply, based on the floating rate zero coupon note purchase date and the schedule of contractual early withdawal penalties;
- calculating the fraction of the period the floating rate zero coupon note was held in the period it was purchased and the fraction of the period it was held in the period it was redeemed;
- calculating an adjusted escalation rate corresponding to each period the floating rate zero coupon note was held based on the fraction of that period it was held, the rate of escalation in the cost of the service or commodity during that period and, in the event of redemption prior to maturity, the early withdrawal penalty factor to be applied to that period; and
- escalating the cost of the service or commodity at the floating rate zero coupon note purchase date by the sequence of adjusted escalation rates that correspond to each period the floating rate zero coupon note was held, adding the unamortized premium or discount balance, if any, and in the event redemption occurs prior to maturity, multiplying by a penalty factor fraction not greater than one, to determine the redemption value.

31. The data processing method of claim 28 further comprising the steps of:
- maintaining an account list of current information for each floating rate zero coupon note account;
- maintaining an asset position list of current information concerning a portfolio of investments purchased with funds received from sale of said floating rate zero coupon note and interim investment cash flows;
- entering floating rate zero coupon note purchase and redemption data and account holder inquiries into a data processing system;
- processing periodically said floating rate zero coupon note purchase and redemption transaction data to update said account list and to determine the net amount of transactions for the period;
- selecting a portfolio of securities and updating said asset position list periodically;
- entering the selected security purchase and sale transaction data to update said asset position list;
- monitoring periodically the investment performance of the method;
- reporting periodically a summary of purchase and redemption transactions, asset and liability positions, and investment performance;
- calculating the investment income and taxable income accruing to the holder of a floating rate zero coupon note for each period;
- reporting periodically to account holders the status of their accounts and investment income and taxable income earned in their accounts during the period; and
- confirming individual transactions and responding to inquiries from account holders.

32. The data processing method of claim 31, wherein said step of selecting a portfolio of securities and updating said asset position list periodically comprises:
- determining the schedule of projected floating rate zero coupon note liabilities based on the aggregate maturity schedule for the floating rate zero coupon notes and actuarial data regarding the likelihood of redemptions prior to maturity;
- determining the amount of funds available for investment based on the amount of cash on hand and the current market value of the investment portfolio; and
- responsive to the schedule of projected floating rate zero coupon note liabilities, to the projected cash need for the following period, to amount of funds available for investment, to projected interest rates, to the schedule of yields currently available for investment, to the current composition of the investment portfolio, and to predefined portfolio selection criteria, selecting securities to be purchased or sold.

33. The data processing method of claim 32, wherein said portfolio updating and selecting step further comprises evaluating the effect of the selected purchases or sales on the portfolio, rejecting any selection that would result in a yield on the portfolio that is less than a composite cost of the floating rate zero coupon note liabilities, and rejecting also any selection that would result in a projected income stream for which the income projected for any period is less than the projected floating rate zero coupon note liability for said period.

34. The data processing method of claim 31, wherein said step of periodically reporting a summary of purchase and redemption transactions, asset and liability positions, and investment performance comprises keeping running totals of the numbers of floating rate zero coupon notes of each maturity that are outstanding at each point in time, that were purchased to date during the period, that were redeemed to date during the period, that were purchased during the day, and that were redeemed during the day and running totals of the dollar volume of floating rate zero coupon note redemptions and floating rate zero coupon note purchases for the day and for the period.

35. The data processing method of claim 34 wherein said periodic reporting step further comprises:
- calculating the yield on the investment portfolio by determining the internal rate of return of the cash flow stream expected from the investment portfolio; and
- calculating the cost of said floating rate zero coupon notes by determining the internal rate of return of the cash flow stream corresponding to the aggregate maturity schedule for the floating rate zero coupon notes.

36. The data processing method of claim 35, wherein said periodic reporting step further comprises converting the yield on the investment portfolio and the cost of the floating rate zero coupon notes to a common basis.

37. The data processing method of claim 36 wherein said common basis is a semi-annual equivalent basis.

38. The data processing method of claim 31, wherein said step of periodically monitoring investment performance of the method comprises calculating the income from the investment portfolio during the period by summing the amount of unrealized appreciation in the value of the investment portfolio during the period, the amount of investment income realized in cash during the period, and the capital gain or loss on securities transactions during the period.

39. The data processing method of claim 38, wherein said periodic monitoring step further comprises:
calculating the average assets under management during the period based on the market value of the investment portfolio at the end of the period and the market value of the investment portfolio at the beginning of the period; and
calculating the return on initial assets, the return on average assets, the cash return on initial assets, and the cash return on average assets.

40. The data processing method of claim 39, wherein said periodic monitoring step further comprises determining whether the system is overfunded or underfunded and the amount of any overfunding or underfunding.

41. The data processing method of claim 31, wherein said step of calculating the amount of investment income and taxable income generated for each floating rate zero coupon note during a period comprises:
calculating the accretion during the period, whether the floating rate zero coupon note was held for the entire period or only for part of;
determining, responsive to said accretion calculating step, the amount of taxable income for the period; and
calculating the amount of investment income based on the rate of escalation in the cost of the service or commodity during the period and the amount of amortization of the discount or premium during the period.

42. The data processing method of claim 28, wherein said step of determining the price to be charged to defease said liability comprises:
calculating a future value escalation rate based on information concerning at least the projected rate of change of the cost of said service or commodity;
calculating, responsive to said calculated future value escalation rate, the face value of the floating rate zero coupon note by compounding the current cost of the service or commodity over the life of the floating rate zero coupon note at the future value escalation rate;
determining a present value discount rate by subtracting an insurer's risk premium rate from the investment yield obtainable upon the investment of funds received from sale of said floating rate zero coupon note and reinvestment of any interim cash flows;
discounting, responsive to said determined present value discount rate, the calculated face value of said floating rate zero coupon note at the present value discount rate to determine the price to be charged for said floating rate zero coupon note; and
determining, responsive to said discounted face value, an aggregate premium or discount as the difference between the price to be charged for the floating rate zero coupon note and the current cost of the service or commodity.

43. The data processing method of claim 28, wherein said step of determining a redemption value of a floating rate zero coupon note comprises:
determining whether redemption is being requested prior to the scheduled maturity date for said floating rate zero coupon note;
determining, when redemption occurs prior to maturity, the early withdrawal penalties that apply, based on the floating rate zero coupon note purchase date and the schedule of contractual early withdrawal penalties;
calculating the fraction of the period the floating rate zero coupon note was held in the period it was purchased and the fraction of the period it was held in the period it was redeemed;
calculating an adjusted escalation rate corresponding to each period the floating rate zero coupon note was held based on the fraction of that period it was held, the rate of escalation in the cost of the service or commodity during that period and, in the event of redemption prior to maturity, the early withdrawal penalty factor to be applied to that period; and
escalating the cost of the service or commodity at the floating rate zero coupon note purchase date by the sequence of adjusted escalation rates that correspond to each period the floating rate zero coupon note was held, adding the unamortized premium or discount balance, if any, and in the event redemption occurs prior to maturity, multiplying by a penalty factor fraction not greater than one, to determine the redemption value.

44. The data processing method of claim 28 further comprising the steps of:
maintaining an account list of current information for each floating rate zero coupon note account;
maintaining an asset position list of current information concerning a portfolio of investments purchased with funds received from sale of said floating rate zero coupon note and interim investment cash flows;
entering floating rate zero coupon note purchase and redemption data and account holder inquiries into a data processing system;
processing periodically said floating rate zero coupon note purchase and redemption transaction data to update said account list and to determine the net amount of transactions for the period;
selecting a portfolio of securities and updating said asset position list periodically, based on the amount of cash that is available for investment, the current composition of the investment portfolio, the projected cash need for the following period, the projected aggregate floating rate zero coupon note liability schedule, and predefined portfolio selection criteria, thereby generating a stream of cash flows from the portfolio that will be sufficient to cover in full in a timely manner the cost of redeeming said floating rate zero coupon notes;
entering the selected security purchase and sale transaction data to update said asset position list;
monitoring periodically the investment performance of the method;
reporting periodically a summary of purchase and redemption transactions from said selecting and updating step, asset position from said asset position list, liability position, and investment performance from said monitoring step;
calculating the investment income and taxable income accruing to the holder of a floating rate zero coupon note for each period;
reporting periodically to account holders the status of their accounts and investment income and taxable income earned in their accounts during the period; and confirming individual transactions and responding to inquiries from account holders.

45. The data processing method of claim 44, wherein said step of selecting a portfolio of securities and updating said asset position list periodically comprises:

determining the schedule of projected floating rate zero coupon note liabilities based on the aggregate maturity schedule for the floating rate zero coupon notes and actuarial data regarding the likelihood of redemptions prior to maturity;

determining the amount of funds available for investment based on the amount of cash on hand and the current market value of the investment portfolio; and responsive to the schedule of projected floating rate zero coupon note liabilities, to the projected cash need for the following period, to amount of funds available for investment, to projected interest rates, to the schedule of yields currently available for investment, to the current composition of the investment portfolio, and to predefined portfolio selection criteria, selecting securities to be purchased or sold.

46. The data processing method of claim 45, wherein said portfolio selecting and updating step further comprises evaluating the effect of the selected purchases or sales on the portfolio, rejecting any selection that would result in a yield on the portfolio that is less than a composite cost of the floating rate zero coupon note liabilities, and rejecting also any selection that would result in a projected income stream for which the income projected for any period is less than the projected floating rate zero coupon note liability for said period.

47. The data processing method of claim 44, wherein said step of periodically reporting a summary of purchase and redemption transactions, asset and liability positions, and investment performance comprises keeping running totals of the numbers of floating rate zero coupon notes of each maturity that are outstanding at each point in time, that were purchased to date during the period, that were redeemed to date during the period, that were purchased during the day, and that were redeemed during the day and running totals of the dollar volume of floating rate zero coupon note redemptions and floating rate zero coupon note purchases for the day and for the period.

48. The data processing method of claim 47, wherein said periodic reporting step further comprises:

calculating the yield on the investment portfolio by determining the internal rate of return of the cash flow stream expected from the investment portfolio; and calculating the cost of said floating rate zero coupon notes by determining the internal rate of return of the cash flow stream corresponding to the aggregate maturity schedule for the floating rate zero coupon notes.

49. The data processing method of claim 48, wherein said periodic reporting step further comprises converting the yield on the investment portfolio and the cost of the floating rate zero coupon notes to a common basis.

50. The data processing method of claim 49, wherein said common basis is a semi-annual equivalent basis.

51. The data processing method of claim 44, wherein said step of periodically monitoring investment performance of the method comprises calculating the income from the investment portfolio during the period by summing the amount of unrealized appreciation in the value of the investment portfolio during the period, the amount of investment income realized in cash during the period, and the capital gain or loss on securities transactions during the period.

52. The data processing method of claim 51, wherein said periodic monitoring step further comprises:

calculating the average assets under management during the period based on the market value of the investment portfolio at the end of the period and the market value of the investment portfolio at the beginning of the period; and calculating the return on initial assets, the return on average assets, the cash return on initial assets, and the cash return on average assets.

53. The data processing method of claim 52, wherein said periodic monitoring step further comprises determining whether the system is overfunded or underfunded and the amount of any overfunding or underfunding.

54. The data processing method of claim 44, wherein said step of calculating the amount of investment income and taxable income generated for each floating rate zero coupon note during a period comprises:

calculating the accretion during the period, whether the floating rate zero coupon note was held for the entire period or only for part of it;

determining, responsive to said accretion calculating step, the amount of taxable income for the period; and calculating the amount of investment income based on the the rate of escalation in the cost of the service of commodity during the period and the amount of amortization of the discount or premium during the period.

55. A data processing system for administering a program to substantially reduce the uncertainty regarding the cost of a future liability whose projected due date and whose present cost are known but whose future cost is unknown but can be projected with some risk factor, said liability arising from the need to purchase a service or commodity, and thereby for defeasing said liability, said system comprising:

means for determining the price to be charged to defease said liability based on the present cost of said service or commodity, data concerning the average future spread between the inflation rate for that service or commodity and investment yields, a risk premium linked to volatility of said spread, and the time period to said due date;

means responsive to the determined price for issuing at said price a floating rate zero coupon note for defeasing said liability, said floating rate zero coupon note having a scheduled maturity date and being redeemable; and means for determining a redemption value of said floating rate zero coupon note at said scheduled maturity date based on the cost of the service or commodity at said schedule maturity date.

56. The data processing system of claim 55, wherein said means for determining the price to be charged to defease said liability comprises:

means for calculating a future value escalation rate based on information concerning at least the projected rate of change of the cost of said service or commodity;

means responsive to said calculated future value escalation rate for determining a present value discount rate by subtracting the future value escalation rate and an insurer's risk premium rate from the investment yield obtainable upon the investment of funds received from sale of said floating rate zero coupon note and reinvestment of any interim cash flows;

means responsive to said determined present value discount rate for discounting the current cost of said service or commodity at the present value discount rate to determine the price to be charged for said floating rate zero coupon note; and means responsive to said discounted current cost for determining an aggregate premium or discount as the difference between the price to be charged for the floating rate zero coupon note and the current cost of the service or commodity.

57. The data processing method of claim 55 further comprising:

account list means for storing current information for each floating rate zero coupon note account;

means for entering floating rate zero coupon note purchase data and account holder inquiries;

means for processing periodically said floating rate zero coupon note purchase transaction data to update said account list;

asset position list means for storing current information concerning a portfolio of investments purchased with funds received from sale of said floating rate zero coupon note and interim investment cash flows;

portfolio management means for selecting a portfolio of securities and updating said asset position list periodically;

means for entering the selected security purchase and sale transaction data to update the asset portfolio list;

monitoring means for periodically monitoring the investment performance of the system;

management reporting means for periodically reporting a summary of purchase and redemption transactions from said purchase and redemption processing means, asset position from said asset position list, liability position, and investment performance from said monitoring means;

means for calculating the investment income and taxable income accruing to the holder of a floating rate zero coupon note each period;

investor reporting means responsive to said investment income calculating means for periodically reporting to account holders the status of their accounts and investment income and taxable income earned in their accounts during the period; and transaction and inquiry reporting means responsive to said investor reporting means for confirming individual transactions and responding to inquiries from account holders.

58. The data processing system of claim 57, wherein said portfolio management means for selecting a portfolio of securities and updating said asset position list periodically comprises:

means for determining the schedule of projected floating rate zero coupon note liabilities based on the aggregate maturity schedule for the floating rate zero coupon notes;

means for determining the amount of funds available for investment based on the amount of cash on hand and the current market value of the investment portfolio; and means responsive to the schedule of projected floating rate zero coupon note liabilities, the projected cash need for the following period, amount of funds available for investment, projected interest rates, schedule of yields currently available for investment, the current composition of the investment portfolio, and predefined portfolio selection criteria, for selecting securities to be purchased or sold.

59. The data processing system of claim 58 wherein said portfolio management means further comprises means for evaluating the effect of the selected purchases or sales on the portfolio for rejecting any selection that would result in a yield on the portfolio that is less than a composite cost of the floating rate zero coupon note liabilities, and for rejecting also any selection that would result in a projected income stream for which the income projected for any period is less than the projected floating rate zero coupon note liability for said period.

60. The data processing system of claim 57, wherein said management reporting means for periodically reporting a summary of purchase and redemption transactions, asset and liability positions, and investment performance comprises means for keeping running totals of the numbers of floating rate zero coupon notes of each maturity that are outstanding at each point in time, that were purchased to date during the period, that were redeemed to date during the period, that were purchased during the day, and that were redeemed during the day and running totals of the dollar volume of floating rate zero coupon note redemptions and floating rate zero coupon note purchases for the day and for the period.

61. The data processing system of claim 60, wherein said management reporting means further comprises:

means for calculating the yield on the investment portfolio by determining the internal rate of return of the cash flow stream expected from the investment portfolio; and means for calculating the cost of said floating rate zero coupon notes by determining the internal rate of return of the cash flow stream corresponding to the aggregate maturity schedule for the floating rate zero coupon notes.

62. The data processing system of claim 61, wherein said management reporting means further comprises means for converting the yield on the investment portfolio and the cost of the floating rate zero coupon notes to a common basis.

63. The data processing system of claim 62, wherein said common basis is a semi-annual equivalent basis.

64. The data processing system of claim 57, wherein said monitoring means for periodically monitoring investment performance of the system comprises means for calculating the income from the investment portfolio during the period by summing the amount of unrealized appreciation in the value of the investment portfolio during the period, the amount of investment income realized in cash during the period, and the capital gain or loss on securities transactions during the period.

65. The data processing system of claim 64, wherein said monitoring means further comprises:

means for calculating the average assets under management during the period based on the market value of the investment portfolio at the end of the period and the market value of the investment portfolio at the beginning of the period; and means for calculating the return on initial assets, the return on average assets, the cash return on initial assets, and the cash return on average assets.

66. The data processing system of claim 65, wherein said monitoring means further comprises means for determining whether the system is overfunded or underfunded and the amount of any overfunding or underfunding.

67. The data processing system of claim 57, wherein said means for calculating the amount of investment income and taxable income generated for each floating rate zero coupon note during a period comprises:
  means for calculating the accretion during the period, whether the floating rate zero coupon note was held for the entire period or only for part of it;
  means responsive to said accretion calculating means for determining the amount of taxable income for the period; and
  means for calculating the amount of investment income based on the rate of escalation in the cost of the service or commodity during the period and the amount of amortization of the discount or premium during the period.

68. The data processing system of claim 55, wherein said means for determining the price to be charged to defease said liability comprises:
  means for calculating a future value escalation rate based on information concerning at least the current cost of said service or commodity and the projected rate of change of the cost of said service or commodity;
  means responsive to said calculated future value escalation rate for calculating the face value of the floating rate zero coupon note by compounding the current cost of the service or commodity over the life of the floating rate zero coupon note at the future value escalation rate;
  means for determining a present value discount rate by subtracting an insurer's risk premium rate from the investment yield obtainable upon the investment of funds received from sale of said floating rate zero coupon note and reinvestment of any interim cash flows;
  means responsive to said calculated face value and to said determined present value discount rate for discounting the face value of said floating rate zero coupon note at the present value discount rate to determine the price to be charged for said floating rate zero coupon note; and
  means responsive to said discounted face value for determining an appregate premium or discount as the difference between the price to be charged for the floating rate zero coupon note and the current cost of the service or commodity.

69. A data processing method for administering a program to substantially reduce the uncertainty regarding the cost of a future liability whose projected due date and whose present cost are known but whose future cost is unknown but can be projected with some risk factor, said liability arising from the need to purchase a service or commodity, and thereby to defease said liability, said method comprising the steps of:
  determining the price to be charged to defease said liability based on the present cost of said service or commodity, data concerning the average future spread between the inflation rate for that service or commodity and investment yields, a risk premium linked to volatility of said spread, and the time period to said due date;
  responsive to said determined price, issuing at said price a floating rate zero coupon note for defeasing said liability, said floating rate zero coupon note having a scheduled maturity date and being redeemable; and
  determining a redemption value of said floating rate zero coupon note at said scheduled maturity date based on the cost of the service or commodity at said scheduled maturity date.

70. The data processing method of claim 69, wherein said step of determining the price to be charged to defease said liability comprises:
  calculating a future value escalation rate based on information concerning at least the current cost of said service or commodity and the projected rate of change of the cost of said service or commodity;
  determining, responsive to said calculated future value escalation rate, a present value discount rate by subtracting the future value escalation rate and an insurer's risk premium rate from the investment yield obtainable upon the investment of funds received from sale of said floating rate zero coupon note and reinvestment of any interim cash flows;
  discounting, responsive to said determined present value discount rate, the current cost of said service or commodity at the present value discount rate to determine the price to be charged for said floating rate zero coupon note; and
  determining, responsive to said discounted current cost, an aggregate premium or discount as the difference between the price to be charged for the floating rate zero coupon note and the current cost of the service or commodity.

71. The data processing method of claim 69 further comprising the steps of:
  maintaining an account list of current information for each floating rate zero coupon note account;
  maintaining an asset position list of current information concerning a portfolio of investments purchased with funds received from sale of said floating rate zero coupon note and interim investment cash flows;
  entering floating rate zero coupon note purchase data and account holder inquiries into a data processing system;
  processing periodically said floating rate zero coupon note purchase transaction data to update said account list;
  selecting a portfolio of securities and updating said asset position list periodically;
  entering the selected security purchase and sale transaction data to update said asset position list;
  monitoring periodically the investment performance of the method;
  reporting periodically a summary of purchase and redemption transactions, asset and liability positions, and investment performance;
  calculating the investment income and taxable income accruing to the holder of a floating rate zero coupon note for each period;
  reporting periodically to account holders the status of their accounts and investment income and taxable income earned in their accounts during the period; and
  confirming individual transactions and responding to inquiries from account holders.

72. The data processing method of claim 71, wherein said step of selecting a portfolio of securities and updating said asset position list periodically comprises:

determining the schedule of projected floating rate zero coupon note liabilities based on the aggregate maturity schedule for the floating rate zero coupon notes;

determining the amount of funds available for investment based on the amount of cash on hand and the current market value of the investment portfolio; and responsive to the schedule of projected floating rate zero coupon note liabilities, to the projected cash need for the following period, to amount of funds available for investment, to projected interest rates, to the schedule of yields currently available for investment, to the current composition of the investment portfolio, and to predefined portfolio selection criteria, selecting securities to be purchased or sold.

73. The data processing method of claim 72, wherein said portfolio selecting and updating step further comprises evaluating the effect of the selected purchases or sales on the portfolio, rejecting any selection that would result in a yield on the portfolio that is less than a composite cost of the floating rate zero coupon note liabilities, and rejecting also any selection that would result in a projected income stream for which the income projected for any period is less than the projected floating rate zero coupon note liability for said period.

74. The data processing method of claim 71, wherein said step of periodically reporting a summary of purchase and redemption transactions, asset and liability positions, and investment performance comprises keeping running totals of the numbers of floating rate zero coupon notes of each maturity that are outstanding at each point in time, that were purchased to date during the period, that were redeemed to date during the period, that were purchased during the day, and that were redeemed during the day and running totals of the dollar volume of floating rate zero coupon note redemptions and floating rate zero coupon note purchases for the day and for the period.

75. The data processing method of claim 74, wherein said periodic reporting step further comprises:

calculating the yield on the investment portfolio by determining the internal rate of return of the cash flow stream expected from the investment portfolio; and calculating the cost of said floating rate zero coupon notes by determining the internal rate of return of the cash flow stream corresponding to the aggregate maturity schedule for the floating rate zero coupon notes.

76. The data processing method of claim 75, wherein said periodic reporting step further comprises converting the yield on the investment portfolio and the cost of the floating rate zero coupon notes to a common basis.

77. The data processing method of claim 76, wherein said common basis is a semi-annual equivalent basis.

78. The data processing method of claim 71, wherein said step of periodically monitoring investment performance of the method comprises calculating the income from the investment portfolio during the period by summing the amount of unrealized appreciation in the value of the investment portfolio during the period, the amount of investment income realized in cash during the period, and the capital gain or loss on securities transactions during the period.

79. The data processing method of claim 78, wherein said periodic monitoring step further comprises:

calculating the average assets under management during the period based on the market value of the investment portfolio at the end of the period and the market value of the investment portfolio at the beginning of the period; and calculating the return on initial assets, the return on average assets, the cash return on initial assets, and the cash return on average assets.

80. The data processing method of claim 79, wherein said periodic monitoring step further comprises determining whether the system is overfunded or underfunded and the amount of any overfunding or underfunding.

81. The data processing method of claim 71, wherein said step of calculating the amount of investment income and taxable income generated for each floating rate zero coupon note during a period comprises:

calculating the accretion during the period, whether the floating rate zero coupon note was held for the entire period or only for part of it;

determining, responsive to said accretion calculating step, the amount of taxable income for the period; and calculating the amount of investment income based on the rate of escalation in the cost of the service or commodity during the period and the amount of amortization of the discount or premium during the period.

82. The data processing method of claim 69, wherein said step of determining the price to be charged to defease said liability comprises:

calculating a future value escalation rate based on information concerning at least the current cost of said service or commodity and the projected rate of change of the cost of said service or commodity;

calculating, responsive to said calculated future value escalation rate, the face value of the floating rate zero coupon note by compounding the current cost of the service or commodity over the life of the floating rate zero coupon note at the future value escalation rate;

determining a present value discount rate by subtracting an insurer's risk premium rate from the investment yield obtainable upon the investment of funds received from sale of said floating rate zero coupon note and reinvestment of any interim cash flows;

discounting, responsive to said calculated face value and to said determined present value discount rate, the face value of said floating rate zero coupon note at the present value discount rate to determine the price to be charged for said floating rate zero coupon note; and determining, responsive to said discounted face value, an aggregate premium or discount as the difference between the price to be charged for the floating rate zero coupon note and the current cost of the service or commodity.

83. A data processing system for administering a program to substantially reduce the uncertainty regarding the cost of a future liability whose projected due date and whose present cost are known but whose future cost is unknown but can be projected with some risk factor, said liability arising from the need to purchase a service or commodity, and thereby for defeasing said liability, said system comprising:

means for determining the price to be charged to defease said liability;

means responsive to the determined price for issuing at said price a floating rate zero coupon note for defeasing said liability, said floating rate zero coupon note having a scheduled maturity date and being redeemable; and means for determining a redemption value of said floating rate zero coupon note at said scheduled maturity date based on the cost of the service or commodity at said scheduled maturity date.

84. The data processing system of claim 83 wherein, when redemption occurs prior to maturity, said redemption value determining means bases said redemption value additionally on a specified schedule of penalties for early withdrawal.

85. The data processing system of claim 83 wherein said redemption value determining means bases said redemption value additionally on an unamortized discount or premium balance.

86. The data processing system of claim 83 wherein said means for determining the price to be charged to defease said liability comprises:

means for calculating a future value escalation rate based on information concerning at least the projected rate of change of the cost of said service or commodity;

means responsive to said calculated future value escalation rate for determining a present value discount rate by subtracting the future value escalation rate and a non-negative insurer's risk premium rate from the investment yield obtainable upon the investment of funds received from sale of said floating rate zero coupon note and reinvestment of any interim cash flows;

means responsive to said determined present value discount rate for discounting the current cost of said service or commodity at the present value discount rate to determine the price to be charged for said floating rate zero coupon note; and means responsive to said discounted current cost for determining an aggregate premium or discount as the difference between the price to be charged for the floating rate zero coupon note and the current cost of the service or commodity.

87. The data processing system of claim 83 wherein said means for determining a redemption value of a floating rate zero coupon note comprises:

early redemption determining means for determining whether redemption is being requested prior to the scheduled maturity date for said floating rate zero coupon note;

means responsive to an early redemption determination for calculating an adjusted escalation rate corresponding to each period the floating rate zero coupon note was held, and the rate of escalation of the cost of the service or commodity during that period; and means responsive to said early redemption determination and to said calculated adjusted escalation rate for escalating the cost of the service or commodity at the floating rate zero coupon note purchase date by the sequence of adjusted escalation rates that correspond to each period the floating rate zero coupon note was held.

88. The data processing system of claim 83 further comprising account list means for storing current information for each floating rate zero coupon note account.

89. The data processing system of claim 88 further comprising means for entering floating rate zero coupon note purchase and redemption transaction data and account holder inquiries.

90. The data processing system of claim 89 further comprising means for processing periodically said floating rate zero coupon note purchase and redemption transaction data to update said account list and to determine the net amount of transactions for the period.

91. The data processing system of claim 83 further comprising means for calculating the investment income and taxable income accruing to the holder of a floating rate zero coupon note each period.

92. A data processing method for administering a program to substantially reduce the uncertainty regarding the cost of a future liability whose projected due date and whose present cost are known but whose future cost is unknown but can be projected with some risk factor, said liability arising from the need to purchase a service or commodity, and thereby to defease said liability, said method comprising the steps of:

determining the price to be charged to defease said liability;

responsive to the determined price, issuing at said price a floating rate zero coupon note for defeasing said liability, said floating rate zero coupon note having a scheduled maturity date and being redeemable; and determining a redemption value of said floating rate zero coupon note at said scheduled maturity date based on the cost of the service or commodity at said scheduled maturity date.

93. The data processing method of claim 92 wherein said step of determining the price to be charged to defease said liability comprises:

calculating a future value escalation rate based on information concerning at least the projected rate of change of the cost of said service or commodity;

determining, responsive to said calculated future value escalation rate, a present value discount rate by subtracting the future value escalation rate and a non-negative insurer's risk premium rate from the investment yield obtainable upon the investment of funds received from sale of said floating rate zero coupon note and reinvestment of any interim cash flows;

discounting, responsive to said determined present value discount rate, the current cost of said service or commodity at the present value discount rate to determine the price to be charged for said floating rate zero coupon note; and determining, responsive to said discounted current cost, an aggregate premium or discount as the difference between the price to be charged for the floating rate zero coupon note and the current cost of the service or commodity.

94. The data processing method of claim 92 wherein said step of determining a redemption value of a floating rate zero coupon note comprises:

determining whether redemption is being requested prior to the scheduled maturity date for said floating rate zero coupon note;

responsive to an early redemption determination, calculating an adjusted escalation rate corresponding to each period the floating rate zero coupon note was held, and the rate of escalation of the cost of the service or commodity during that period; and responsive to said early redemption determination and to said calculated adjusted escalation rate, escalating the cost of the service or commodity at the floating rate zero coupon note purchase date by the sequence of adjusted escalation rates that correspond to each period the floating rate zero coupon note was held.

95. The data processing method of claim 92 further comprising maintaining an account list of current information for each floating rate zero coupon note account.

96. The data processing method of claim 95 further comprising entering floating rate zero coupon note purchase and redemption transaction data and account holder inquiries into a data processing system.

97. The data processing method of claim 96 further comprising processing periodically said floating rate zero coupon note purchase and redemption transaction data to update said account list and to determine the net amount of transactions for the period.

98. The data processing method of claim 92 further comprising calculating the investment income and taxable income accruing to the holder of a floating rate zero coupon note each period.

99. A data processing system for administering a program to substantially reduce the uncertainty regarding the cost of a future liability whose projected due date and whose present cost are known but whose future cost is unknown but can be projected with some risk factor, said liability arising from the need to purchase a service or commodity, and thereby for defeasing said liability at a determined price, said system comprising:

means responsive to the determined price for issuing at said price a floating rate zero coupon note for defeasing said liability, said floating rate zero coupon note having a scheduled maturity date and being redeemable; and means for determining a redemption value of said floating rate zero coupon note at said scheduled maturity date based on the cost of the service or commodity at said maturity date.

100. The data processing system of claim 99 wherein said means for determining the price to be charged to defease said liability comprises:

means for calculating a future value escalation rate based on information concerning at least the projected rate of change of the cost of said service or commodity;

means responsive to said calculated future value escalation rate for determining a present value discount rate by subtracting the future value escalation rate and a non-negative insurer's risk premium rate from the investment yield obtainable upon the investment of funds received from sale of said floating rate zero coupon note and reinvestment of any interim cash flows;

means responsive to said determined present value discount rate for discounting the current cost of said service or commodity at the present value discount rate to determine the price to be charged for said floating rate zero coupon note; and means responsive to said discounted current cost discounting means for determining an aggregate premium or discount as the difference between the price to be charged for the floating rate zero coupon note and the current cost of the service or commodity.

101. The data processing system of claim 99 wherein said means for determining a redemption value of a floating rate zero coupon note comprises:

early redemption determining means for determining whether redemption is being requested prior to the scheduled maturity date for said floating rate zero coupon note;

means responsive to an early redemption determination for calculating an adjusted escalation rate corresponding to each period the floating rate zero coupon note was held, and the rate of escalation of the cost of the service or commodity during that period; and means responsive to said early redemption determination and to said calculated adjusted escalation rate for escalating the cost of the service or commodity at the floating rate zero coupon note purchase date by the sequence of adjusted escalation rates that correspond to each period the floating rate zero coupon note was held.

102. The data processing system of claim 99 further comprising account list means for storing current information for each floating rate zero coupon note account.

103. The data processing system of claim 102 further comprising means for entering floating rate zero coupon note purchase and redemption transaction data and account holder inquiries.

104. The data processing system of claim 103 further comprising means for processing periodically said floating rate zero coupon note purchase and redemption transaction data to update said account list and to determine the net amount of transactions for the period.

105. The data processing system of claim 99 further comprising means for calculating the investment income and taxable income accruing to the holder of a floating rate zero coupon note each period.

106. A data processing method for administering a program to substantially reduce the uncertainty regarding the cost of a future liability whose projected due date and whose present cost are known but whose future cost is unknown but can be projected with some risk factor, said liability arising from the need to purchase a service or commodity, and thereby for defeasing said liability at a determined price, said method comprising the steps of:

responsive to the determined price, issuing at said price a floating rate zero coupon note for defeasing said liability, said floating rate zero coupon note having a scheduled maturity date and being redeemable; and determining a redemption value of said floating rate zero coupon note at said scheduled maturity date based on the cost of the service or commodity at said maturity date.

107. The data processing method of claim 106 wherein said step of determining the price to be charged to defease said liability comprises:

calculating a future value escalation rate based on information concerning at least the projected rate of change of the cost of said service or commodity;

determining, responsive to said calculated future value escalation rate, a present value discount rate by subtracting the future value escalation rate and a non-negative insurer's risk premium rate from the investment yield obtainable upon the investment of funds received from sale of said floating rate zero coupon note and reinvestment of any interim cash flows;

discounting, responsive to said determined present value discount rate, the current cost of said service or commodity at the present value discount rate to determine the price to be charged for said floating rate zero coupon note; and determining, responsive to said discounted current cost, an aggregate premium or discount as the difference between the price to be charged for the floating rate zero coupon note and the current cost of the service or commodity.

108. The data processing method of claim 106 wherein said step of determining a redemption value of a floating rate zero coupon note comprises:

determining whether redemption is being requested prior to the scheduled maturity date for said floating rate zero coupon note;

responsive to an early redemption determination, calculating an adjusted escalation rate corresponding to each period the floating rate zero coupon note was held, and the rate of escalation of the cost of the service or commodity during that period; and responsive to said early redemption determination and to said calculated adjusted escalation rate, escalating the cost of the service or commodity at the floating rate zero coupon note purchase date by the sequence of adjusted escalation rates that correspond to each period the floating rate zero coupon note was held.

109. The data processing method of claim 106 further comprising maintaining an account list of current information for each floating rate zero coupon note account.

110. The data processing method of claim 109 further comprising entering floating rate zero coupon note purchase and redemption transaction data and account holder inquiries into a data processing system.

111. The data processing method of claim 110 further comprising processing periodically said floating rate zero coupon note purchase and redemption transaction data to update said account list and to determine the net amount of transactions for the period.

112. The data processing method of claim 106 further comprising calculating the investment income and taxable income accruing to the holder of a floating rate zero coupon note each period.

* * * * *

UNITED STATES PATENT AND TRADEMARK OFFICE
CERTIFICATE OF CORRECTION

PATENT NO. : 4,752,877

DATED : June 21, 1988

INVENTOR(S) : Peter A. Roberts et al.

It is certified that error appears in the above-identified patent and that said Letters Patent is hereby corrected as shown below:

```
Column 15, after line 65, after "PERIOD PENALTY (1) = 0.005"
   should be inserted the following new line:
      -- FRACTION = 0.5 --.

Claim 57, column 49, line 15, "method" should be -- system --.
```

Signed and Sealed this

Twenty-third Day of April, 1991

Attest:

HARRY F. MANBECK, JR.

*Attesting Officer*  *Commissioner of Patents and Trademarks*